(12) United States Patent
Breidenbach

(10) Patent No.: US 7,857,376 B2
(45) Date of Patent: Dec. 28, 2010

(54) AERODYNAMIC DRAG REDUCING APPARATUS

(75) Inventor: Thomas Scott Breidenbach, Maple Grove, MN (US)

(73) Assignee: Adaptive Aerodynamic, LLC, Maple Grove, MN (US)

( * ) Notice: Subject to any disclaimer, the term of this patent is extended or adjusted under 35 U.S.C. 154(b) by 0 days.

(21) Appl. No.: 12/390,499

(22) Filed: Feb. 23, 2009

(65) Prior Publication Data

US 2009/0212594 A1 Aug. 27, 2009

Related U.S. Application Data

(60) Provisional application No. 61/029,922, filed on Feb. 21, 2008.

(51) Int. Cl.
*B62D 35/00* (2006.01)

(52) U.S. Cl. .................................................. 296/180.1

(58) Field of Classification Search .... 296/180.1–180.5
See application file for complete search history.

(56) References Cited

U.S. PATENT DOCUMENTS

| | | | |
|---|---|---|---|
| 609,789 A | 8/1898 | Capewell | |
| 1,352,679 A * | 9/1920 | Myers | ........................ 280/159 |
| 1,390,793 A | 9/1921 | Kyle et al. | |
| 1,912,138 A | 5/1933 | Hoover | |
| 2,338,533 A | 1/1944 | Pash | |
| 2,569,354 A | 9/1951 | Tracy | |
| 2,737,411 A | 3/1956 | Potter | |
| 2,772,624 A | 12/1956 | Carnes | |
| 2,780,980 A | 2/1957 | Kennedy | |
| 2,887,243 A | 5/1959 | Murdock, Sr. | |
| 3,016,700 A | 1/1962 | Howald | |
| 3,342,523 A | 9/1967 | Lutgen | |
| 3,346,186 A | 10/1967 | Fulton et al. | |
| 3,496,687 A | 2/1970 | Greenberg et al. | |
| 3,526,365 A | 9/1970 | Darrow, Jr. | |
| 3,711,146 A * | 1/1973 | Madzsar et al. | .......... 296/180.2 |
| 3,971,586 A | 7/1976 | Saunders | |
| 3,977,716 A | 8/1976 | Whited | |
| 4,006,932 A | 2/1977 | McDonald | |
| 4,117,900 A | 10/1978 | Amick | |
| 4,142,755 A | 3/1979 | Keedy | |
| 4,154,149 A | 5/1979 | Holford | |
| 4,210,354 A | 7/1980 | Canning | |
| 4,214,787 A | 7/1980 | Chain | |

(Continued)

FOREIGN PATENT DOCUMENTS

DE 195 24 825 A1 1/1997

*Primary Examiner*—Lori L Lyjak
(74) *Attorney, Agent, or Firm*—Merchant & Gould P.C.

(57) ABSTRACT

A drag reducing apparatus for use with vehicles having surfaces that are not streamlined. The apparatus includes an exterior cover that forms a drag reducing shape when the apparatus is fully extended. The apparatus can be retracted to a space saving configuration. A scissors linkage extends and retracts the apparatus. The scissors linkage can be motorized, and the motor can extend the scissors linkage by turning in a first direction and can retract the apparatus by turning in a second direction. The scissors linkage can hold the exterior cover taut when the apparatus is fully extended. The scissors linkage can support the exterior cover at intermediate locations when the apparatus is not fully extended. The apparatus can include support linkages and intermediate moveable members that support the exterior cover and define the drag reducing shape.

20 Claims, 48 Drawing Sheets

U.S. PATENT DOCUMENTS

| | | |
|---|---|---|
| 4,236,745 A | 12/1980 | Davis |
| 4,248,103 A | 2/1981 | Halsall |
| 4,257,641 A | 3/1981 | Keedy |
| 4,349,155 A | 9/1982 | Donguy |
| 4,383,407 A | 5/1983 | Inman |
| 4,400,985 A | 8/1983 | Bond |
| 4,433,865 A | 2/1984 | Crompton, Jr. |
| RE31,565 E | 4/1984 | Beaulieu |
| 4,451,074 A | 5/1984 | Scanlon |
| D274,322 S | 6/1984 | Hayes et al. |
| 4,458,936 A | 7/1984 | Mulholland |
| 4,462,628 A | 7/1984 | Gregg |
| 4,489,889 A | 12/1984 | Inman |
| 4,508,380 A | 4/1985 | Sankrithi |
| 4,601,508 A | 7/1986 | Kerian |
| 4,651,589 A | 3/1987 | Lambert |
| 4,682,808 A | 7/1987 | Bilanin |
| 4,688,841 A | 8/1987 | Moore |
| 4,702,509 A | 10/1987 | Elliott, Sr |
| 4,741,569 A | 5/1988 | Sutphen |
| 4,747,353 A | 5/1988 | Watt |
| 4,784,429 A | 11/1988 | Hodges |
| 4,818,015 A | 4/1989 | Scanlon |
| 4,944,550 A | 7/1990 | Drown et al. |
| 4,978,162 A | 12/1990 | Labbe |
| 5,058,945 A | 10/1991 | Elliott, Sr. et al. |
| 5,156,195 A | 10/1992 | Wehler et al. |
| 5,190,342 A | 3/1993 | Marlowe et al. |
| 5,236,347 A | 8/1993 | Andrus |
| 5,237,887 A | 8/1993 | Appleberry |
| 5,240,306 A | 8/1993 | Flemming |
| 5,280,990 A | 1/1994 | Rinard |
| 5,332,280 A | 7/1994 | Dupont |
| 5,348,366 A | 9/1994 | Baker et al. |
| 5,375,903 A | 12/1994 | Lechner |
| 5,498,059 A | 3/1996 | Switlik |
| 5,609,384 A | 3/1997 | Loewen |
| 5,823,610 A | 10/1998 | Ryan et al. |
| 5,842,734 A | 12/1998 | Lechner |
| 5,857,648 A | 1/1999 | Dailey et al. |
| 5,947,548 A | 9/1999 | Carper et al. |
| 6,092,861 A | 7/2000 | Whelan |
| 6,105,454 A | 8/2000 | Bacchi et al. |
| 6,205,772 B1 | 3/2001 | Perrier et al. |
| 6,257,654 B1 | 7/2001 | Boivin et al. |
| 6,286,892 B1 | 9/2001 | Bauer et al. |
| 6,286,894 B1 | 9/2001 | Kingham |
| 6,309,010 B1 | 10/2001 | Whitten |
| 6,409,252 B1 | 6/2002 | Andrus |
| 6,418,710 B1 | 7/2002 | Perrier et al. |
| 6,457,766 B1 | 10/2002 | Telnack |
| 6,467,833 B1 | 10/2002 | Travers |
| 6,485,087 B1 | 11/2002 | Roberge et al. |
| 6,561,575 B2 | 5/2003 | Fairburn et al. |
| 6,595,578 B1 | 7/2003 | Calsoyas et al. |
| 6,616,218 B2 | 9/2003 | Bauer et al. |
| 6,666,498 B1 | 12/2003 | Whitten |
| 6,669,270 B1 | 12/2003 | Card et al. |
| 6,779,834 B1 | 8/2004 | Keller |
| 6,789,839 B1 | 9/2004 | Samuelson |
| 6,799,791 B2 | 10/2004 | Reiman et al. |
| 6,846,035 B2 | 1/2005 | Wong et al. |
| 6,854,788 B1 | 2/2005 | Graham |
| 6,877,793 B2 | 4/2005 | Cory |
| 6,886,882 B2 | 5/2005 | Farlow et al. |
| 6,915,611 B2 | 7/2005 | Reiman et al. |
| 6,959,958 B2 | 11/2005 | Basford |
| 7,008,004 B2 | 3/2006 | Ortega et al. |
| 7,008,005 B1 | 3/2006 | Graham |
| 7,147,270 B1 | 12/2006 | Andrus et al. |
| 7,207,620 B2 | 4/2007 | Cosgrove et al. |
| 7,243,980 B2 | 7/2007 | Vala |
| 7,374,229 B1 | 5/2008 | Noll et al. |
| 7,374,230 B2 | 5/2008 | Breidenbach |
| 7,380,868 B2 | 6/2008 | Breidenbach |
| 7,404,592 B2 | 7/2008 | Reiman et al. |
| 7,549,695 B2 | 6/2009 | Royer |
| 7,618,086 B2 | 11/2009 | Breidenbach |
| 7,641,262 B2 | 1/2010 | Nusbaum |
| 2002/0005655 A1 | 1/2002 | Bauer et al. |
| 2002/0021023 A1 | 2/2002 | Leban |
| 2002/0030384 A1 | 3/2002 | Basford |
| 2003/0205913 A1 | 11/2003 | Leonard |
| 2004/0118055 A1 | 6/2004 | Reiman et al. |
| 2004/0119319 A1 | 6/2004 | Reiman et al. |
| 2007/0200390 A1 | 8/2007 | Lotarev et al. |
| 2007/0246969 A1 | 10/2007 | Smith et al. |
| 2008/0048468 A1 | 2/2008 | Holubar |
| 2008/0061597 A1 | 3/2008 | Reiman et al. |
| 2008/0061598 A1 | 3/2008 | Reiman et al. |
| 2008/0093886 A1 | 4/2008 | Nusbaum |
| 2008/0184835 A1 | 8/2008 | Breidenbach |
| 2008/0217957 A1 | 9/2008 | Schoon et al. |
| 2008/0272617 A1 | 11/2008 | Roush et al. |
| 2008/0290686 A1 | 11/2008 | Royer |
| 2008/0303310 A1 | 12/2008 | Breidenbach |
| 2008/0309122 A1 | 12/2008 | Smith et al. |
| 2009/0096250 A1 | 4/2009 | Kohls |
| 2009/0140542 A1 | 6/2009 | Breidenbach |
| 2009/0179456 A1 | 7/2009 | Holubar |
| 2009/0200834 A1 | 8/2009 | Vogel et al. |
| 2009/0212595 A1 | 8/2009 | Heppel et al. |
| 2009/0212596 A1 | 8/2009 | Reiman et al. |
| 2009/0230726 A1 | 9/2009 | Reiman et al. |
| 2010/0123333 A1 | 5/2010 | Breidenbach |

* cited by examiner

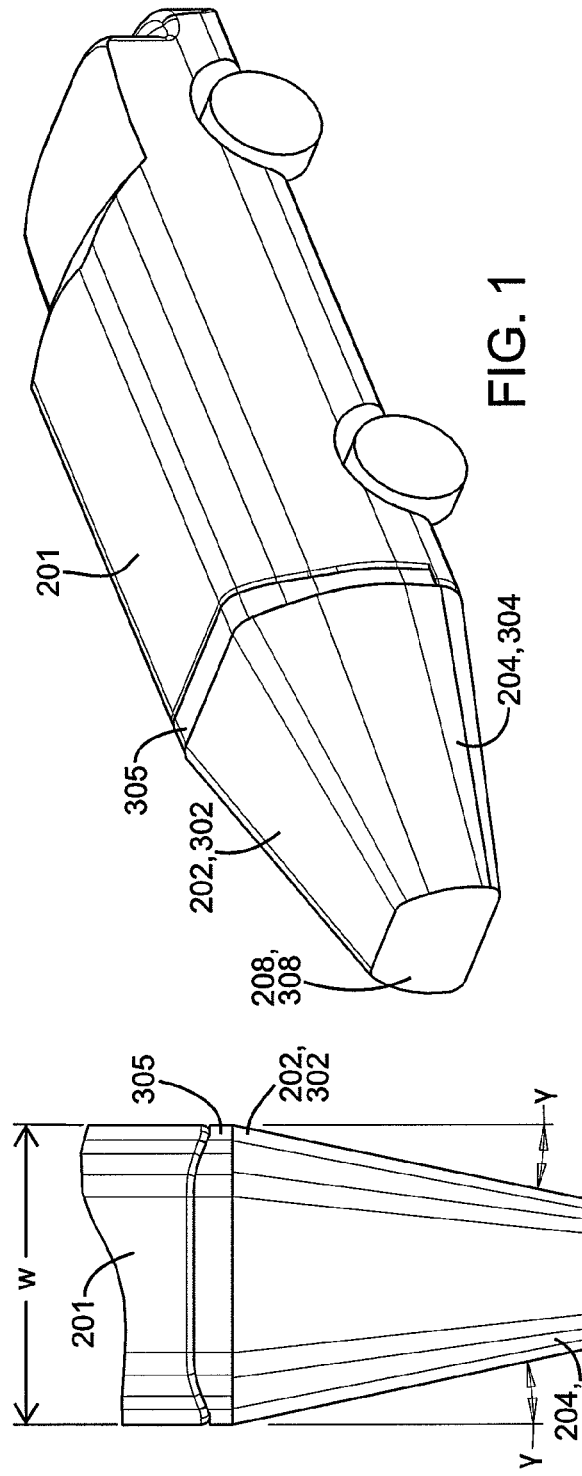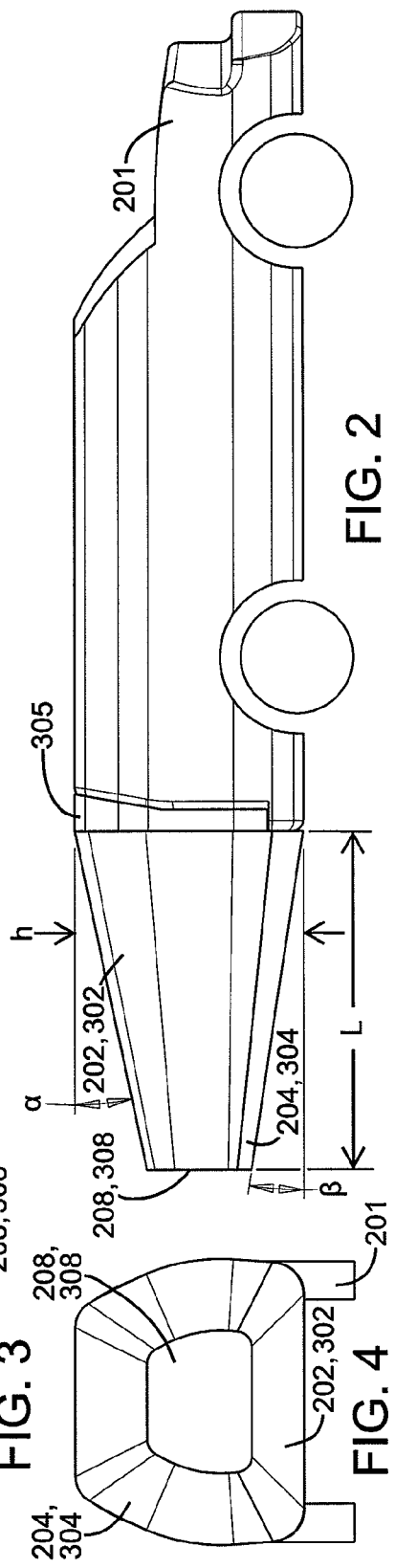

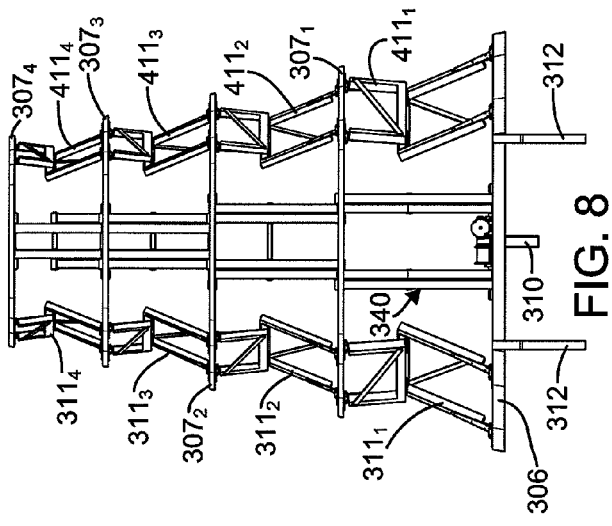
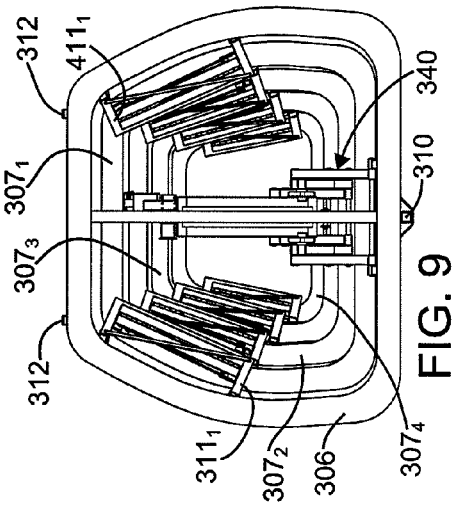
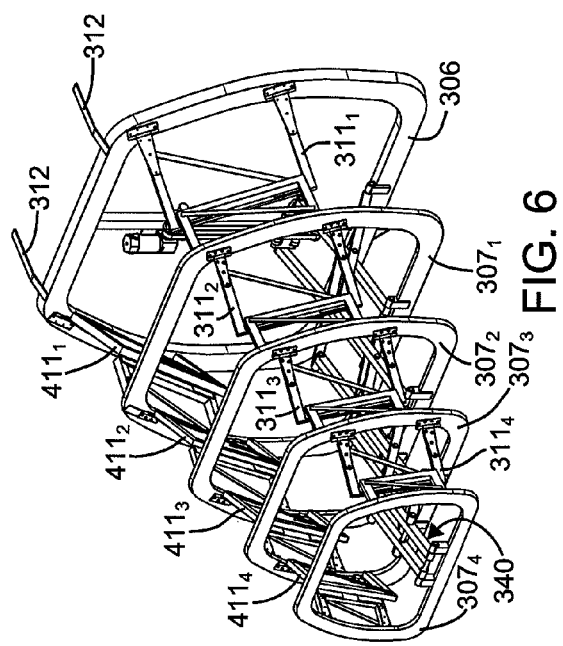
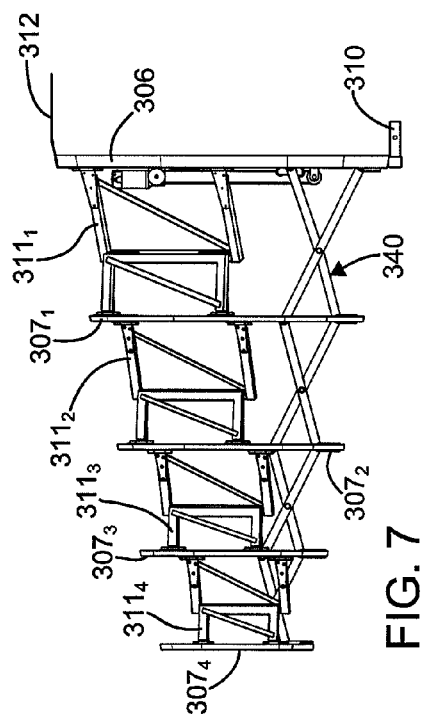

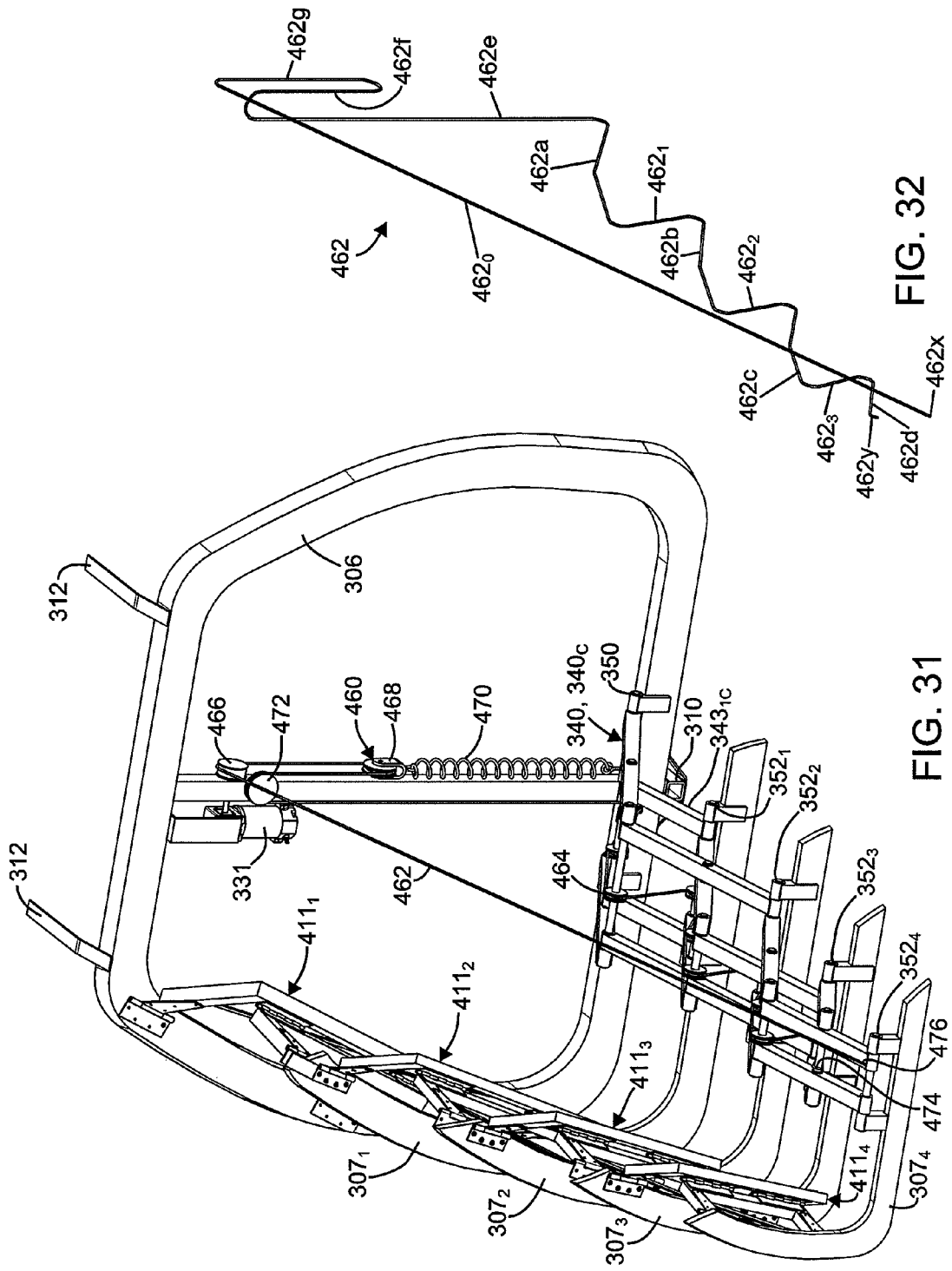

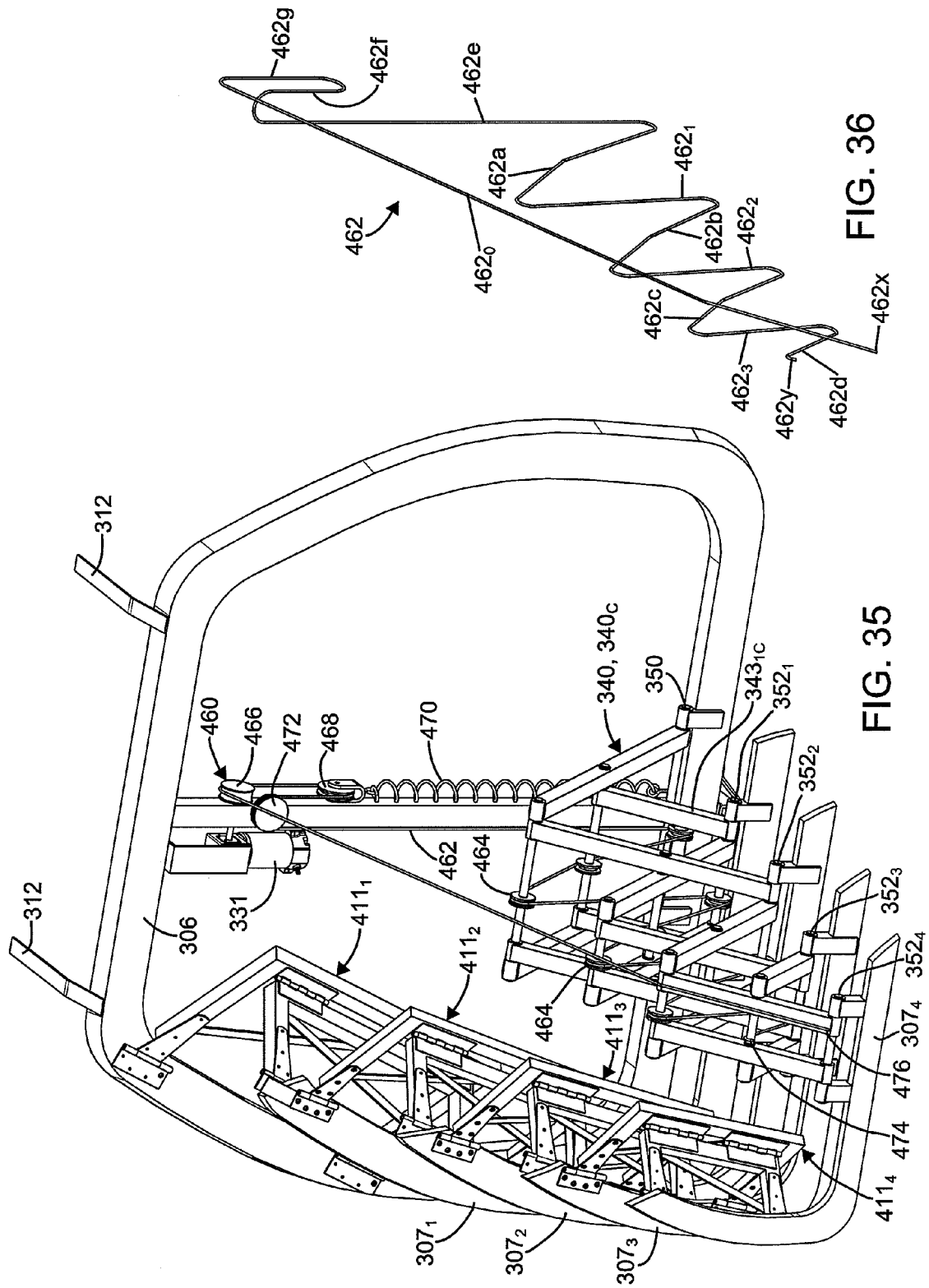

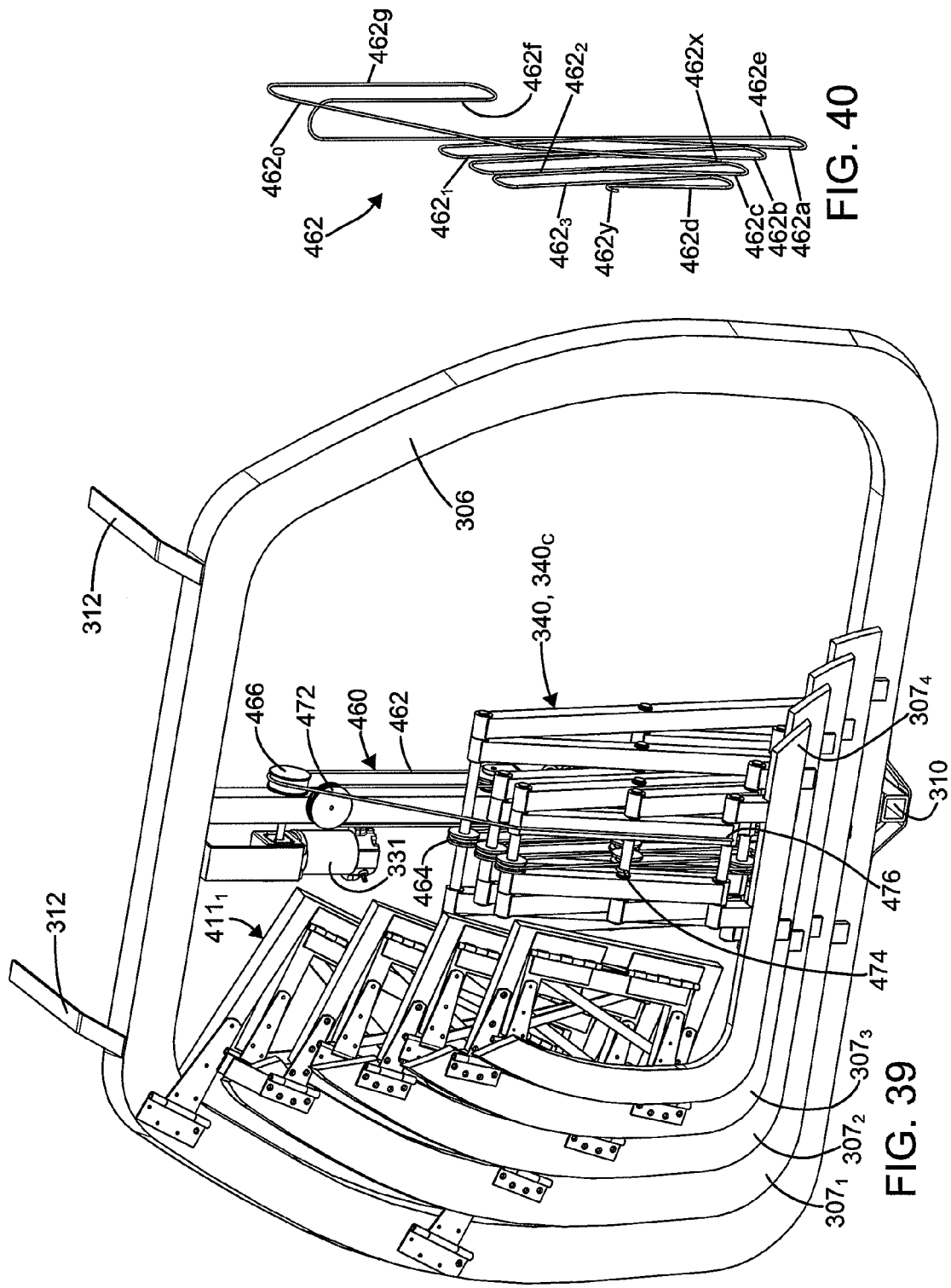

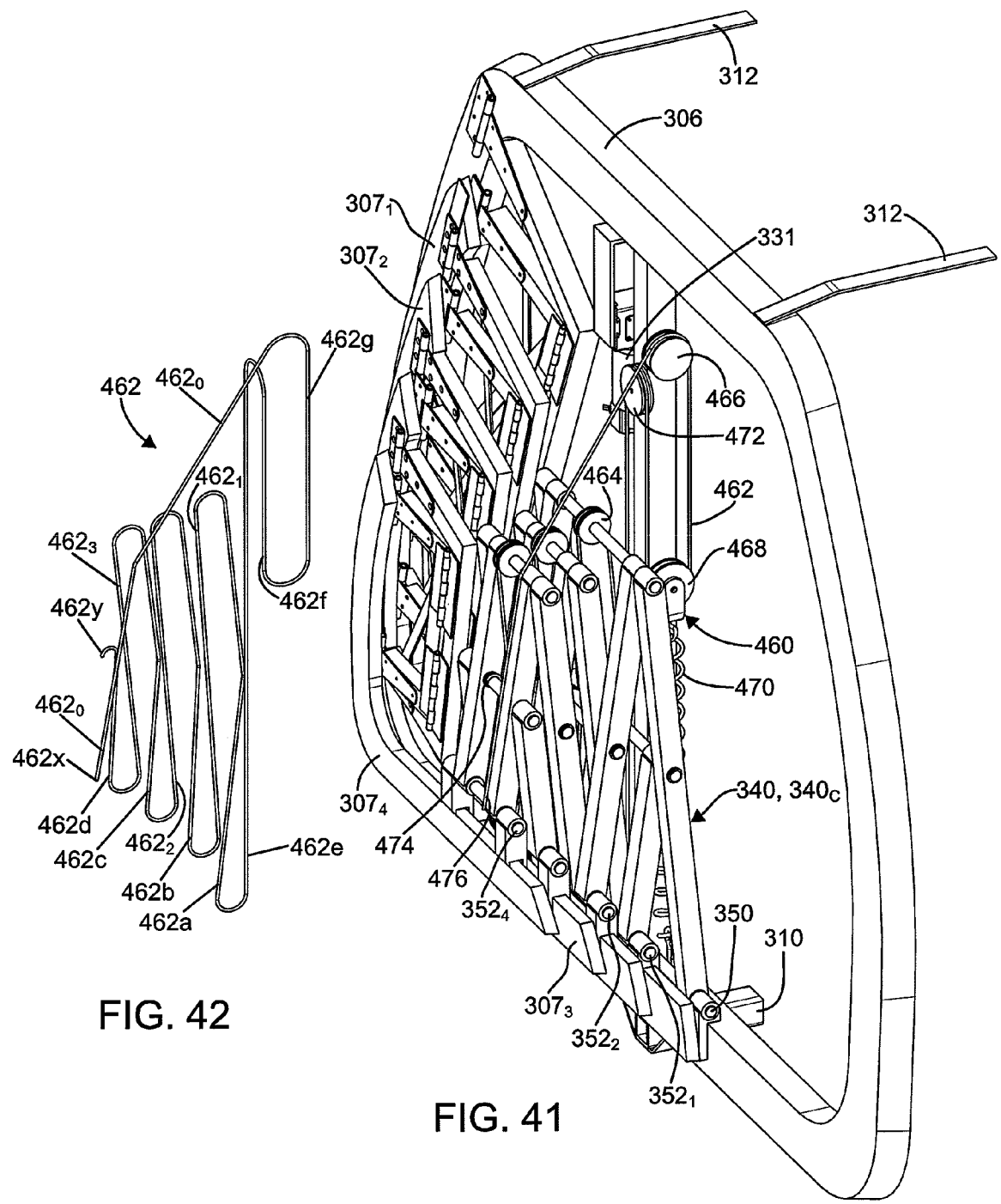

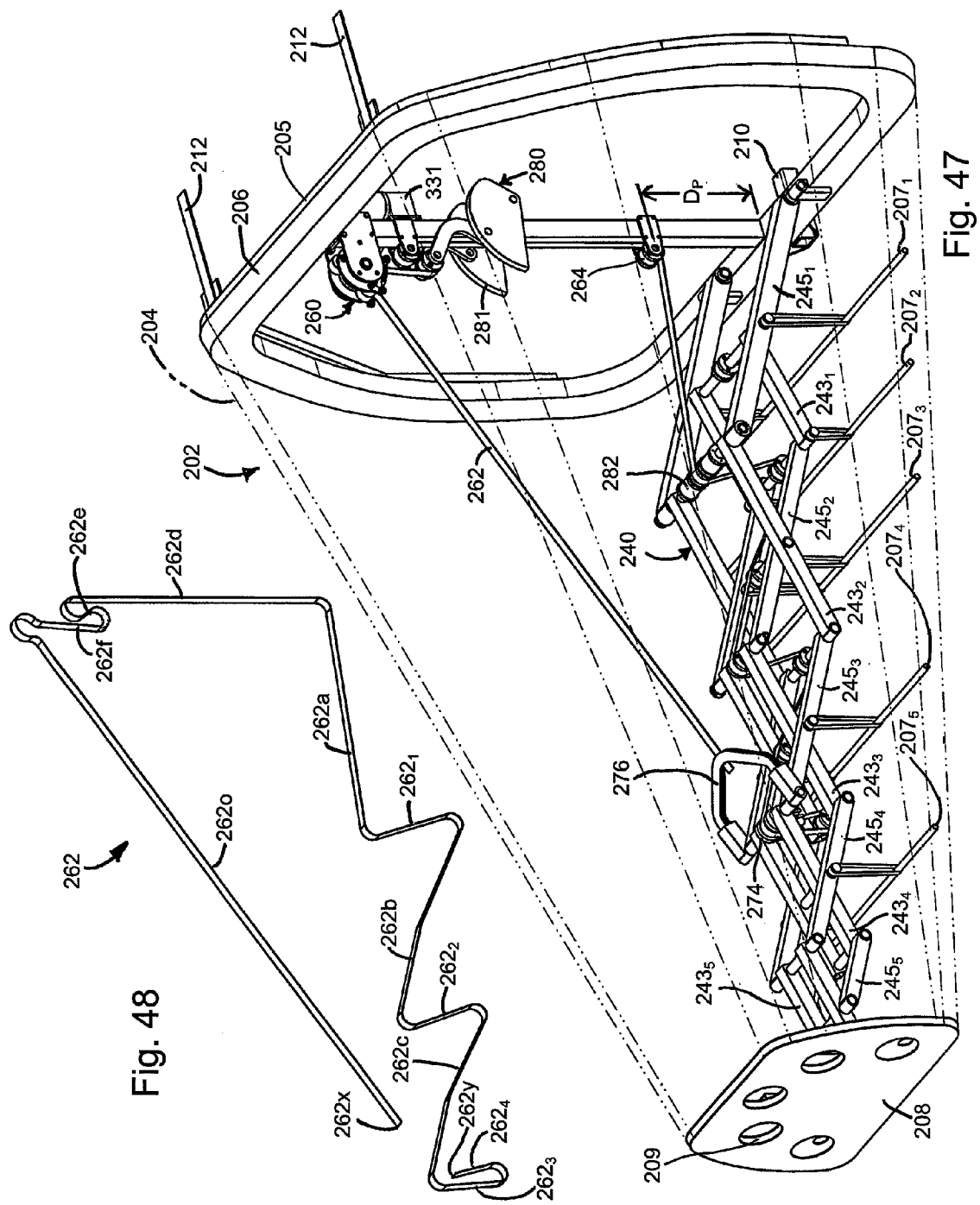

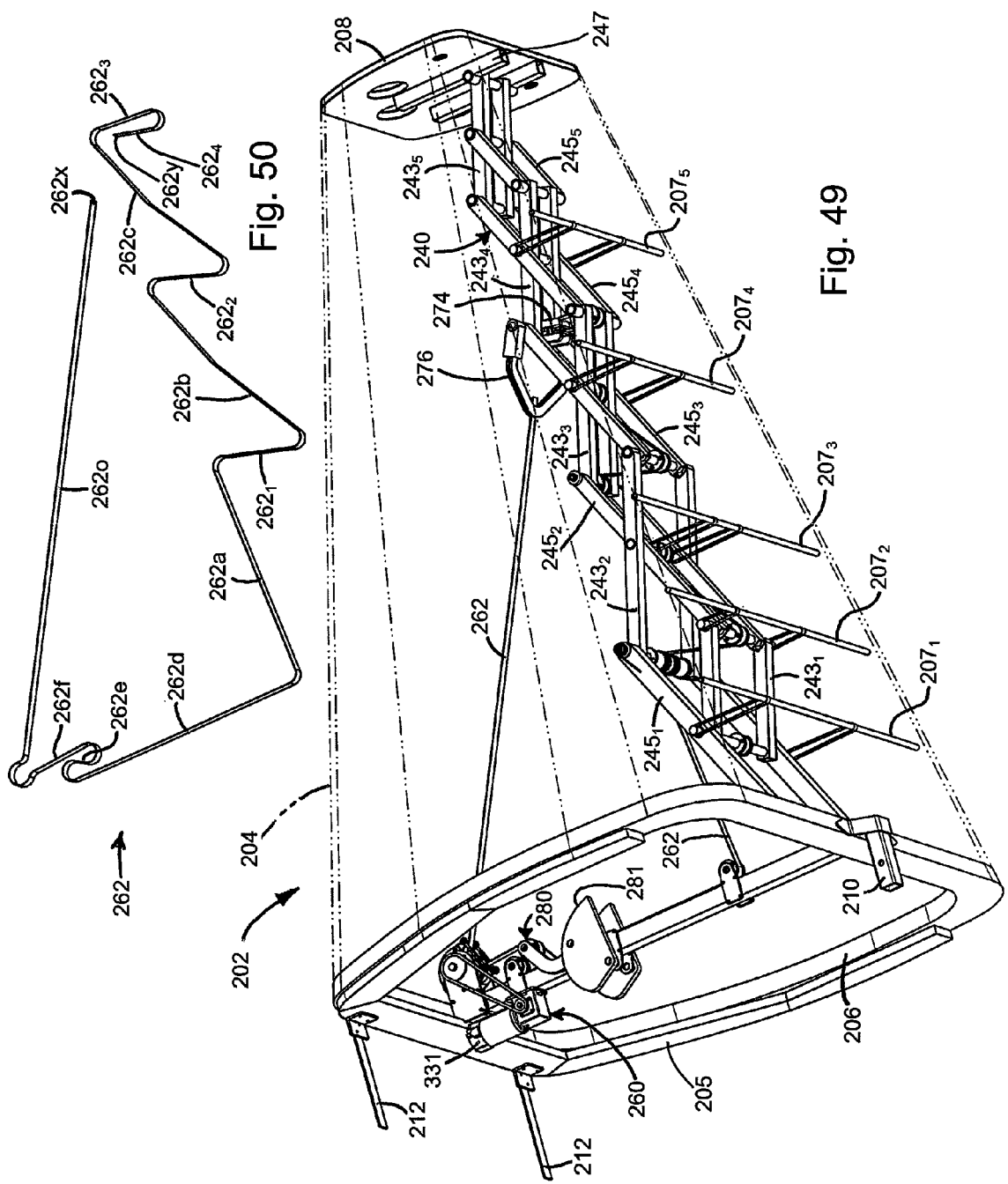

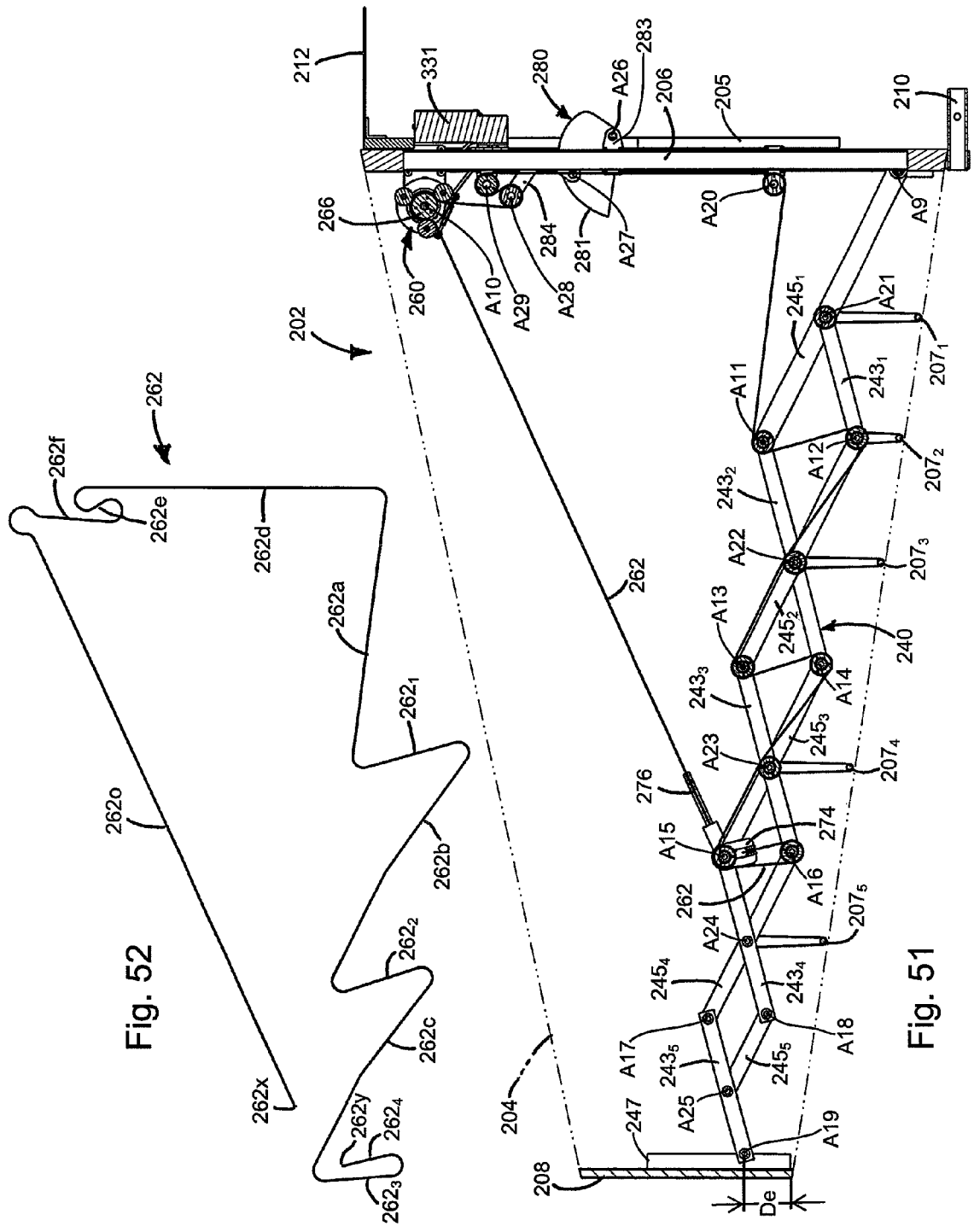

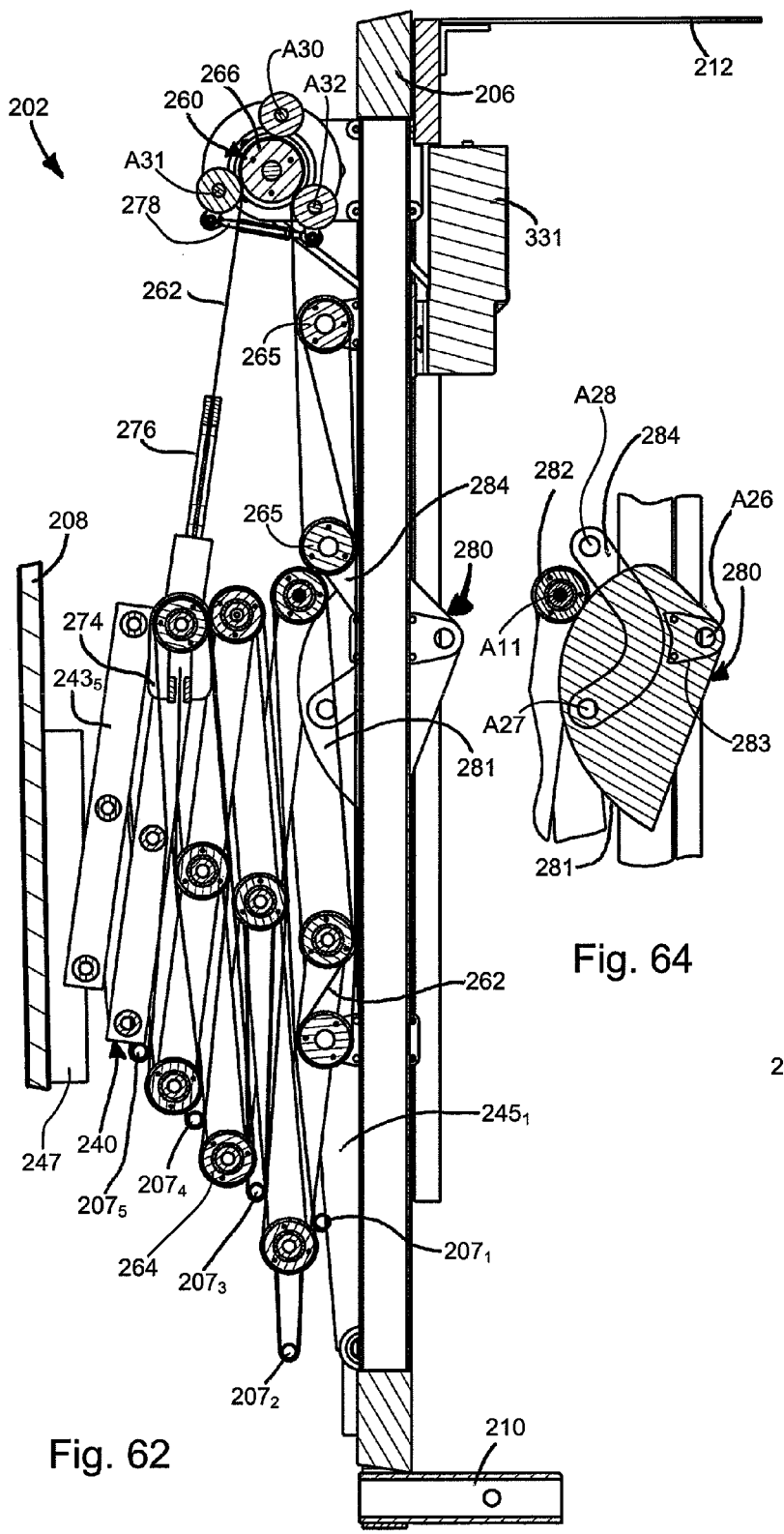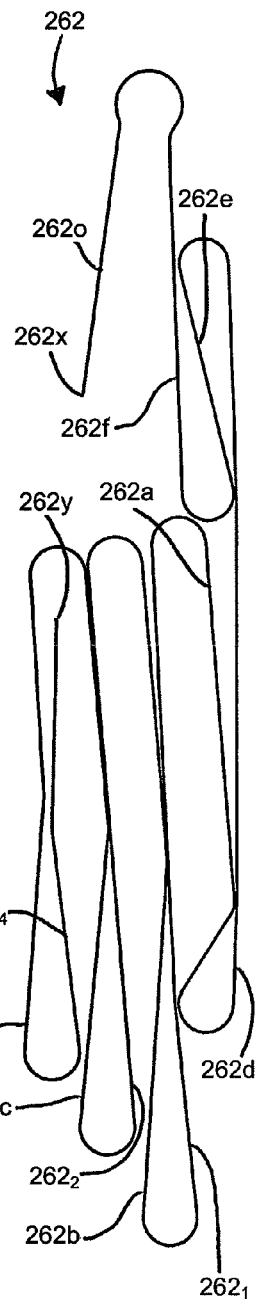
Fig. 62
Fig. 64
Fig. 63

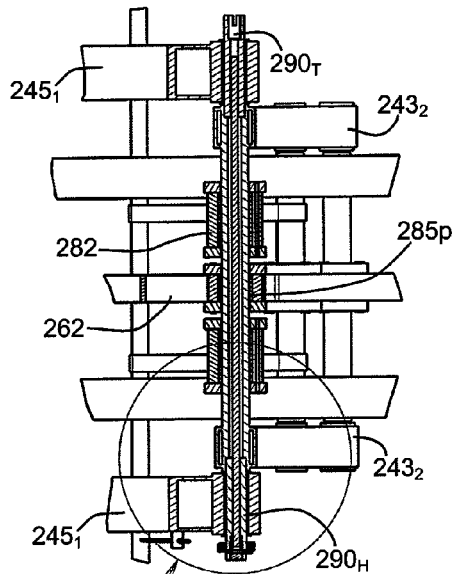
Fig. 69
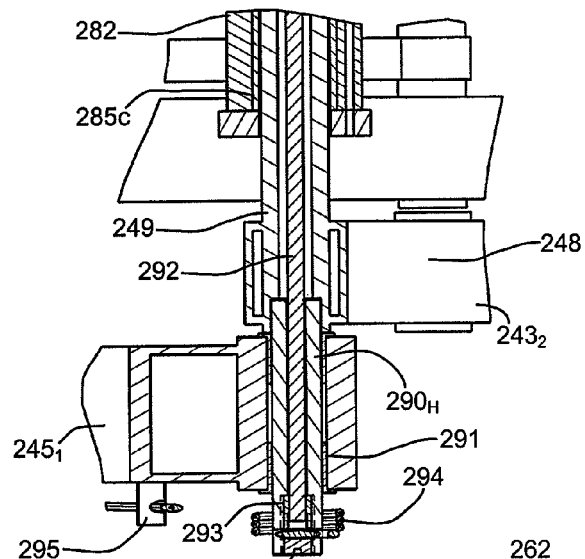
Fig. 70
Fig. 68
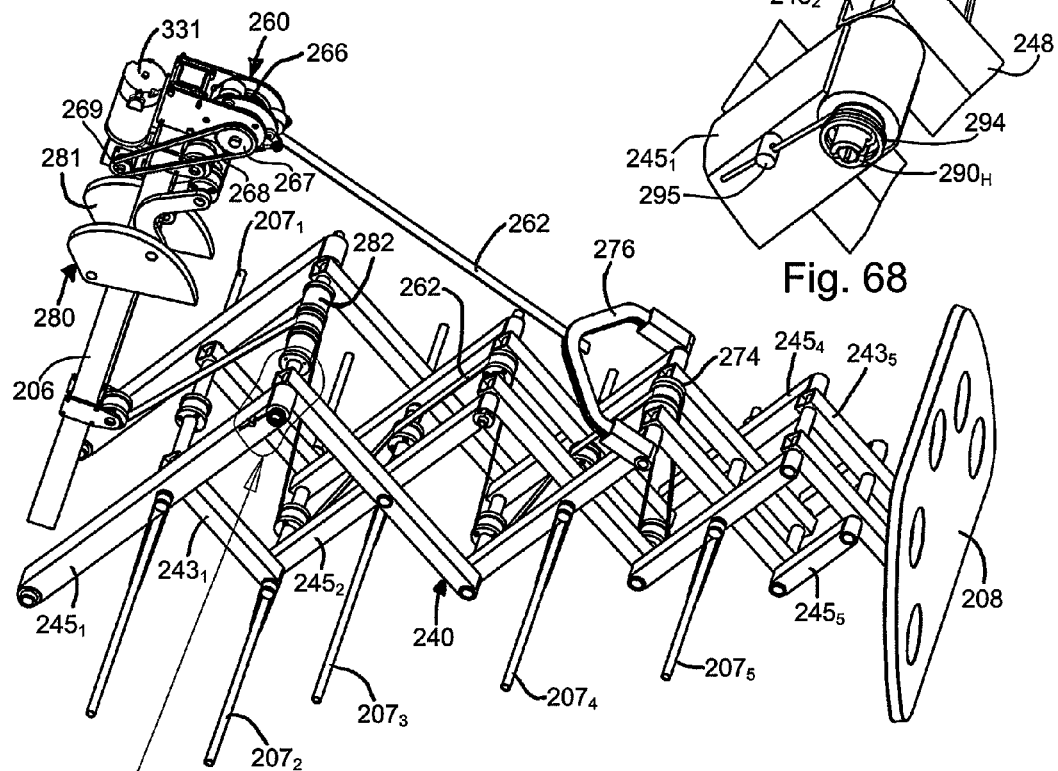
Fig. 67

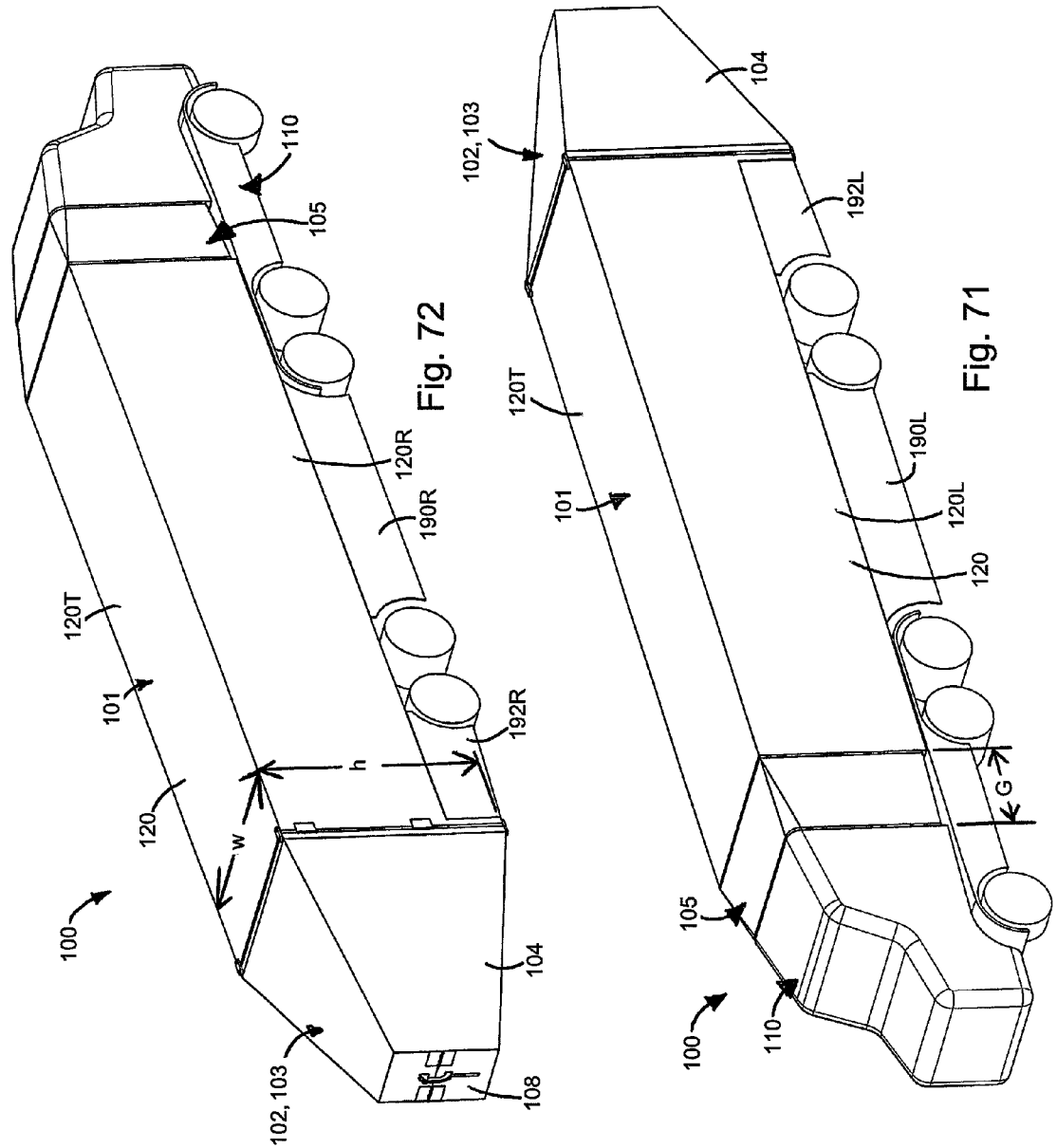

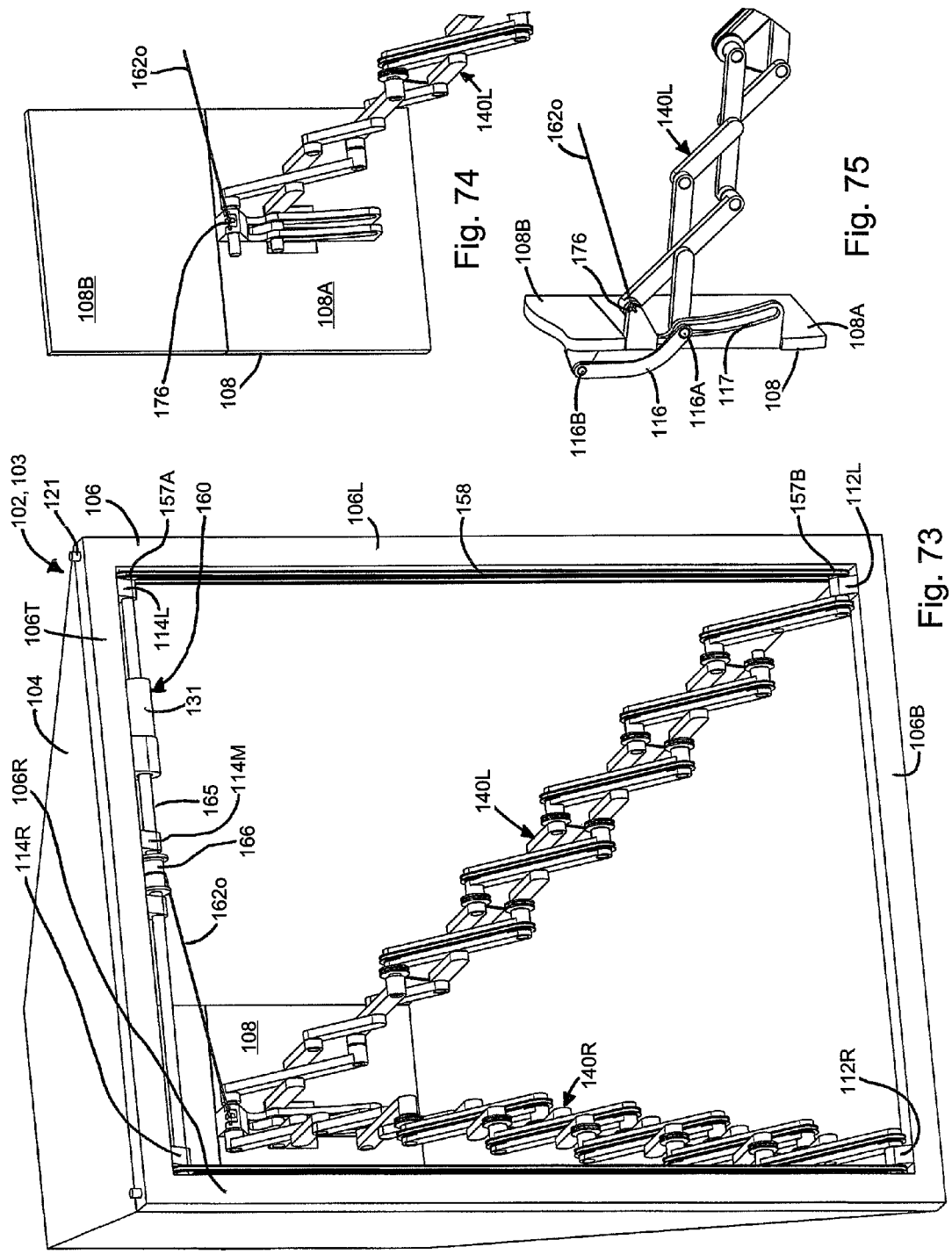

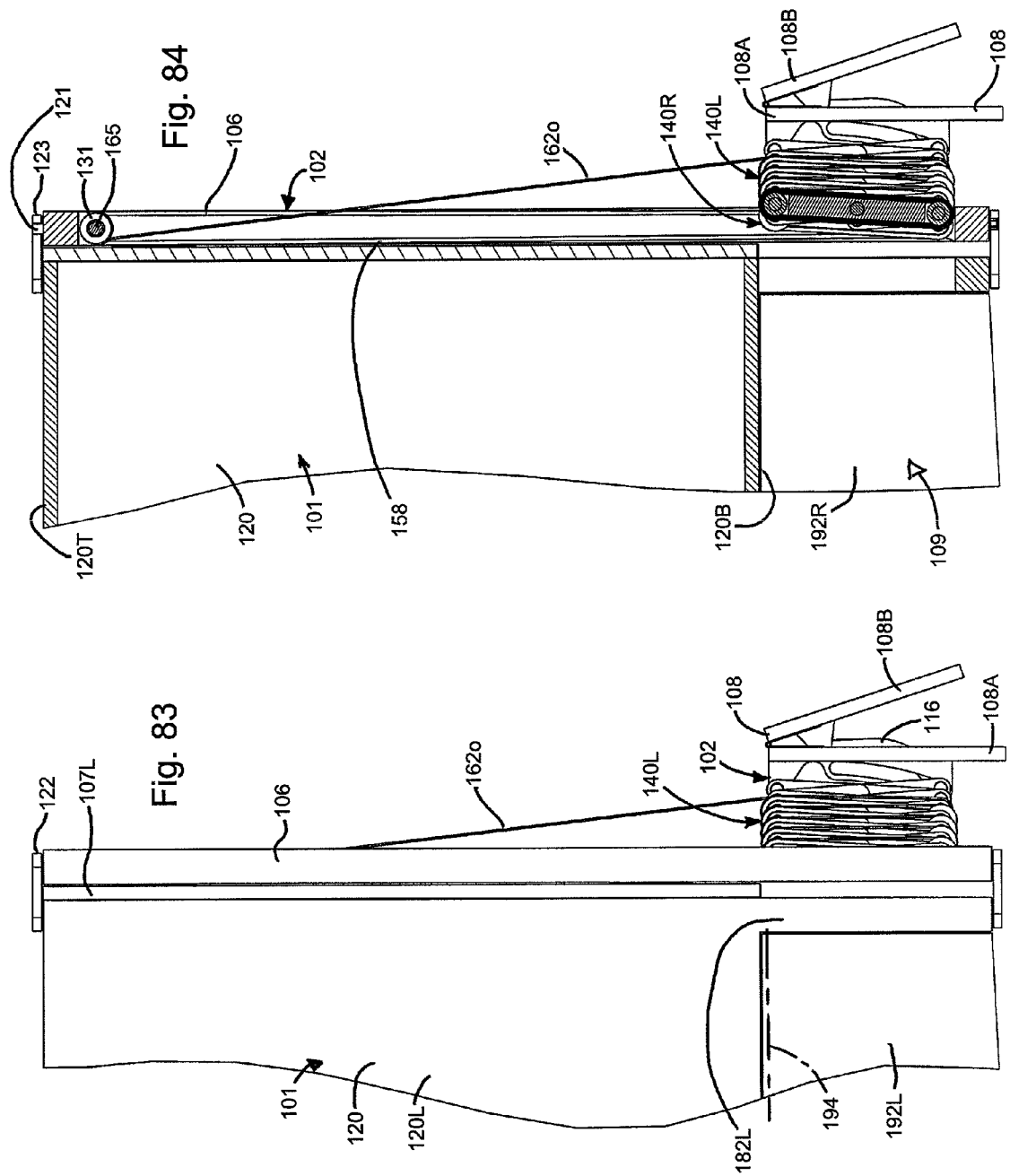

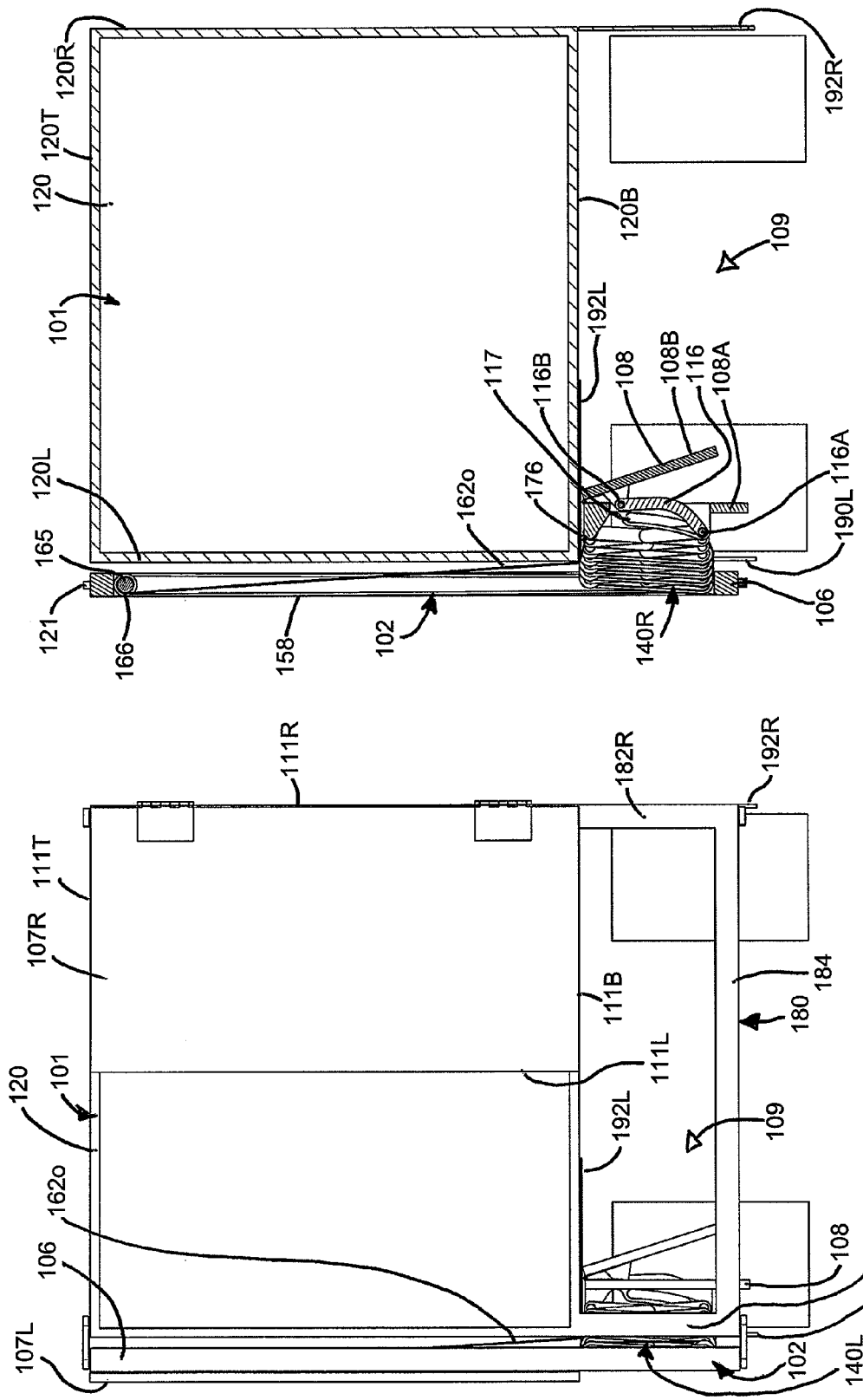

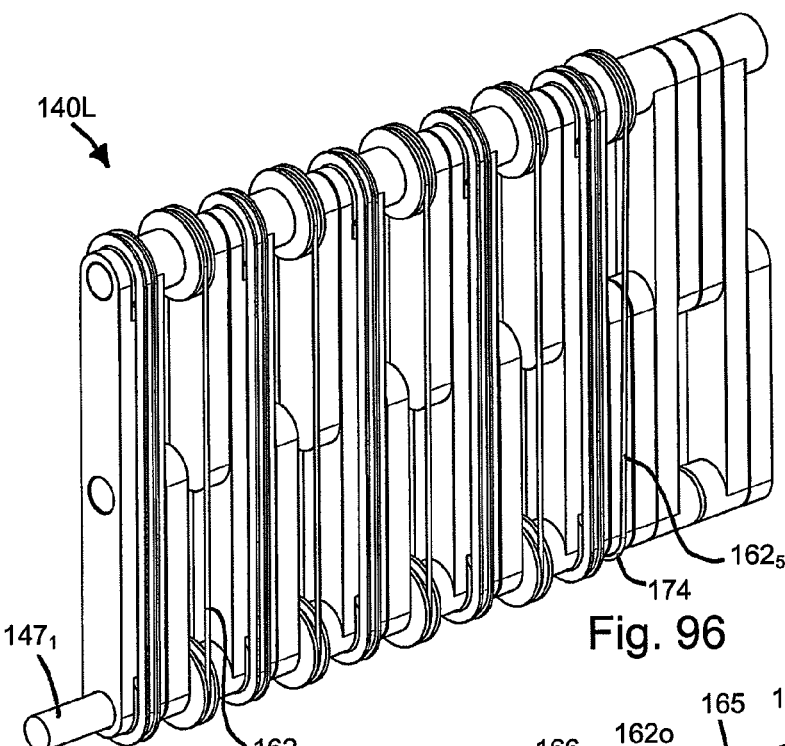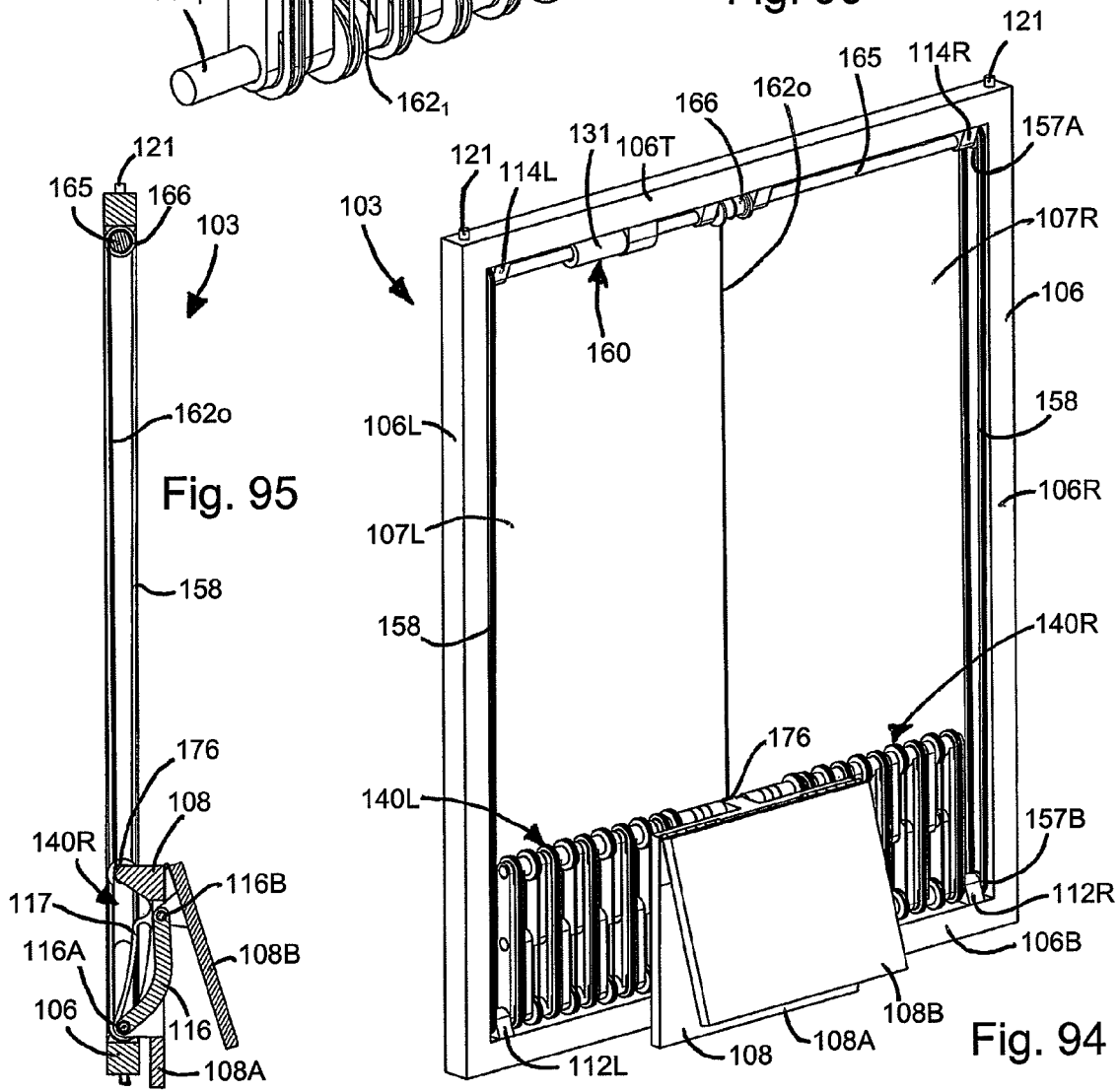

AERODYNAMIC DRAG REDUCING APPARATUS

RELATED APPLICATIONS

This application claims the benefit of U.S. Provisional Patent Application Ser. No. 61/029,922, filed Feb. 21, 2008. This application is related to U.S. patent application Ser. No. 12/134,348, filed Jun. 6, 2008, now U.S. Patent Application Publication No. US 2008/0303310, which claims the benefit of U.S. Provisional Patent Application Ser. Nos. 60/942,457, filed Jun. 6, 2007, and 61/029,922, filed Feb. 21, 2008; this application is related to U.S. patent application Ser. No. 11/837,228, filed Aug. 10, 2007, now U.S. Patent Application Publication No. US 2008/0184835, which claims the benefit of U.S. Provisional Patent Application Ser. No. 60/822,058, filed Aug. 10, 2006; this application is related to U.S. patent application Ser. No. 12/045,022, filed Mar. 9, 2008, now U.S. Patent Application Publication No. US 2008/0164722, which is a continuation in part of U.S. patent application Ser. No. 11/565,254, filed Nov. 30, 2006, now U.S. Pat. No. 7,374,230, issued on May 20, 2008, which claims the benefit of U.S. Provisional Patent Application Ser. No. 60/741,155, filed Dec. 1, 2005; and, this application is related to U.S. patent application Ser. No. 12/132,585, filed Jun. 3, 2008, which is a continuation of U.S. patent application Ser. No. 11/425,854, filed Jun. 22, 2006, now U.S. Pat. No. 7,380,868, issued on Jun. 3, 2008, which claims the benefit of U.S. Provisional Patent Application Ser. Nos. 60/694,865, filed Jun. 29, 2005, 60/705,026, filed Aug. 2, 2005, and 60/705,029, filed Aug. 3, 2005; which patents and applications are hereby incorporated by reference in their entirety.

TECHNICAL FIELD

The present disclosure relates to aerodynamic drag reducing devices for use with vehicles.

BACKGROUND

Certain vehicles have downstream surfaces, at or near the vehicle's rear, that are not streamlined. Examples include: over-the-road trucks and truck trailers, vans and minivans, motor homes and travel trailers, and pickup trucks. In vehicles such as pickup trucks, one non-streamlined surface is near the vehicle's center. Certain vehicles, such as semi-trailer trucks, have gaps between otherwise streamlinable exterior surfaces along the vehicle's length. In the case of the semi-trailer truck, a gap is typically present between a tractor unit and a semi-trailer. Certain of the above vehicles also include rear doors or tail gates.

It is known that a significant amount of aerodynamic drag is created when a vehicle travels at velocities typical on a modern roadway. This is due, in large part, to areas of low pressure that are induced on rearward surfaces of the vehicle. The low pressure becomes more pronounced as airflow over the vehicle separates from the rearward surfaces of the vehicle. The phenomenon of airflow separation is also known in aircraft wing design and, in this case, causes the wing to stall.

Moving vehicles having blunt rear ends and surfaces facing mainly rearward are especially affected by airflow separation starting at an abrupt transition between side, top, and bottom surfaces and the near vertical rearward facing surfaces. The low pressure that the airflow separation induces is compounded by a relatively large area on which the low air pressure acts in comparison with more streamlined vehicles.

Moving vehicles having an interruption in otherwise streamlined, near streamlined, or streamlinable exterior surfaces along the length of the vehicle are subjected to increased aerodynamic drag created by turbulence as airflow over the vehicle crosses the interruption.

The low air pressure (partial vacuum) acting on the rear surfaces of a moving vehicle produces a drag force that resists forward motion of the vehicle. Increased turbulence caused by gaps and interruptions in otherwise streamlined or streamlinable exterior surfaces also produces a drag force that resists the forward motion of the vehicle. These drag forces are opposed by the vehicle's engine and require power that is typically produced by burning fuel. Any reduction in aerodynamic drag results in a reduction in fuel consumption.

In an era of diminishing crude oil reserves, potential limits on atmospheric green house gas emissions in response to global warming, and increasing environmental consciousness, fuel efficiency improvements are a growing concern. Aerodynamic improvements are especially valuable since they can be combined with other improvements such as engine efficiency and reduced chassis weight. Increased fuel efficiency also provides a valuable benefit of increasing a range a given vehicle can travel before refueling.

At a given speed, streamline vehicles, such as certain high-speed cars and airplanes, have markedly lower airflow separation and therefore markedly lower aerodynamic drag in comparison with vehicles having blunt rear ends. Such streamline vehicles generally have gently tapering reward surfaces designed to keep airflow attached. A similar streamlining technique has also been applied to over-the-road trucks where it is known as a "boat-tail". Boat-tails significantly increase the length of a vehicle. In addition, they may interfere with convenient access to the rear doors of the vehicle. There is a need for a device that provides streamlined rear surfaces to the rear of vehicles having blunt rear ends without introducing unacceptable limitations to the vehicle length or the rear door function. There is also a need to bridge gaps across discontinuities along the length of vehicles, such as the gap between the tractor unit and the semi-trailer of the semi-trailer truck. The present disclosure satisfies these and other needs.

SUMMARY

The present disclosure is concerned with providing an aerodynamic drag reducing apparatus for vehicles for the purpose of reducing energy consumption and related tailpipe emissions. The principles of the present disclosure can also be applied to a hydrodynamic drag reducing apparatus. More specifically, in certain embodiments, this is achieved by adding gently sloping surfaces downstream of rearward facing surfaces of the vehicle with a goal of reducing airflow separation and aerodynamic drag. More specifically, in other embodiments, this is achieved by filling gaps and/or discontinuities along a length of the vehicle. The gap and/or the discontinuity may vary and open and close while the vehicle is in operation. Both of these techniques, used separately or together, reduce fuel consumption of the vehicle.

When the concepts of the present disclosure are employed to add a tapering rear surface(s) to a vehicle, means are included to retract and extend the tapering rear surface(s) when needed for various purposes. In addition, certain embodiments of the present disclosure may be mounted on or integrated with one or more rear doors of a vehicle thereby allowing access to the rear of the vehicle. Alternatively, other embodiments of the present disclosure may include means for moving the drag reducing apparatus to allow access to the rear of the vehicle.

When the concepts of the present disclosure are employed to add fill surfaces that fill gaps and/or discontinuities along the length of the vehicle, means are included to lengthen and shorten the fill surfaces as needed. For example, a gap typically exists between a tractor unit and a semi-trailer of a semi-trailer truck while heading straight down a level road. Portions of the gap expand and contract as the semi-trailer truck encounters bumps and other slope changes on the road. In addition, when the semi-trailer truck executes a turn and certain parking maneuvers, a portion of the gap on one side of the semi-trailer truck can greatly expand while a portion of the gap on the opposite side greatly contracts. In certain embodiments, a main purpose of the fill surfaces are to fill the gap between the tractor unit and the semi-trailer of the semi-trailer truck while heading approximately straight down a road with an approximately uniform slope. This condition exists for a large share of driving time under many normal driving routines, especially at high speeds, and is where aerodynamic benefits are most valuable. Under other driving conditions, especially at low speeds while executing sharp turns, portions of the gap may expand beyond the reach of the fill surfaces creating a gap between the fill surfaces and the semi-trailer or the tractor unit. The fill surfaces of the present disclosure can be retracted from an extended configuration to match the contracted portion of the gap. The fill surfaces can be fully retracted to a retracted configuration at low speeds and/or when certain maneuvers (e.g., sharp turns) are executed.

On certain vehicles, simply adding the required gently sloping surfaces to the rear of the vehicle would result in a substantial increase in vehicle length. This length increase would be acceptable, in many cases, on the open road in uncongested traffic, but would be impractical on crowded urban roadways, in parking lots, in campgrounds, and by loading docks. To address this, certain embodiments of the present disclosure have two primary configurations. The first is an extended configuration that reduces drag and fuel consumption, especially at highway speeds. The second is a retracted configuration that provides much less, if any, drag reduction but results in a more compact vehicle that is practical in crowded areas. This combination of configurations in the same apparatus is especially useful since zones of higher speed traffic are often not congested. These high-speed zones are also where the drag reducing potential is the highest. Likewise, congested areas often have reduced traffic speed with less drag reducing potential, but in these cases, the retracted configuration may be required for maneuvering.

In order to easily and conveniently transform the drag reducing apparatus between the retracted configuration and the extended configuration, one or more flexible sheet-like exterior covers are held between a first end and a second end. The first end of the exterior cover can be directly or indirectly attached to the vehicle, and the second end of the exterior cover can be attached to a moveable end member (e.g., a moveable end frame). The exterior cover can be medially attached to one or more moveable intermediate members. The moveable intermediate members can take the form of a frame, a hoop, a support piece, a panel, a rod, a tube, a strap, a holder, etc. In embodiments using moveable intermediate members, a first moveable intermediate member (or first set of moveable intermediate members) is supported from the vehicle by a first set of linkages (e.g., a support linkage and/or a driving linkage) providing support and/or position control for the first moveable intermediate member. Additional moveable intermediate members can be used and can be held by additional sets of links and/or linkages. Each additional set of links and/or linkages can connect its corresponding moveable intermediate member to the moveable intermediate member preceding it. The moveable end member can be similarly supported/held/connected by an additional set of links and/or linkages to the moveable intermediate member preceding it. In embodiments not using moveable intermediate members, the moveable end member is directly or indirectly connected to the vehicle by the set of linkages (e.g., the support linkage and/or the driving linkage). In certain embodiments, the first end of the exterior cover is held in a hoop shaped configuration by the vehicle or a member attached to the vehicle. In certain embodiments, the second end of the exterior cover is held in a hoop shaped configuration by the moveable end member attached to the second end of the exterior cover.

The moveable end member can be extended and/or retracted by the driving linkage (e.g. a scissors linkage). The moveable end member can be vertically supported by support linkages (e.g. bi-fold linkages). In embodiments using one or more moveable intermediate members, the moveable intermediate members can be extended and/or retracted by the driving linkage (e.g. the scissors linkage) and can be vertically supported by support linkages (e.g. the bi-fold linkages).

The moveable members (i.e., the moveable end member and, if used, the moveable intermediate members) can be extended, retracted, and vertically supported by the driving linkage in combination with a tension member. By arranging the driving linkage to support compressive loads and the tension member to support tensile loads, a triangular structure (i.e., a load carrying triangle) can be formed with the driving linkage forming a first side of the triangle, the tension member forming a second side of the triangle, and either the vehicle or an attachment member attached to the vehicle forming a third side of the triangle. By changing lengths of the tension member, the driving linkage, or both the tension member and the driving linkage, the load carrying triangle's shape is changed and can thereby extend and retract the apparatus. For example, by lengthening both the driving linkage and the tension member, the apparatus can be extended, and by shortening both the driving linkage and the tension member, the apparatus can be retracted. To arrange the driving linkage to support compressive loads, the driving linkage is preferably pivotally attached to the vehicle or the attachment member attached to the vehicle. In the extended configuration of the apparatus, the driving linkage extends rearward and preferably upward behind the vehicle. To arrange the tension member to support tensile loads, the tensile member is preferably attached to the vehicle or the attachment member attached to the vehicle and oppositely attached to the driving linkage. In the extended configuration of the apparatus, the tension member extends rearward and preferably downward behind the vehicle. The net load acting on the apparatus has a predominantly downward vertical component and thus causes compression in the driving linkage and tension in the tension member.

As the apparatus is extended and retracted and the load carrying triangle's shape changes, tensile loads are typically carried by the tension member and compressive loads are typically carried by the driving linkage. When the apparatus is fully extended, a portion or substantially all of the tensile loads can be transferred from the tension member to the exterior cover, and additional compressive loads can be generated by the driving linkage to apply additional tension to the exterior cover to keep the exterior cover taut. When the apparatus is fully retracted and/or nearly fully retracted, the load carrying triangle's shape can become flat or substantially flat and the apparatus can be substantially supported by tensile loads within the tension member. In such a flat or substantially flat configuration, compressive loads within the driving linkage can become negligible.

Means for limiting the motion of each moveable member can be provided. The motion of each moveable member is preferably limited to positions between its extended configuration position and its retracted configuration position. In certain embodiments, the support links and/or support linkages have joint stops for this purpose. In certain embodiments, one or more tensile load carrying members, such as a cord, a strap, or a chain, are attached to the moveable members and become taut when the moveable member has reached its extended configuration position. In certain embodiments, the exterior cover serves as the tensile load carrying member for this purpose. In certain embodiments, the driving linkage limits the motion of each moveable member or some of the moveable members.

Means for biasing the drag reducing apparatus to move toward either the extended configuration and/or the retracted configuration can be provided. In certain embodiments, the linkage (e.g., the support linkages and/or the driving linkage) can have one or more joints that are spring loaded for this purpose. This can include bi-stable joints (e.g., a joint with two detents) to move away from a central position and toward the extended configuration when near the extended configuration and toward the retracted configuration when near the retracted configuration. In other embodiments, the support linkage and/or the driving linkage can have flexible, spring elements that replace one or more joints. The spring elements can also bias the linkage in one or both directions.

In certain embodiments, gravity can be used to bias the apparatus to move toward the extended configuration, the retracted configuration, or both the extended and the retracted configurations. Such gravity biased embodiments typically have a center-of-gravity that is higher when the apparatus is between the extended and the retracted configurations at an intermediate configuration. Preferably, the center-of-gravity of the apparatus becomes continuously lower as the apparatus moves from the intermediate configuration to the fully extended configuration, and the center-of-gravity becomes continuously lower as the apparatus moves from the intermediate configuration to the fully retracted configuration.

Means for automatically extending and retracting the drag reducing apparatus can be provided. In certain embodiments, a retraction tension-member (e.g., a chain, a cable, a belt, a rope, a cord, etc.) is attached to an end moveable member and is reeled in by a pulley powered by a motor. In addition, the support linkages and/or the driving linkage are biased to extend the apparatus as mentioned in the preceding paragraph. Thus, operating the motor in a first direction overpowers the support linkage and/or driving linkage bias and retracts the apparatus while operating the motor in a second, opposite direction feeds the retraction tension-member outward and allows the biased (e.g., spring-loaded) support linkages and/or driving linkage to extend the apparatus.

In certain embodiments, the driving linkage is a scissors linkage, and the tension-member can be routed through the scissors linkage and pull vertices of the scissors linkage together. By pulling the vertices of the scissors linkage together, the scissors linkage expands (i.e., lengthens) and can extend the drag reducing apparatus. The same tension-member can both pull the vertices of the scissors linkage, causing extension, and retract (i.e., compress) the scissors linkage. The routing of the tension-member can be such that moving the tension-member in a first direction expands the scissors linkage and thus the apparatus, and moving the tension-member in a second direction retracts the scissors linkage and thus the apparatus.

In embodiments filling a gap, bearing loads from across the gap can retract the extension biased apparatus. In this case, movement of the vehicle causing at least a portion of the gap to become smaller can cause portions of the vehicle to bear against the apparatus and overpower the extension bias thus causing the apparatus to retract (e.g., a corner of the semi-trailer can reduce the gap and bear against the apparatus during a sharp turn causing it to retract). In this case, the extension bias returns the apparatus to the extended configuration as the gap expands (e.g., upon returning to a straight course, the corner of the semi-trailer restores the gap and the extension bias extends the apparatus). Outwardly biasing the support linkage and/or driving linkage is one method of outwardly biasing the apparatus. Other methods include pressurized air within the apparatus, an extension spring between the apparatus' ends, and combinations of these and other methods.

In an alternative embodiment, the scissors linkage is biased to retract the apparatus which can be extended by partial vacuum created by vehicle movement operating on the exterior covers. In addition to or separately from the partial vacuum, a positive pressure can be created within the apparatus by a forward opening into oncoming airflow. The forward opening converts dynamic pressure of the oncoming airflow into static pressure within the apparatus, thus extending the apparatus. In another alternative embodiment, the retraction biased apparatus is extended by compressed air fed within the apparatus. In embodiments filling a gap, tension members (e.g., cables and/or stretchable cords) can extend the retraction biased apparatus. In this case, the tension members pull to extend the apparatus from across the gap and may be tensioned by a motor, cable tensioning springs, the stretchable cord itself, or other means.

In certain embodiments, the driving linkage (e.g., a scissor linkage) is provided to extend and/or retract the apparatus. The example scissor linkage may be actuated by an actuator that causes the scissor linkage to extend and retract, thus extending and retracting the apparatus. The actuator may include a drive that directly moves certain points of the scissor linkage. Such a drive may include a screw and nut assembly. Other such drives may include a belt and pulley arrangement. The scissor linkage may be extended by routing a tension-member (e.g., a cable, a belt, a chain, etc.) between various joints and/or points of the scissor linkage. A motor may retract the tension-member, drawing certain of the joints and/or points together thus extending the scissor linkage. In embodiments where a tension-member extends the scissor linkage, the same tension-member or another tension-member may retract the apparatus by pulling part of the apparatus toward the retracted configuration.

To accommodate vehicles where access to the rear end is required, certain embodiments of the present disclosure allow the apparatus to be temporarily moved without removal from the vehicle. In certain embodiments, a single whole apparatus is mounted on a support panel, door, framework, etc. that in turn is mounted on a hinge, linkage, linear slide, etc. Other embodiments have the overall drag-reducing shape split into two halves. These halves can be mounted on hinges and opened, providing access to the rear of the vehicle. Optionally, the halves can be integrated with the rear doors of the vehicle.

In certain embodiments, the drag reducing apparatus can be stored in part or in whole underneath a cargo carrying area of a trailer. The driving linkages and/or support linkages can be mounted underneath the cargo carrying area and extend outwardly when the drag reducing apparatus is moved from the retracted to the extended configuration. The apparatus can be supported by a frame that is rotatably attached to the trailer. By swinging the frame, the apparatus can be stored underneath the cargo carrying area. The apparatus can be swung to the side of the trailer or can tuck under the rear end of the trailer.

The scissors linkage can take various forms including a ladder configuration wherein pairs of links of the scissors linkage are held together by cross-members that resemble rungs on a ladder. The links of the scissors linkage can take various forms including a form having a crank-like configuration.

BRIEF DESCRIPTION OF THE DRAWINGS

The benefits and advantages of the present disclosure will become more readily apparent to those of ordinary skill in the relevant art after reviewing the following detailed description and accompanying drawings, wherein:

FIGS. 1 through 70 illustrate aerodynamic drag reducing apparatuses adapted for use behind a sports-utility vehicle including various scissors linkages. In particular:

FIGS. 1 through 4 illustrate the apparatuses of FIG. 1 in a fully extended configuration mounted behind the sports-utility vehicle together with an adapter fairing. In particular:

FIG. 1 is a rear right perspective view.

FIG. 2 is a right side elevation view.

FIG. 3 is a partial top plan view.

FIG. 4 is a rear elevation view.

FIGS. 5 through 24 illustrate a first apparatus of FIG. 1, removed from the sports-utility vehicle, including a scissors linkage actuated by a belt driven rail-cam follower mechanism. In particular:

FIGS. 5 through 9 illustrate the first apparatus of FIG. 5 in the fully extended configuration. In particular:

FIG. 5 is a front left perspective view.

FIGS. 6 through 9 illustrate the apparatus of FIG. 5 with an exterior cover removed for viewing clarity. In particular:

FIG. 6 is a right rear perspective view.

FIG. 7 is a right side elevation view.

FIG. 8 is a top plan view.

FIG. 9 is a front plan view.

FIGS. 10 through 13 illustrate the first apparatus of FIG. 5 in a partially extended configuration with the exterior cover removed for viewing clarity. In particular:

FIG. 10 is a right rear perspective view.

FIG. 11 is a right side elevation view.

FIG. 12 is a top plan view.

FIG. 13 is a front plan view.

FIGS. 14 through 17 illustrate the first apparatus of FIG. 5 in a fully retracted configuration with the exterior cover removed for viewing clarity. In particular:

FIG. 14 is a right rear perspective view.

FIG. 15 is a right side elevation view.

FIG. 16 is a top plan view.

FIG. 17 is a front plan view.

FIGS. 18 through 24 illustrate the first apparatus of FIG. 5 with a right support linkage, the exterior cover, and portions of all but a first hoop frame removed for viewing clarity. In particular:

FIGS. 18 and 19 are right rear perspective views. In particular:

FIG. 18 is with the apparatus in the fully extended configuration.

FIG. 19 is with the apparatus in the partially extended configuration.

FIGS. 20 and 21 are with the apparatus in the partially extended configuration. In particular:

FIG. 20 is a right side elevation view.

FIG. 21 is a partial top plan view.

FIG. 22 through 24 are with the apparatus in the fully retracted configuration. In particular:

FIG. 22 is a right rear perspective view.

FIG. 23 is a right side elevation view.

FIG. 24 is a top plan view.

FIGS. 25 and 26 illustrate the second apparatus of FIG. 25 in the fully extended configuration. In particular:

FIG. 25 is a right rear perspective view.

FIG. 26 is a right side elevation view.

FIGS. 27 and 28 illustrate the second apparatus of FIG. 25 in the partially extended configuration. In particular:

FIG. 27 is a right rear perspective view.

FIG. 28 is a right side elevation view.

FIGS. 29 and 30 illustrate the second apparatus of FIG. 25 in the fully retracted configuration. In particular:

FIG. 29 is a right rear perspective view.

FIG. 30 is a right side elevation view.

FIGS. 31 through 42 alternate between a third apparatus of FIG. 1 and an isolated tension-member of the figure immediately preceding it (e.g., FIG. 32 illustrates the tension-member of FIG. 31 in isolation). The included odd numbered figures illustrate the third apparatus of FIG. 31, removed from the sports-utility vehicle with the right support linkage, the exterior cover, and the portions of the hoop frames removed for viewing clarity, including a scissors linkage actuated by a tension-member drive. In particular:

FIGS. 31 through 34 illustrate the third apparatus of FIG. 31 in the fully extended configuration. In particular:

FIGS. 31 and 32 are rear right perspective views.

FIGS. 33 and 34 are right rear perspective views.

FIGS. 35 through 38 illustrate the third apparatus of FIG. 31 in the partially extended configuration. In particular:

FIGS. 35 and 36 are rear right perspective views.

FIGS. 37 and 38 are right rear perspective views.

FIGS. 39 through 42 illustrate the third apparatus of FIG. 31 in the fully retracted configuration. In particular:

FIGS. 39 and 40 are rear right perspective views.

FIGS. 41 and 42 are right rear perspective views.

FIG. 45 is a non-exploded view.

FIG. 46 is an exploded view.

FIGS. 47 through 52 alternate between a fourth apparatus of FIG. 1, in the fully extended configuration, and an isolated tension-member of the figure immediately preceding it (e.g., FIG. 48 illustrates the tension-member of FIG. 47 in isolation). The included odd numbered figures illustrate the fourth apparatus of FIG. 47, removed from the sports-utility vehicle with the exterior cover in phantom line for viewing clarity, including a scissors linkage actuated by a tension-member drive. In particular:

FIGS. 47 and 48 are right rear perspective views.

FIGS. 49 and 50 are left front underside perspective views.

FIGS. 51 and 52 are right side cross-sectional elevation views.

FIGS. 54 through 63 are cross-sectional views that alternate between the fourth apparatus of FIG. 47 and an isolated tension-member of the figure immediately preceding it (e.g., FIG. 55 illustrates the tension-member of FIG. 54 in isolation). The included even numbered figures illustrate the fourth apparatus of FIG. 47, removed from the sports-utility vehicle with the exterior cover removed for viewing clarity. In particular:

FIGS. 54 and 55 are right rear perspective views with the apparatus in a partially extended configuration.

FIGS. 56 and 57 are right side elevation views with the apparatus in a partially extended configuration.

FIGS. 58 through 61 are right rear perspective views. In particular:

FIGS. 58 and 59 are with the apparatus in a near-retracted configuration.

FIGS. 60 and 61 are with the apparatus in the fully retracted configuration.

FIGS. 62 and 63 are right side elevation views with the apparatus in the fully retracted configuration.

FIG. 64 is a partial right side cross-sectional elevation view illustrating a boost cam and a boost cam follower overlaid with a cam link and a pivot bracket in the configuration of FIG. 62.

FIGS. 67 through 70 are views of the fourth apparatus of FIG. 47 in the partially extended configuration with the exterior cover and portions of an attachment member removed for viewing clarity. In particular:

FIG. 67 is a left rear perspective view.

FIG. 68 is an enlarged partial view of a portion of FIG. 67 illustrating a portion of a joint of the scissors linkage.

FIG. 69 is a cross-sectional view from above through the joint of FIG. 68.

FIG. 70 is an enlarged partial view of a portion of FIG. 69 illustrating the portion of the joint of FIG. 68.

FIGS. 71 through 96 illustrate aerodynamic drag reducing apparatuses, including scissors linkages, adapted for use across gaps in and behind a semi-trailer truck. In particular:

FIGS. 71 and 72 illustrate the apparatuses of FIG. 71 in fully extended configurations. A rear-mounted apparatus is mounted behind a trailer of the semi-trailer truck, and a gap filling apparatus is mounted between a tractor and the trailer of the semi-trailer truck. In particular:

FIG. 71 is a left front perspective view.

FIG. 72 is a right rear perspective view.

FIGS. 73 through 78 illustrate the rear-mounted apparatus of FIG. 71 in the fully extended configuration. In particular:

FIGS. 73 through 75 show the apparatus removed from the trailer of FIG. 71. In particular:

FIG. 73 is a front right perspective view with right and left scissors linkages visible within an exterior cover.

FIGS. 74 and 75 are partial perspective views with the right scissors linkage and the exterior cover removed for clarity. In particular:

FIG. 74 is a view from the front right.

FIG. 75 is a view from the right front with an end panel of the apparatus cut-away.

FIGS. 76 through 78 are partial views showing the apparatus attached to the trailer of FIG. 71 with the exterior cover shown in phantom line for viewing clarity. In particular:

FIG. 76 is a left rear perspective view.

FIG. 77 is a cross-sectional left elevation view.

FIG. 78 is a left elevation view.

FIGS. 79 through 87 are partial views illustrating the rear-mounted apparatus of FIG. 71, with the exterior cover removed for viewing clarity, attached to the trailer. In particular:

FIGS. 79 through 81 show the apparatus in a partially extended configuration. In particular:

FIG. 79 is a left rear perspective view.

FIG. 80 is a cross-sectional left elevation view.

FIG. 81 is a left elevation view.

FIGS. 82 through 84 show the apparatus in a fully retracted configuration. In particular:

FIG. 82 is a left rear perspective view.

FIG. 83 is a left elevation view.

FIG. 84 is a cross-sectional left elevation view.

FIGS. 85 through 87 show the apparatus in a configuration allowing access to the trailer's rear end. In particular:

FIG. 85 is a left rear perspective view.

FIG. 86 is a rear elevation view.

FIG. 87 is a cross-sectional rear elevation view.

FIGS. 88 through 90 are perspective views illustrating the left scissors linkage of FIG. 73 in the partially extended configuration of FIG. 79. In particular:

FIGS. 88 and 89 are views from the left rear. In particular:

FIG. 88 shows scissor links including a link body and a drive and scissor links including a crank.

FIG. 89 shows the drives and shows the scissor links including the crank of FIG. 88 but removes the link body of the scissor links including the drive for viewing clarity.

FIG. 90 is an exploded view from the rear left.

FIG. 91 is a perspective view of the scissor link including the crank of FIG. 88.

FIG. 92 is a perspective view of the link body of FIG. 88.

FIG. 93 is a perspective view of the drive of FIG. 88.

FIG. 94 is a rear left perspective view of another drag reducing apparatus of FIG. 71 wherein the right and left scissors linkages fold flat.

FIG. 95 is a left side cross-sectional elevation view of the drag reducing apparatus of FIG. 94.

FIG. 96 is a perspective view of the left scissors linkage of FIG. 94 shown folded flat.

DETAILED DESCRIPTION

Figure 5:
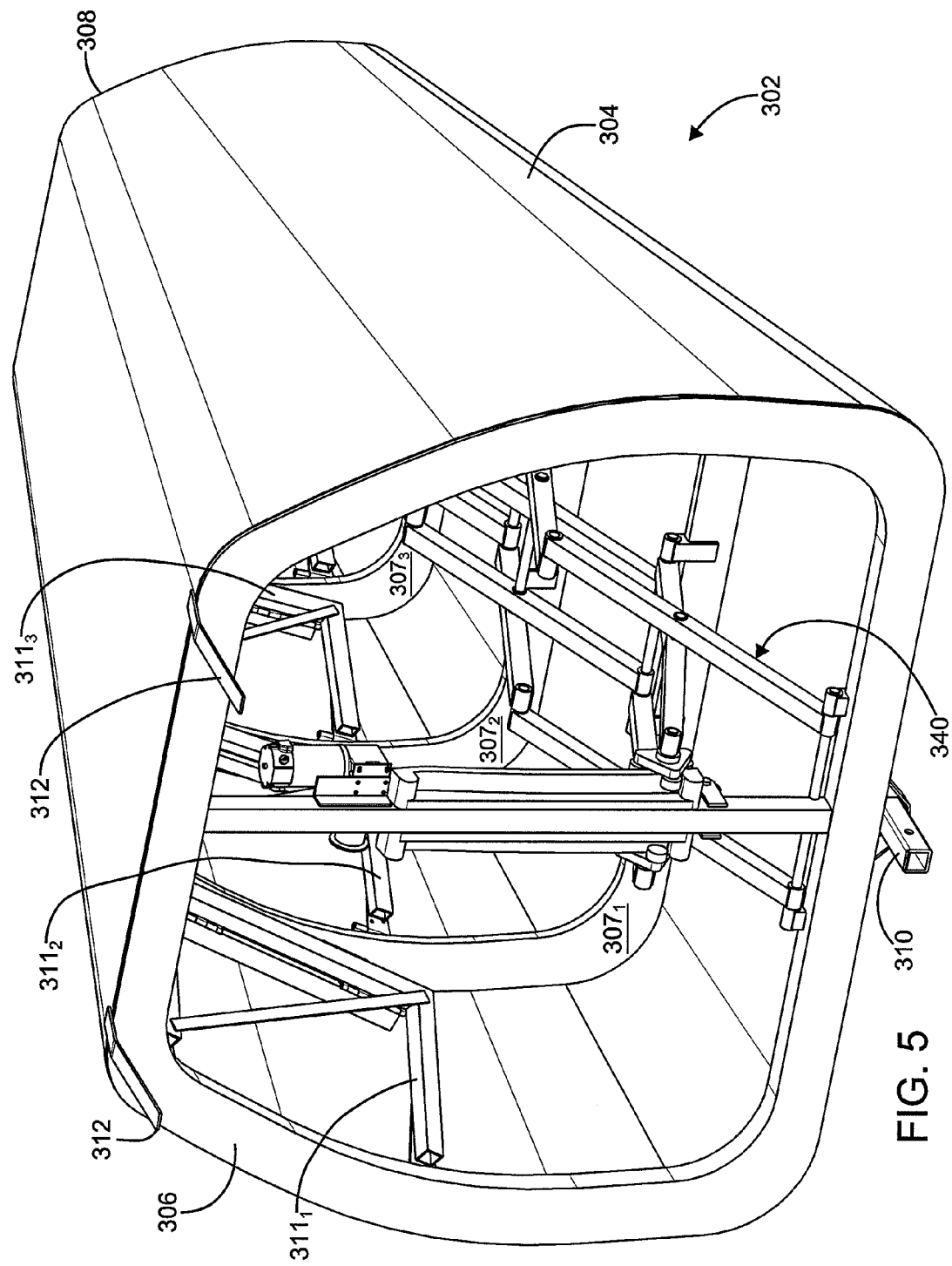
Figure 12:
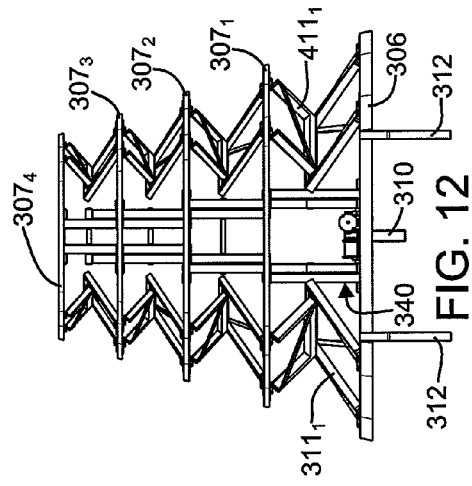
Figure 13:
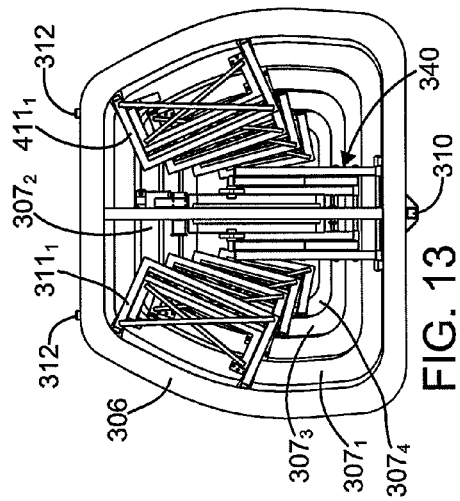
Figure 10:
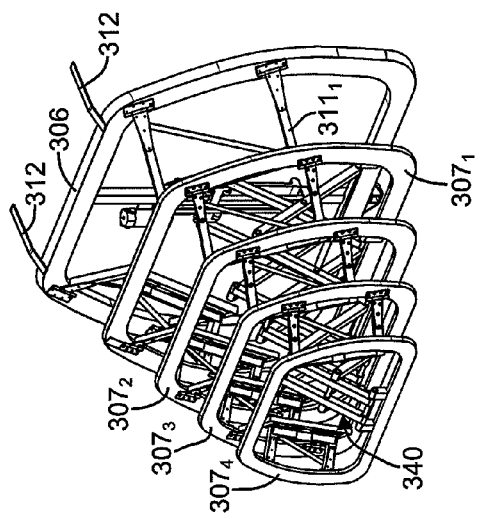
Figure 11:
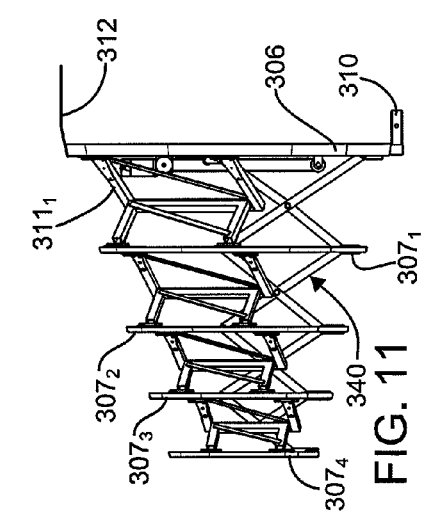
Figure 14:
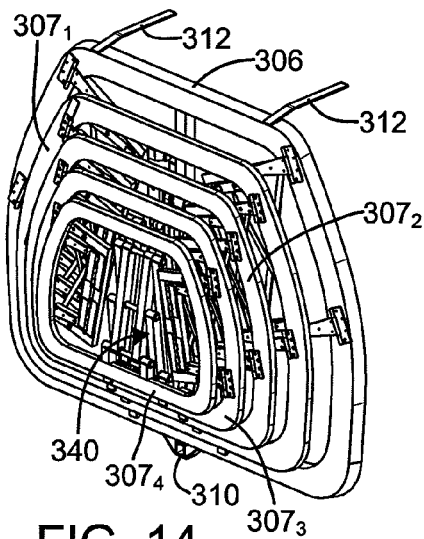
Figure 16:
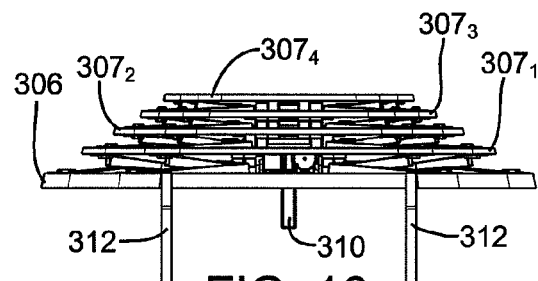
Figure 15:
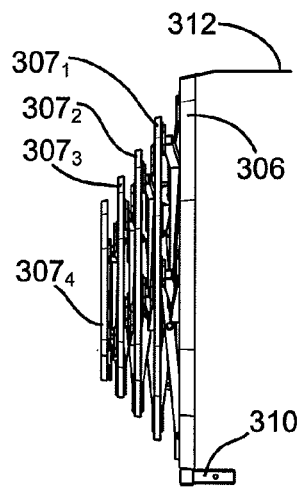
Figure 17:
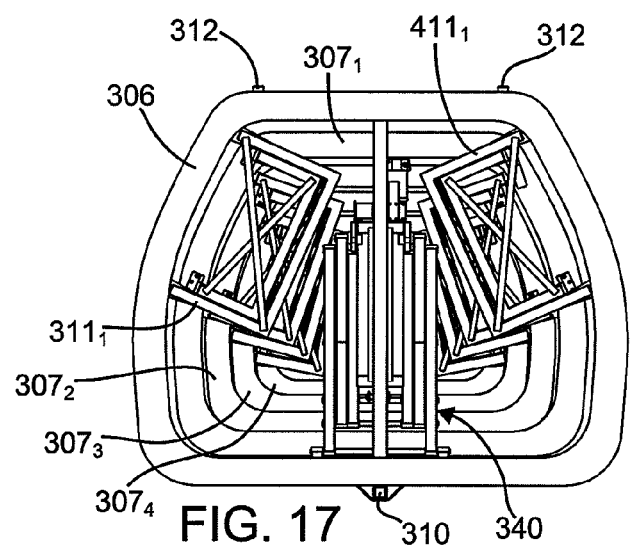

While the present disclosure is susceptible of embodiment in various forms, there are shown in the drawings and will hereinafter be described presently preferred embodiments with the understanding that the present disclosure is to be considered an exemplification of the invention and is not intended to limit the invention to the specific embodiments illustrated.

The embodiments presented are also shown in various forms and shapes and with various optional features. These variations also are exemplifications of the disclosure and are not intended to limit the combinations of forms, shapes, and optional features.

In the present disclosure, the term "vehicle" or "vehicles" can broadly refer to vehicles, trailers, aircraft, water craft, and other bodies that have relative movement with a fluid and are subject to aerodynamic and/or hydrodynamic drag.

The aerodynamic performance and efficiency of certain over-the-road vehicles can be significantly improved by adding streamlining surfaces to the vehicle's rear. In particular, vehicles with blunt rear ends, such as certain trucks, trailers 101, and sports-utility-vehicles 201 have potential for improved aerodynamics. Adding an aerodynamic drag reducing apparatus 102 behind the trailer 101 of a semi-trailer truck 100 will reduce aerodynamic drag and improve aerodynamic performance (see FIGS. 71 and 72). Adding an aerodynamic drag reducing apparatus 202 or 302 behind the sports-utility vehicle 201 will reduce aerodynamic drag and improve aerodynamic performance (see FIGS. 1-4).

The aerodynamic performance and efficiency of certain vehicles can be significantly improved by filling gaps along the vehicle's length. For example, vehicles with trailers, such as the semi-trailer truck 100 typically have a gap G present between a tractor unit 110 and the semi-trailer 101. Filling the gap G with relatively smooth streamlining surfaces, such as a gap filling aerodynamic drag reducing apparatus 105, will reduce aerodynamic turbulence and improve aerodynamic performance of the semi-trailer truck 100 (see FIGS. 71 and 72).

Certain vehicles, such as the typical semi-trailer truck 100, can benefit both from adding streamlining surfaces to the rear of the vehicle (e.g., the aerodynamic drag reducing apparatus 102) and by filling gaps along the length of the vehicle (e.g. with the gap filling aerodynamic drag reducing apparatus 105). Certain vehicles, such as the typical semi-trailer truck 100, can benefit from adding streamlining surfaces to the rear of the vehicle (e.g., the aerodynamic drag reducing apparatus 102), by filling gaps along the length of the vehicle (e.g. with the gap filling aerodynamic drag reducing apparatus 105), and by adding trailer skirts (e.g., trailer skirts 190R, 190L, 192R, and/or 192L) to the trailer 101 (see FIGS. 71 and 72).

The example aerodynamic drag reducing apparatuses 102, 103, 202, 302 of the present disclosure are suitable for use behind certain trailers 101 and vehicles 201 with vertical or near vertical rearward facing surfaces. Other aerodynamic/hydrodynamic drag reducing apparatuses based on the broad principles of the present disclosure can be applied to other vehicles including panel trucks, van trucks, station wagons, trucks without a separable trailer, tanker trucks, tanker trailers, motor homes, busses, sedan deliveries, aircraft, airplanes, helicopters, watercraft, boats, submarines, etc. Other objects, with relative motion to a fluid, can also employ drag reducing apparatuses based on the principles of the present disclosure. For example, an anchored buoy can be fitted with a deployable drag reducing apparatuses as it has water currents and wind that move past it from time to time. A windsock can employ principles of the present disclosure as prevailing winds flow past the windsock.

The vehicles and other objects to be fitted with drag reducing apparatuses can have a rectangular cross-section, such as the semi-trailer 101, or can have a non-rectangular cross-section, such as the tanker trailers and the sports-utility-vehicle 201. The drag reducing apparatuses, including apparatuses 102, 103, 105, 202, 302, serve to streamline the objects, including the vehicles 100, 101, 201, when in an extended configuration as shown at FIGS. 1-4, 71, and 72. When desired, the aerodynamic drag reducing apparatus 102, 103, 105, 202, 302 can transform into a retracted configuration to save space and/or to provide clearance as shown at FIGS. 14-17, 60, 62, 82-87, 94, and 95. The ability to form two configurations and transform from one to the other without disassembly is facilitated by one or more moveable members 108, 207, 208, 307, 308 (e.g., a moveable panel, frame, hoop, rod, tube, etc.). Each moveable member 108, 207, 208, 307, 308 is supported and/or positioned by one or more sets of linkages 140R, 140L, 240, 311, 340, 411. The moveable members 108, 207, 208, 307, 308 support one or more exterior covers 104, 204, 304. The exterior covers 104, 204, 304 preferably provide a gently sloping drag reducing surface when the drag reducing apparatus 102, 103, 105, 202, 302 is in the extended configuration.

The present disclosure concerns an aerodynamic drag reducing apparatus 105 suitable for use with certain vehicles 100 having one or more gaps G along the vehicle's 100 length (see FIGS. 71 and 72). The aerodynamic drag reducing apparatus 105 serves to streamline the vehicle 100, especially when the vehicle 100 is in a straight configuration, as shown at FIGS. 71 and 72, by filling the gap G. When the vehicle 100 is not in the straight configuration, such as when in a turn or starting up a ramp, portions of the gap G may become smaller. The apparatus 105 accommodates the changing gap G by retracting as needed. Upon the vehicle 100 returning to the straight configuration, the apparatus 105 extends and again fills the gap G. The ability to flexibly conform to the changing gap G is made possible by the use of one or more moveable members and linkages, as disclosed in the present disclosure. The one or more moveable members support one or more exterior covers. The exterior cover(s) provides a filling surface for the gap G and can also provide a transition between the varying shapes of the tractor unit 110 and the semi-trailer 101. Preferably, the cover provides a smooth, gently sloping transition between the tractor unit 110 and the semi-trailer 101. The shapes of the tractor unit 110, the semi-trailer 101, and the apparatus 105 can be designed together in an optimized, complementary, and integrated design.

In certain embodiments, illustrated at FIGS. 1-46, an attachment member 306 (e.g., an attachment frame, an attachment hoop, fasteners, clips, etc.) joins the drag reducing apparatus 302 to the vehicle 201 by serving as a connection point for the first set of support linkages $311_1$, $411_1$. In addition, the attachment member 306 is connected to or integrated with the vehicle 201. In an example embodiment, illustrated at FIG. 5, a mounting post 310 can be mounted in a hitch receiver of the vehicle 201 and a set of mounting straps 312 can be mounted to a luggage rack of the vehicle 201. In certain embodiments, a first end of the exterior cover 304 is attached to an adapter fairing 305 placed between the vehicle 201 and the drag reducing apparatus 302. The first end of the exterior cover 304 can be attached to the attachment member 306, the adapter fairing 305, or both. The exterior cover 304 can be attached to some or all of the moveable members $307_{1-4}$. A second end of the exterior cover 304 can be attached to the moveable end member 308. In the present example embodiment, the moveable member $307_4$ and the moveable end member 308 can be combined and/or attached, and the moveable intermediate members $307_{1-3}$ are positioned between the attachment member 306 and the moveable end member 308. The driving linkage 340 is connected to the attachment member 306 and the moveable member $307_4$ that is attached to the moveable end member 308. In certain embodiments, the driving linkage 340 is also connected to the moveable intermediate members $307_{1-3}$.

In certain embodiments, illustrated at FIGS. 1-4 and 47-70, an attachment member 206 (e.g., an attachment frame, an attachment hoop, fasteners, clips, etc.) joins the drag reducing apparatus 202 to the vehicle 201 by serving as a connection point for the driving linkage 240. In addition, the attachment member 206 is connected to or integrated with the vehicle 201. In an example embodiment, illustrated at FIG. 49, a mounting post 210 can be mounted in a hitch receiver of the vehicle 201 and a set of mounting straps 212 can be mounted to a luggage rack of the vehicle 201. In certain embodiments, the exterior cover 204 is attached to an adapter fairing 305 placed between the vehicle 201 and the drag reducing apparatus 202. The exterior cover 204 can be attached to the attachment member 206, the adapter fairing 305, one or more moveable intermediate members $207_{1-5}$, and/or the moveable end member 208. The exterior cover 204 can be sandwiched and clamped between the attachment member 206 and a cover clamp 205. The cover clamp 205 can serve as a mounting bracket for the adapter fairing 305. The moveable intermediate members $207_{1-5}$ are positioned between the attachment member 206 and the moveable end member 208. The driving linkage 240 is connected to the attachment member 206 and the moveable member 208. The driving linkage 240 is also connected to the moveable intermediate members $207_{1-5}$. An end mount 247 can connect the scissors linkage 240 with the moveable end member 208 (see FIG. 62).

In the example drag reducing apparatuses 202 and 302, the attachment members 206 and 306 are generally positioned vertically and the adapter fairing 305 blends in with non-vertical surfaces near the vehicle's 201 rear-end. In other embodiments, similar drag reducing apparatuses can directly blend in to the vehicle 201 or another vehicle with a non-vertical rear-end. In such embodiments, an exterior cover can be attached directly to the vehicle 201 or another vehicle thus eliminating the need for an adapter fairing. The rear-end of the vehicle 201 is near-vertical and thus the fairing's 305 forward end is also near-vertical. In other embodiments, rearward surfaces of a vehicle need not be near-vertical to blend in with a drag reducing apparatus made according to principles of the present disclosure. The non-near-vertical surfaces of such vehicles can be blended to such drag reducing apparatuses by an adapter fairing or directly to an exterior cover of such apparatuses.

Figure 76:
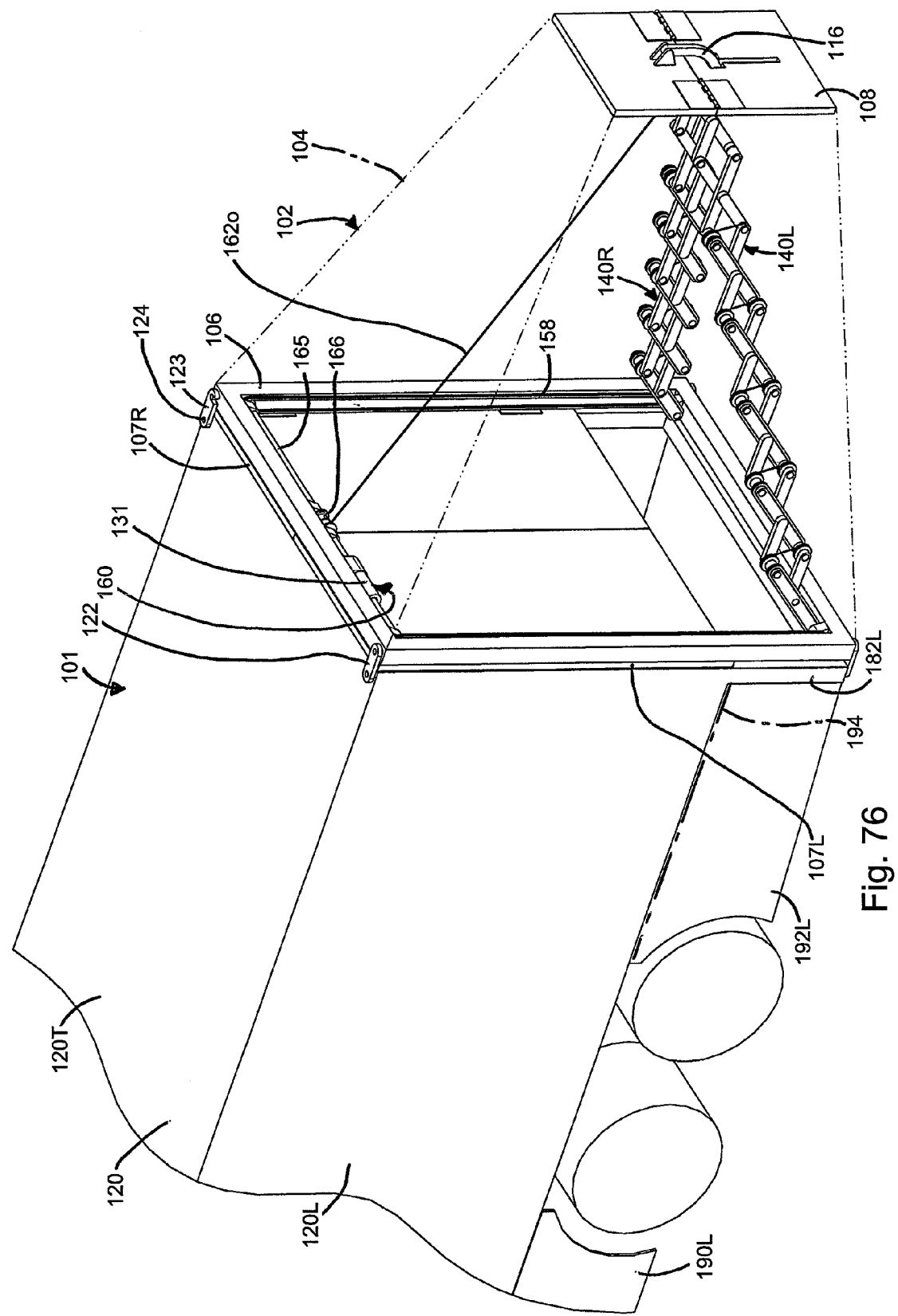

In certain embodiments, illustrated at FIGS. 71-96, an attachment member 106 (e.g., an attachment frame, an attachment hoop, fasteners, clips, etc.) joins the drag reducing apparatus 102, 103 to the vehicle 101 (e.g., the trailer 101) by serving as a connection point for the driving linkages 140R and 140L. In addition, the attachment member 106 is connected to or integrated with the vehicle 101. In an example embodiment, illustrated at FIGS. 73, 76, and 85, the attachment member 106 is configured as an attachment frame with a vertical right member 106R, a vertical left member 106L, a horizontal top member 106T, and a horizontal bottom member 106B. The attachment member 106 can include mounting pins 121. A pair of links 122 can be rotatably connected to a co-axial pair of the mounting pins 121 and to a pair of co-axial mounting pins 124 attached to the trailer 101. The pair of links 122 and the associated rotatable connections can from a compound hinge that enables the attachment member 106 to be swung from the rear (see FIG. 82) to the side (see FIG. 85) of the trailer 101. A pair of latching links 123 can also be provided to hold the attachment member 106 to the trailer 101. By swinging the apparatus 102 to the side of the trailer 101 at least a portion of the apparatus 102 can be stored underneath a trailer box 120 of the trailer in a stowage area 109 (see FIGS. 86 and 87). The stowage area 109 is typically defined by a bottom side 120B of the trailer box 120 which bounds the top of the stowage area 109. The stowage area 109 extends forward to the rearmost wheel of the trailer.

The trailer 101, illustrated at FIGS. 71, 72, and 76-87 includes the trailer box 120 with a top side 120T, the bottom side 120B, a right side 120R, and a left side 120L. At the rear of the trailer 101, a frame 180 is typically positioned. The frame 180 typically includes a horizontal member 184 supported by a right vertical member 182R and a left vertical member 182L. Such frames 180 often serve as safety devices and engage a bumper of a passenger car if the passenger car should collide with the rear end of the trailer 101. By engaging the bumper of the car, the car is at least somewhat held from sliding under the bottom side 120B of the trailer box 120. The frame 180 can be used to support the drag reducing apparatus 102. The frame 180 can directly support the linkages 140R, 140L of the apparatus or can support the attachment member 106 of the preceding paragraph. The frame 180 can be set in from the rear of the trailer box 120 thereby allowing the apparatus 102 to partially or substantially fit underneath the trailer box 120.

Figure 85:
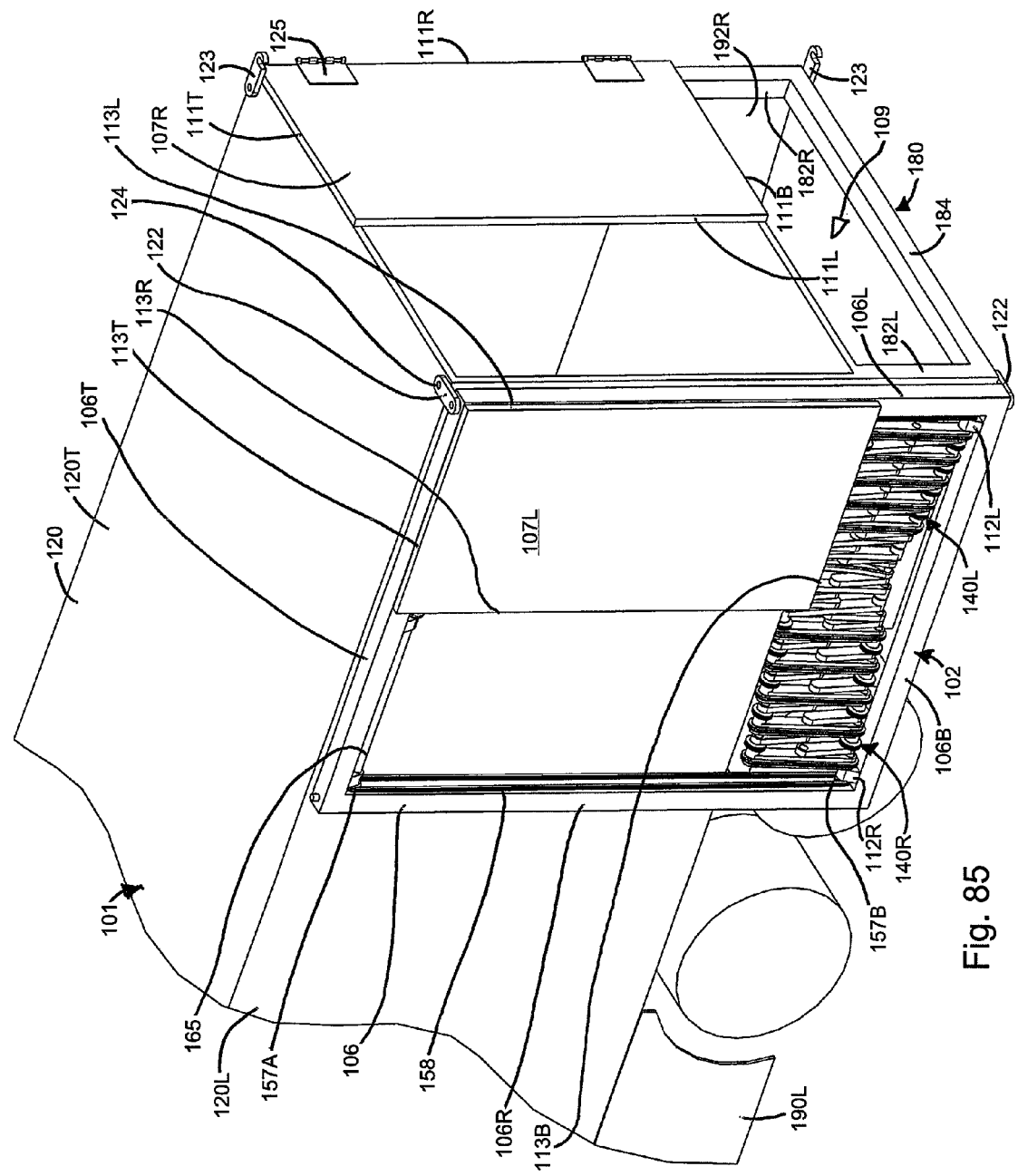
Figure 88:
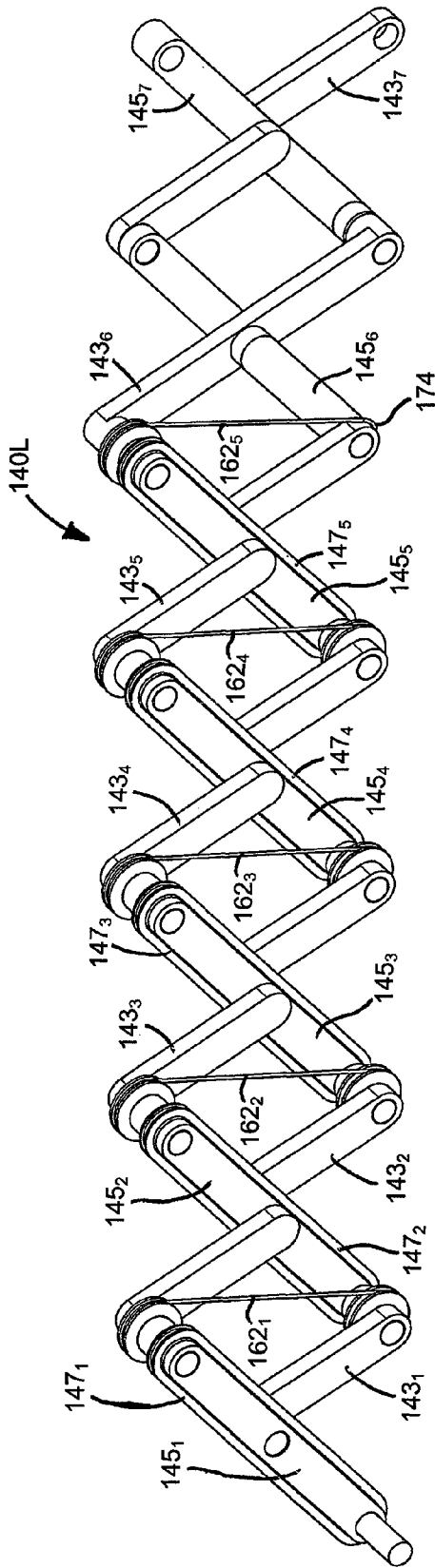
Figure 89:
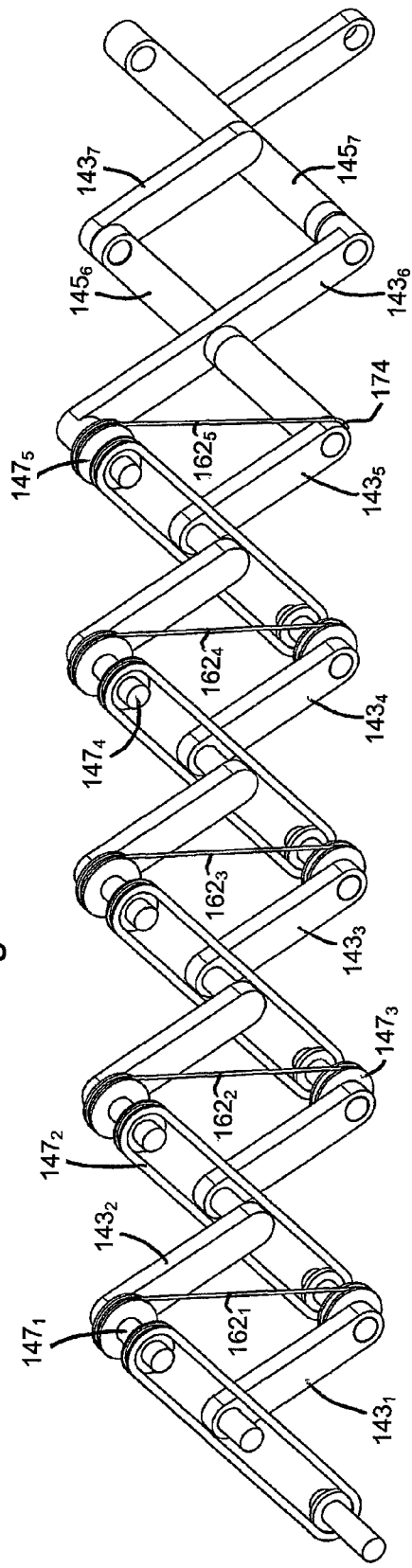

The trailer 101 can further include trailer skirts 190R, 190L, 192R, 192L that further streamline the trailer 101. The trailer skirt 192L can be rotatably mounted to the trailer about hinge-line 194 (see FIG. 76). When the apparatus 102 is swung to the side of the trailer 101 as illustrated at FIG. 85, the trailer skirt 192L can fold out of the way (see FIGS. 86 and 87).

In certain embodiments, the exterior cover 204 is attached to an adapter fairing 305 placed between the vehicle 201 and the drag reducing apparatus 202. The exterior cover 204 can be attached to the attachment member 206, the adapter fairing 305, one or more moveable intermediate members $207_{1-5}$, and/or the moveable end member 208. The exterior cover 204 can be sandwiched and clamped between the attachment member 206 and a cover clamp 205. The cover clamp 205 can serve as a mounting bracket for the adapter fairing 305. The moveable intermediate members $207_{1-5}$ are positioned between the attachment member 206 and the moveable end member 208. The driving linkage 240 is connected to the attachment member 206 and the moveable member 208. The driving linkage 240 is also connected to the moveable intermediate members $207_{1-5}$.

The moveable members 108, 208, 307, 308 and the attachment members 106, 206, 306 can take a variety of shapes conforming to or approximately conforming to a shape of the vehicle 101, 201 to which the drag reducing apparatus 102, 103, 105, 202, 302 is attached. For example, FIGS. 4-9, 43, and 44 illustrate the attachment member 306, the moveable intermediate members $307_{1-4}$, and the moveable end member 308 which conform to the shape of the sports-utility vehicle 201, and FIGS. 72-74 illustrate the moveable end member 108 which conforms to the shape of the semi-trailer truck 100. In other examples, moveable members approximately conform to a shape of an associated vehicle and are defined by a series of line segments and/or arcs around a perimeter that approximately matches the shape of the associated vehicle. As illustrated at FIGS. 71 and 72, the drag reducing apparatus 105 forms a transition between the shapes of the tractor unit 110 and the trailer 101. In such transitional embodiments where multiple moveable members are used, each successive moveable member could form a part of the transition. In certain embodiments, illustrated at FIGS. 4 and 47, the attachment member 206 and the moveable end member 208 conform to the shape of the sports-utility vehicle 201, but the moveable intermediate members $207_{1-5}$ only conform to a lower portion of the shape of the sports-utility vehicle 201. In such embodiments, the exterior cover 204 is held taut between the attachment member 206 and the moveable end member 208. The moveable intermediate members $207_{1-5}$ primarily hold the exterior cover 204 from drooping excessively when the drag reducing apparatus 202 is in the retracted configuration (e.g., to keep the exterior cover 204 from touching or dragging on the ground).

To provide an underlying shape and support for the exterior cover 304 that provides a gently sloping aerodynamic surface behind the vehicle 201, each moveable intermediate member $307_1, 307_2, 307_3, 307_4$ is sized progressively smaller than the preceding moveable intermediate member $307_1, 307_2, 307_3$ as illustrated at FIGS. 5 and 6. When in the extended configuration, the collective shape of the moveable intermediate members $307_1, 307_2, 307_3, 307_4$ along with the shape of the attachment member 306 and/or the adapter fairing 305 defines the overall exterior shape of the drag reducing apparatus 302. In certain embodiments, an angle, $\alpha$, is defined between a horizontal plane approximately at the top of the vehicle 201 and a top sloping surface of the drag reducing apparatus 302 as illustrated at FIG. 2. In certain embodiments the angle, $\alpha$, varies from zero degrees to about 25 degrees. In a preferred embodiment, the angle, $\alpha$, is between about 10 and about 15 degrees. Likewise, in certain embodiments, an angle, $\beta$, is defined between a horizontal plane approximately at the underside of the vehicle 201 and a bottom sloping surface of the drag reducing apparatus 302 as illustrated at FIG. 2. In certain embodiments the angle, $\beta$, varies from zero degrees to about 25 degrees. In other embodiments, the angle, $\beta$, is between zero and about 15 degrees, between about 5 degrees and about 15 degrees, or between about 10 degrees and about 15 degrees. In certain embodiments, an angle, $\gamma$, is defined between a vertical plane approximately at the side of the vehicle 201 and a side sloping surface of the drag reducing apparatus 302 as illustrated at FIG. 3. In certain embodiments the angle, $\gamma$, varies from zero degrees to about 25 degrees. In a preferred embodiment, the angle, $\gamma$, is between about 10 degrees and about 15 degrees.

Figure 77:
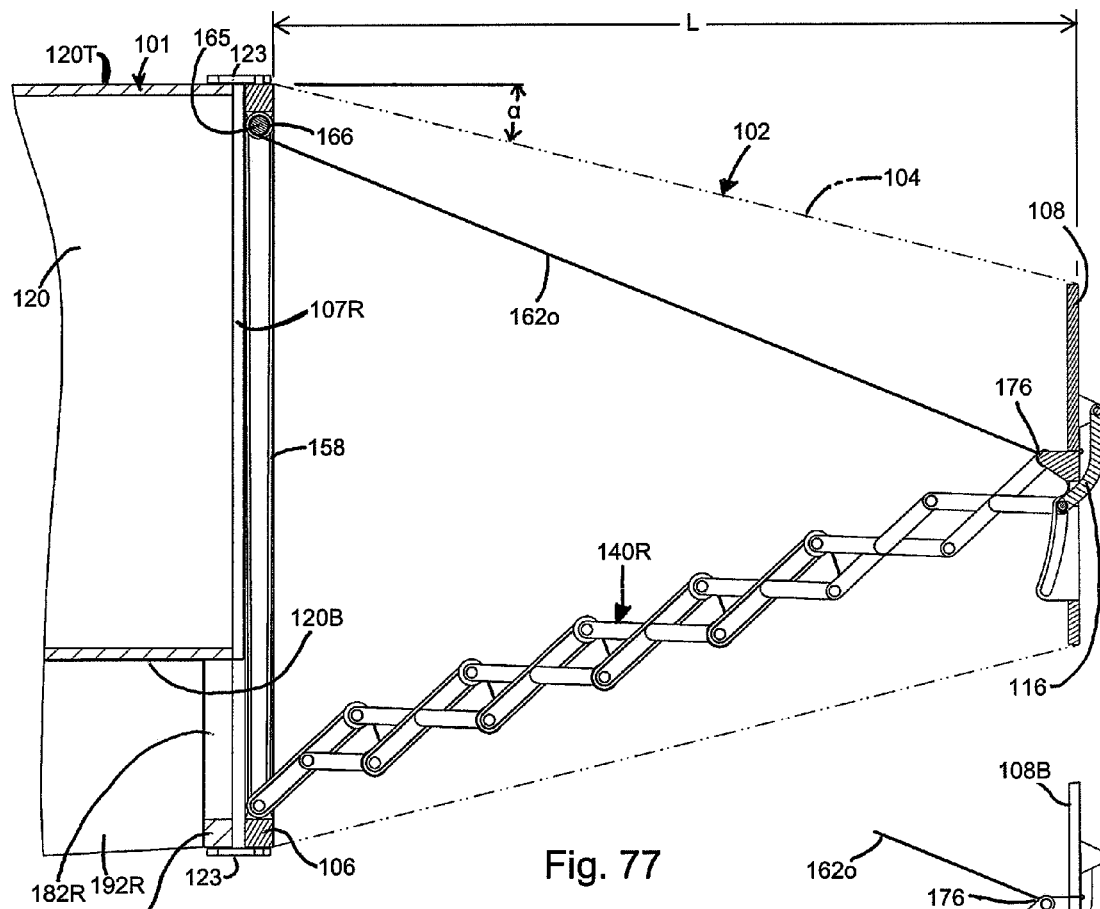
Figure 78:
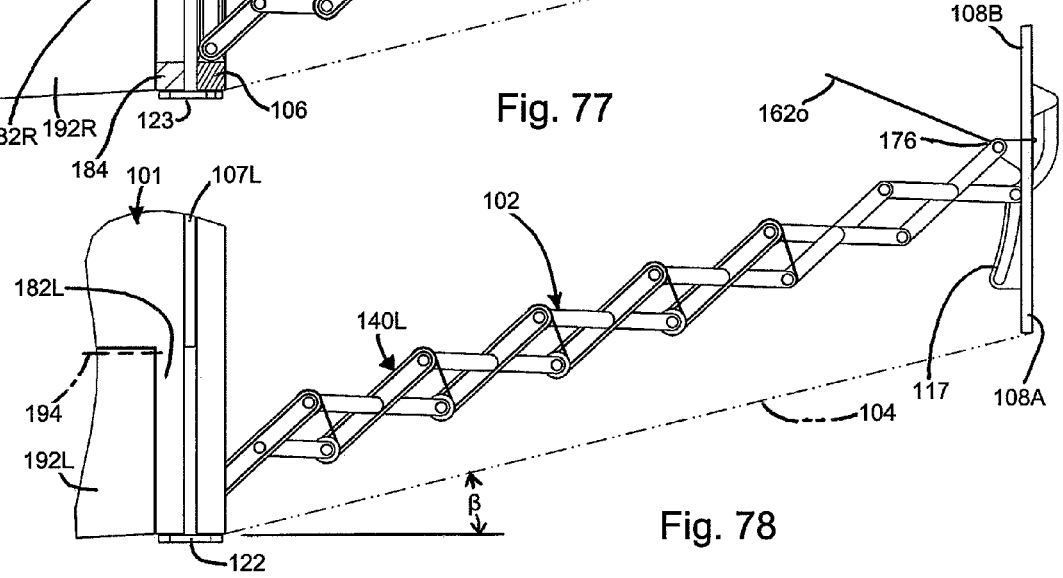
Figure 79:
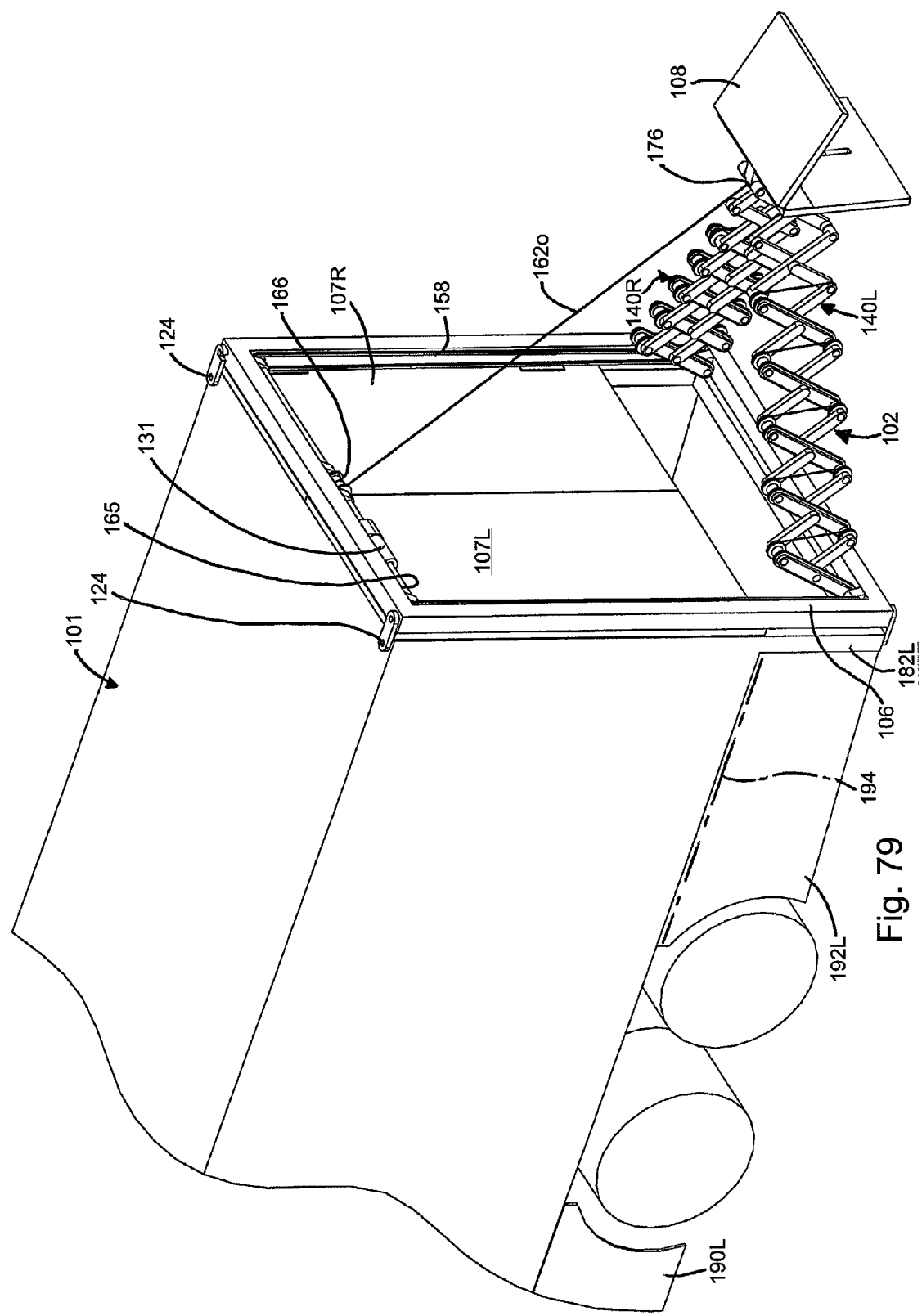
Figure 80:
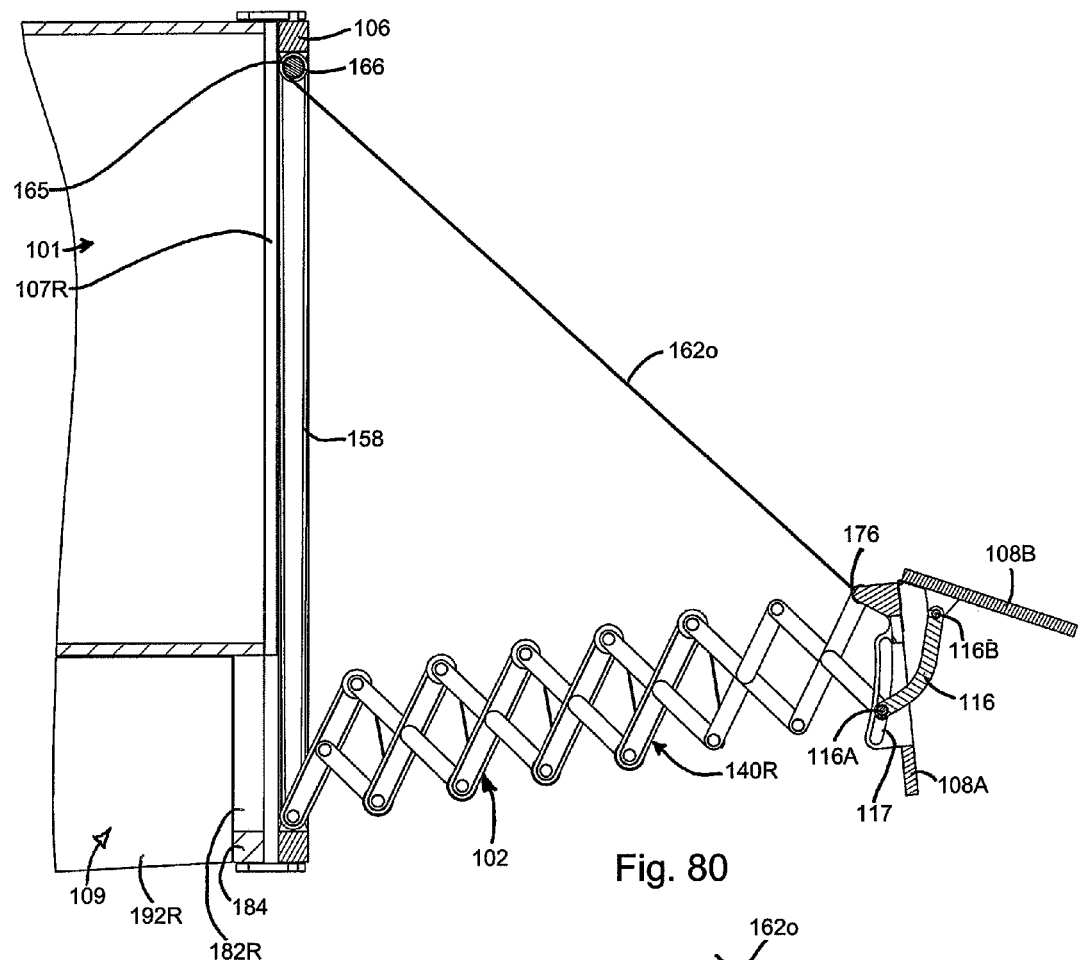
Figure 81:
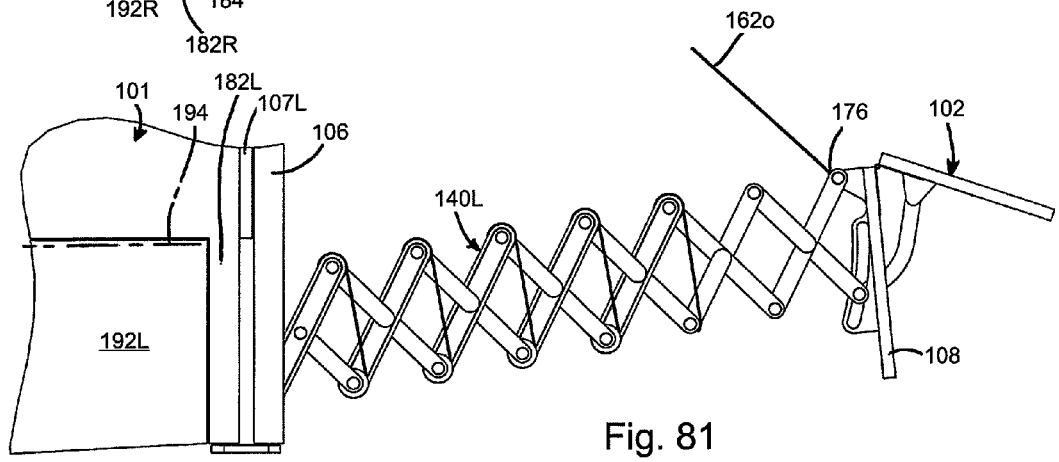
Figure 82:
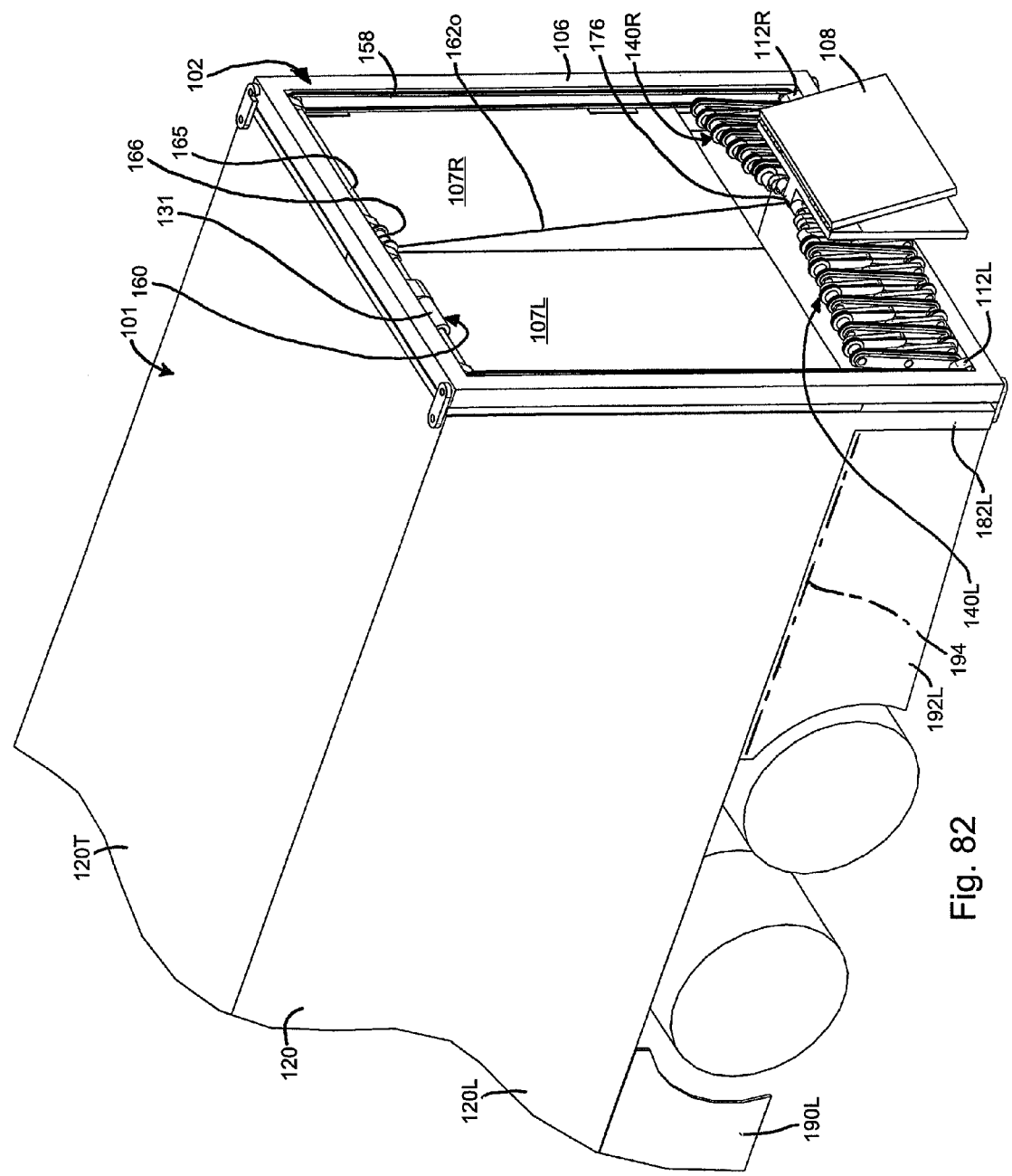

The discussion of the angles $\alpha$, $\beta$, and $\gamma$ in the preceding paragraph also applies to the exterior cover 204 of the apparatus 202 and to the exterior cover 104 of the apparatuses 102 and 103 (see FIGS. 77 and 78). The apparatus 105 includes angles comparable to the angles $\alpha$, $\beta$, and $\gamma$ of the tail mounted embodiments, and the angles are chosen to blend the vehicle surfaces across the gap G. In the depicted embodiment of FIGS. 71 and 72, the semi-trailer 101 is larger (e.g., taller) in cross-section than the tractor unit 110, and the angles of the extended exterior cover result in the apparatus 105 having a down-stream cross-section that is larger than an up-stream cross section.

In certain embodiments, the exterior cover(s) 104, 204 of the fully extended aerodynamic drag reducing apparatus 102, 103, include predominantly planar exterior surfaces. In other embodiments, the exterior surfaces of the exterior cover(s) of the fully extended aerodynamic drag reducing apparatus are non-planar. In still other embodiments, the exterior surfaces of the exterior cover(s) 204, 304 of the fully extended aerodynamic drag reducing apparatus 202, 302 are a mixture of both planar and non-planar surfaces. In preferred embodiments, the exterior surface of the exterior cover(s) 104, 204, 304 is a developable surface (i.e., a surface with zero Gaussian curvature). Thus the exterior surface can be flattened onto a plane without stretching or compressing. Such exterior developable surfaces can therefore be made of planar material that does not easily stretch or compress. In preferred embodiments, the exterior cover(s) 104, 204, 304 are of constant thickness and are developable from planar material without stretching or compressing the planar material. In other embodiments, the exterior cover(s) are piecewise developable and can be made by joining multiple pieces of planar material without stretching or compressing. In still other embodiments, the exterior cover(s) are not developable but can be made by forming (i.e., stretching and/or compressing) material into a non-planar and non-developable shape. In yet other embodiments, the exterior cover(s) are not developable but can be made by tailoring material into a non-planar shape approximation.

In certain embodiments of the present disclosure, a radiused transition between the vehicle and the drag reducing apparatus can be used. The radiused transition can be part of an exterior cover of the apparatus, can be included on a faring between the vehicle and the apparatus, or can be both on an exterior cover and on a faring. Examples of such a radiused transition are disclosed at U.S. Pat. No. 7,380,868, previously incorporated by reference.

The moveable members 307 of the embodiment illustrated at FIGS. 5 and 6 have a continuous outside perimeter and form a closed, hoop-like structure. In the embodiment illustrated at FIGS. 71 and 72, the moveable member can be "C" or "U" shaped. In still other embodiments, the moveable frames may be "L" shaped. In general, the shape of the moveable frames are tailored to the specific application and does not need to form a closed shape nor does it need to completely define a cross-sectional shape of the aerodynamic drag reducing apparatus (e.g., the moveable members 207 illustrated at FIG. 47).

Certain embodiments of the present disclosure have pairs of apparatuses that form right and left halves of a drag reducing shape. Examples of such split apparatuses are disclosed at U.S. Pat. Nos. 7,374,230 and 7,380,868, previously incorporated by reference.

In certain embodiments, as illustrated at FIGS. 5 and 6, the first moveable member $307_1$ is supported by the support linkages $311_1, 411_1$ which in turn are supported by the attachment member 306. The second moveable member $307_2$ is supported by the support linkages $311_2, 411_2$ which in turn are supported by the first moveable member $307_1$. The third moveable member $307_3$ is supported by the support linkages $311_3, 411_3$ which in turn are supported by the second moveable member $307_2$. The fourth moveable member $307_4$ is supported by the support linkages $311_4, 411_4$ which in turn are supported by the third moveable frame $307_3$ and so on. The quantity of the support linkages 311, 411 may vary depending on the space available, the expected loading at the given position, and other reasons. At least two linkages with non-parallel hinge-lines are needed to support a given moveable member 307. The support linkages 311, 411, the moveable members 307 and the attachment member 306 support loads imposed on the apparatus by gravity, airflow, uneven roads, and other operational causes.

In certain embodiments, only one moveable member may be supported by one set of support linkages which, in turn, is supported by an attachment frame.

The exterior covers 104, 204, 304 can be urged inward by elastic elements connected at one end to the linkage 140R, 140L, 240, 311, 340, 411 and at an opposite end to the exterior cover 104, 204, 304. When the apparatus 102, 202, 302 is in the extended configuration, the elastic elements are overpowered by the tension in the exterior cover 104, 204, 304 which is pulled taut. When the apparatus 102, 202, 302 is retracted, the elastic elements urge portions of the exterior cover 104, 204, 304 inward resulting in most of the exterior cover 104, 204, 304 residing within the boundaries of the exterior cover 104, 204, 304 when fully extended. Such elastic elements are further described at U.S. Patent Application Publication No. US 2008/0303310 and illustrated at FIG. 39 of this publication, previously incorporated by reference.

In preferred embodiments, as illustrated above, the support linkages 311, 411 have two links 413 and 415 a center hinge 322 and two end hinges 321. In other embodiments, more than two links and three hinges may be used. In still other embodiments, spring elements may be substituted for one or more of the hinges 321, 322. The hinges 321, 322 can have rotatable elements or can be a hinge made of flexible material (e.g., a plastic hinge). Joints of the hinges can be cylindrical or spherical.

Figure 18:
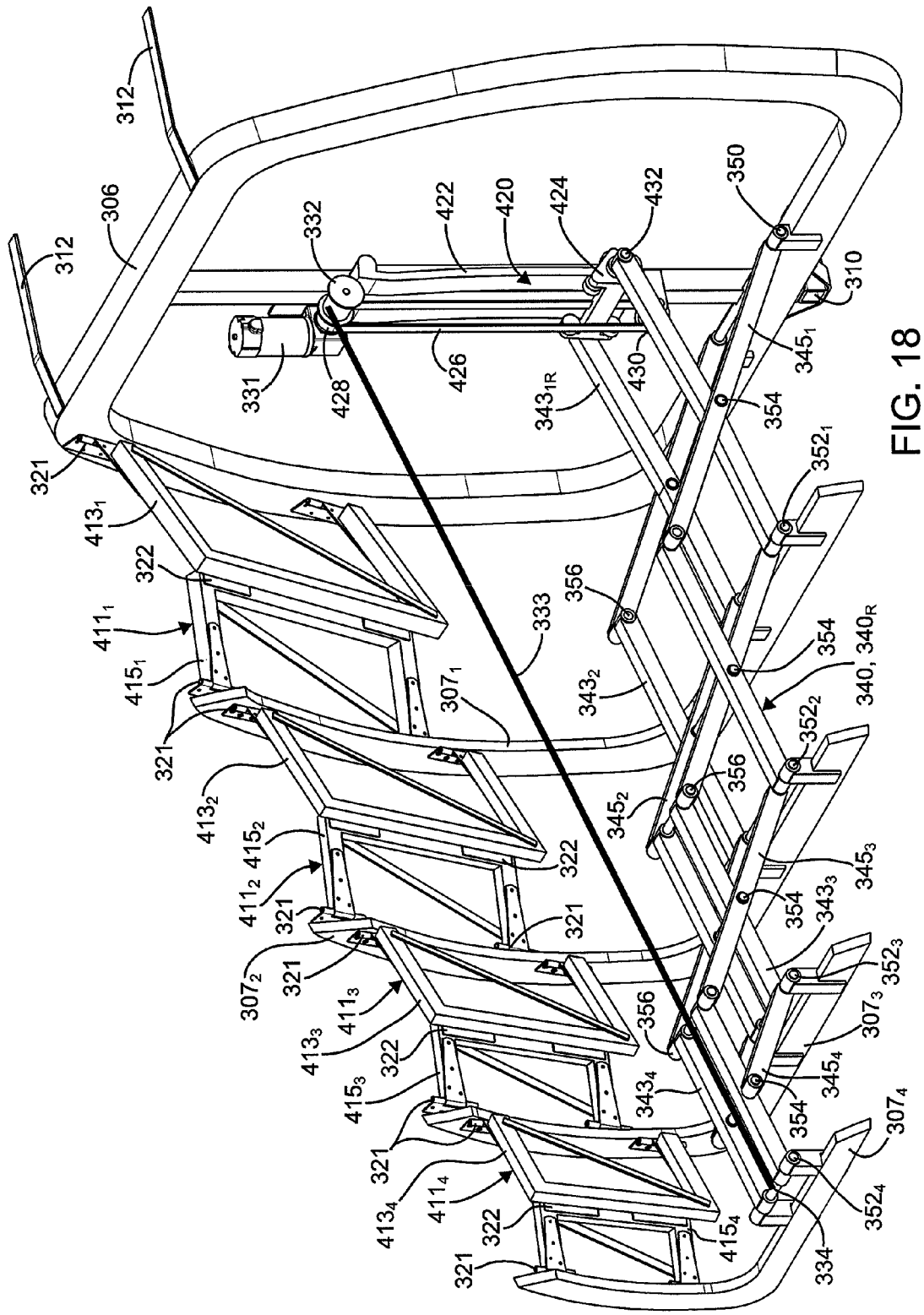
Figure 19:
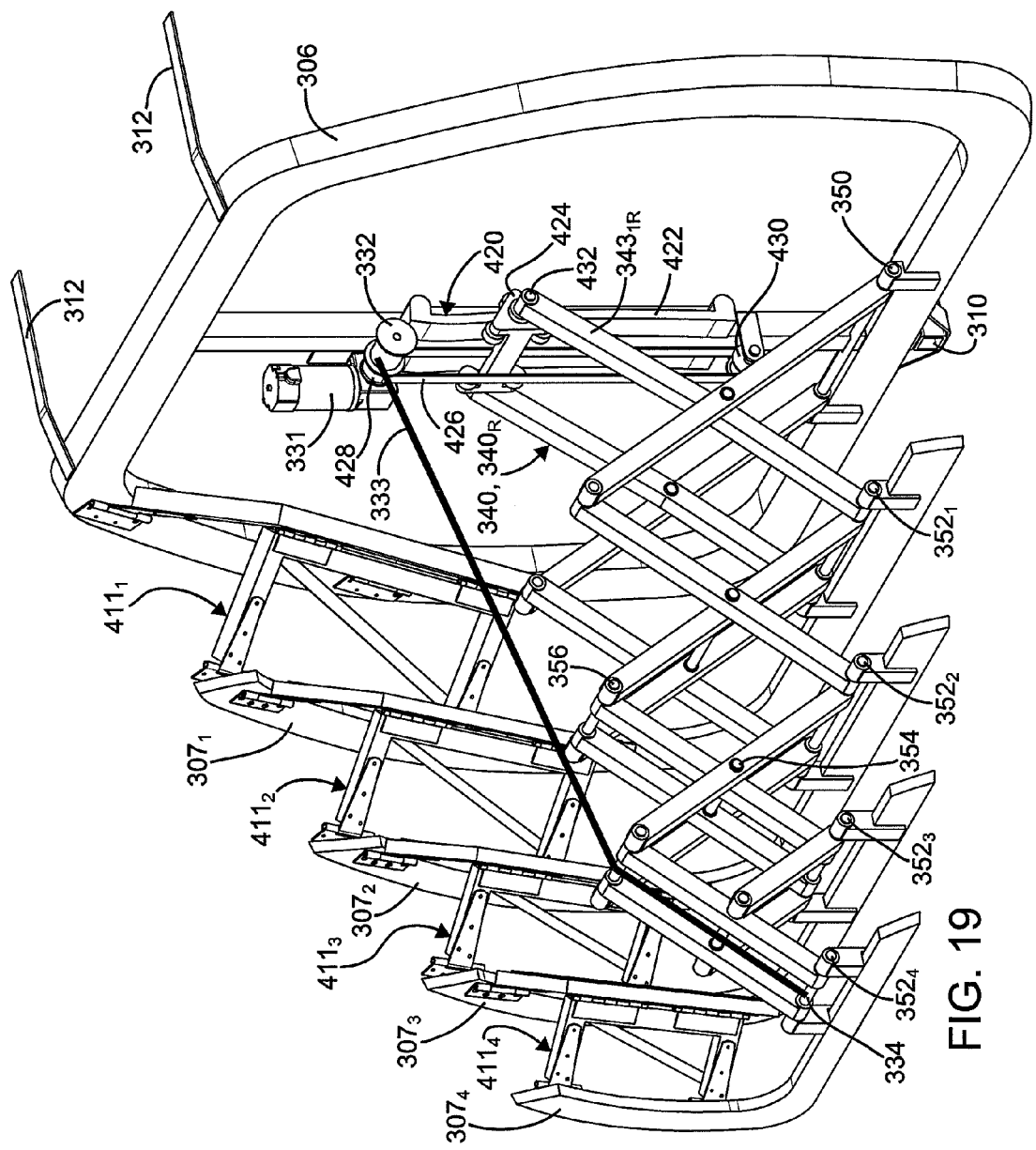
Figure 21:
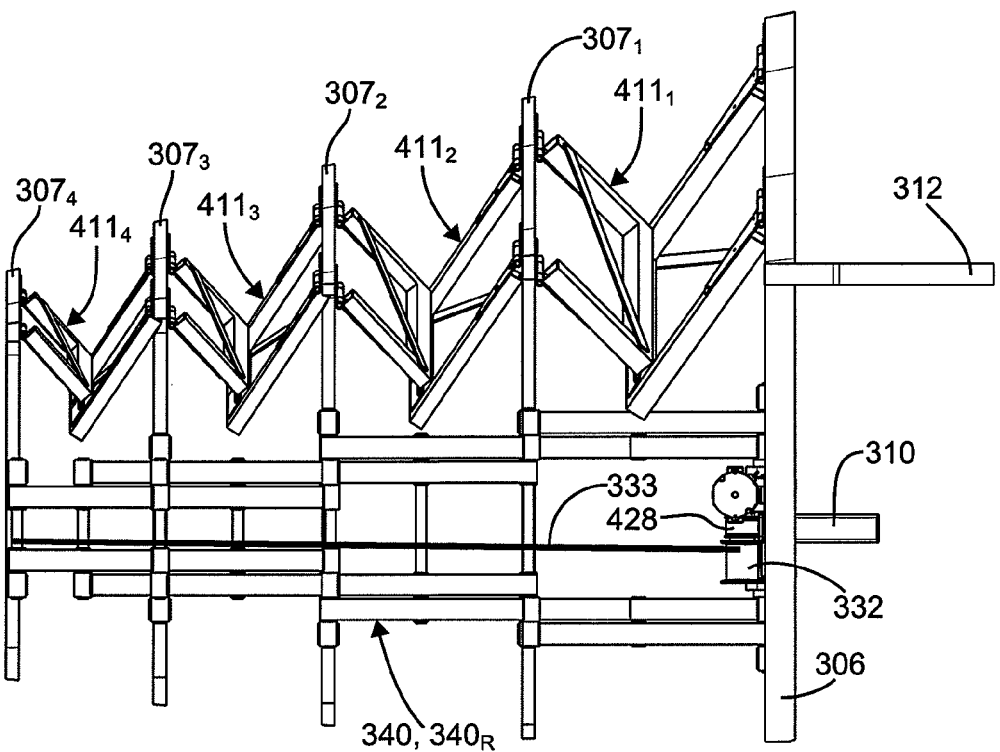
Figure 20:
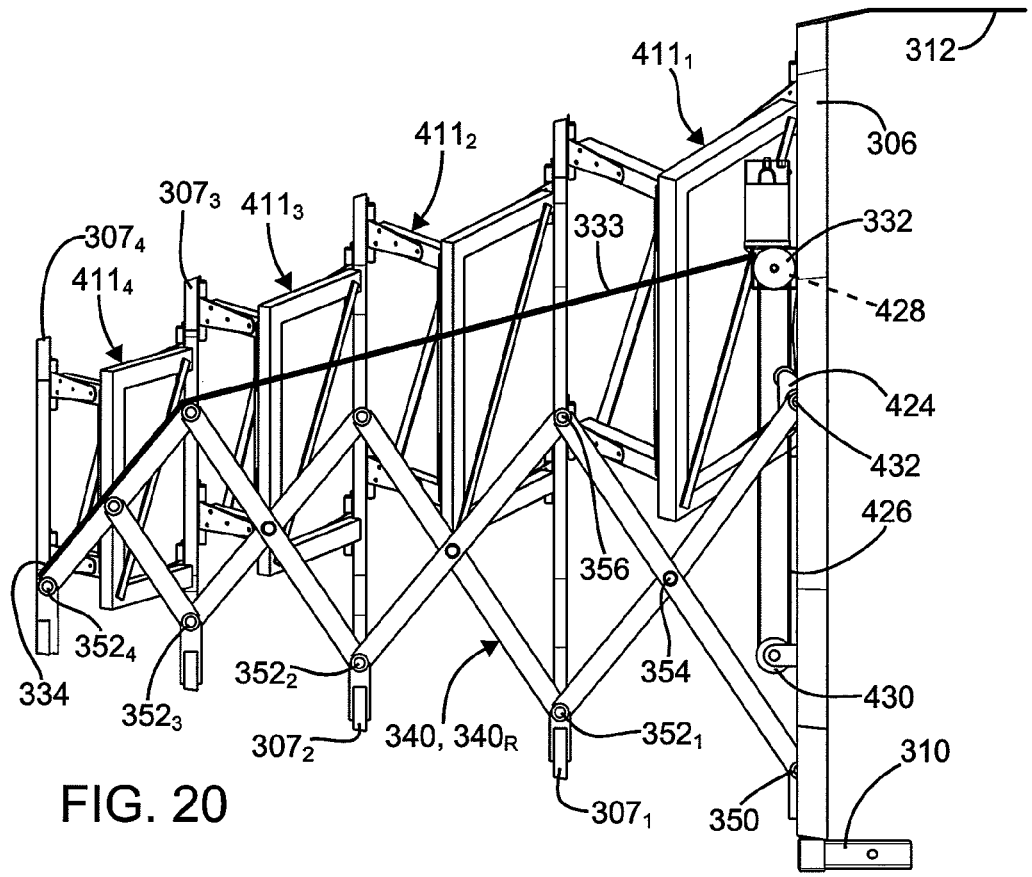
Figure 22:
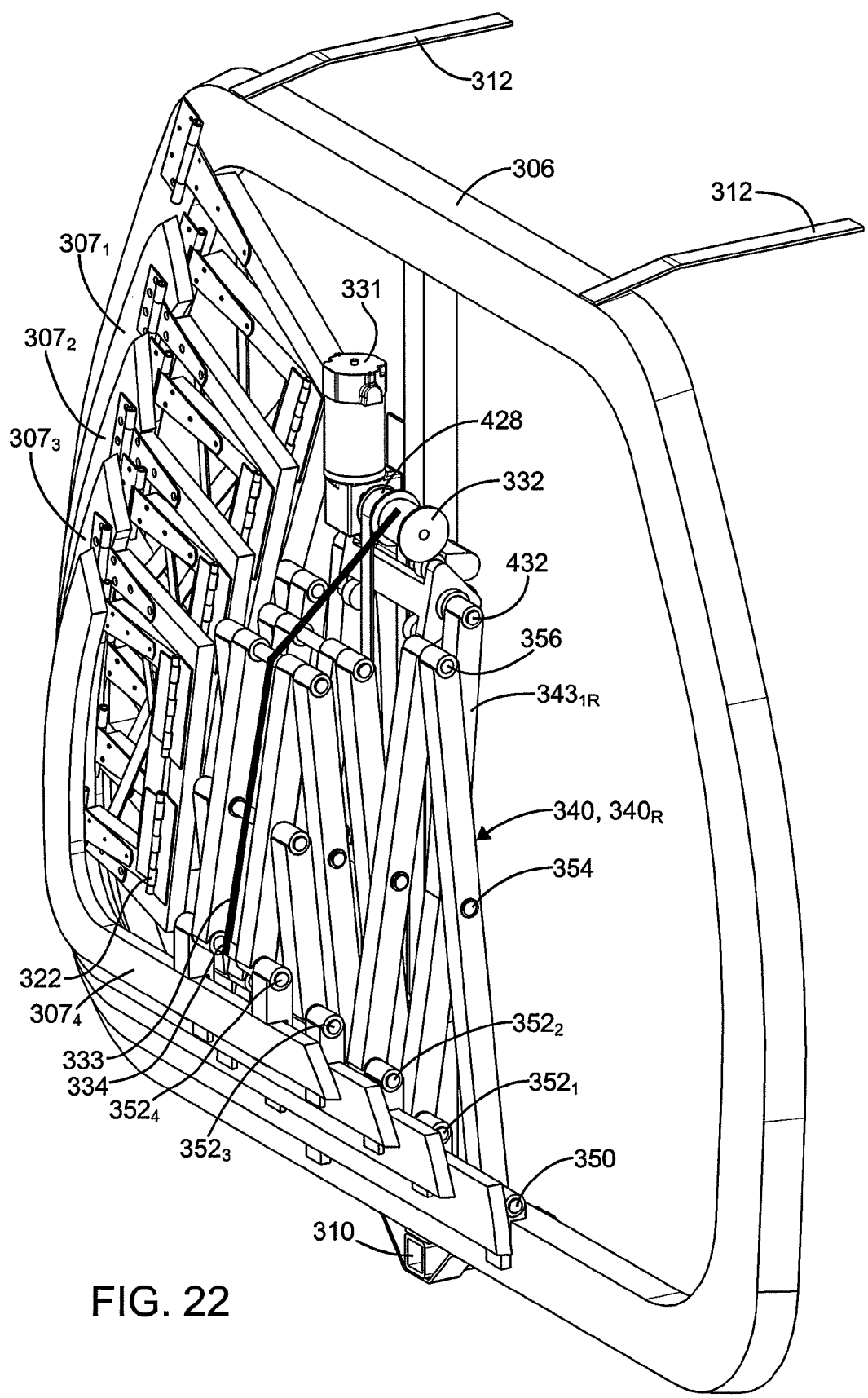
Figure 23:
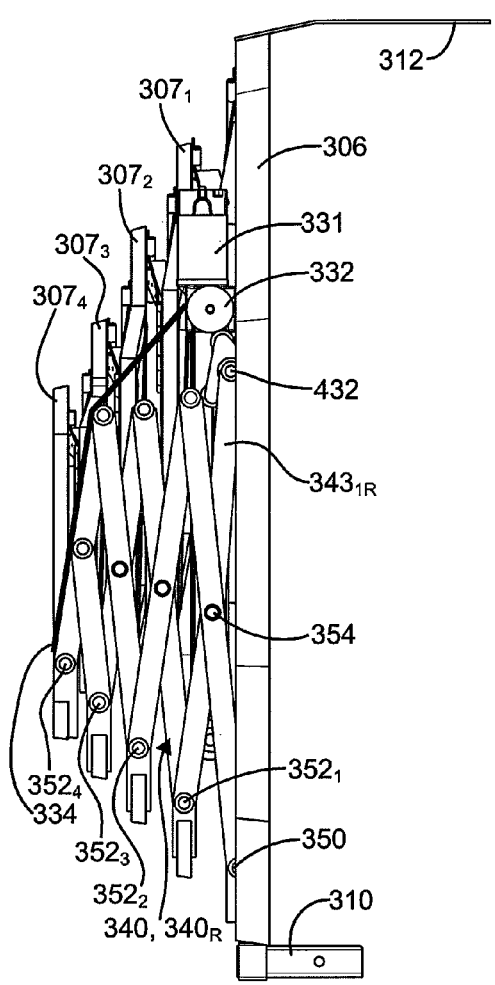
Figure 24:
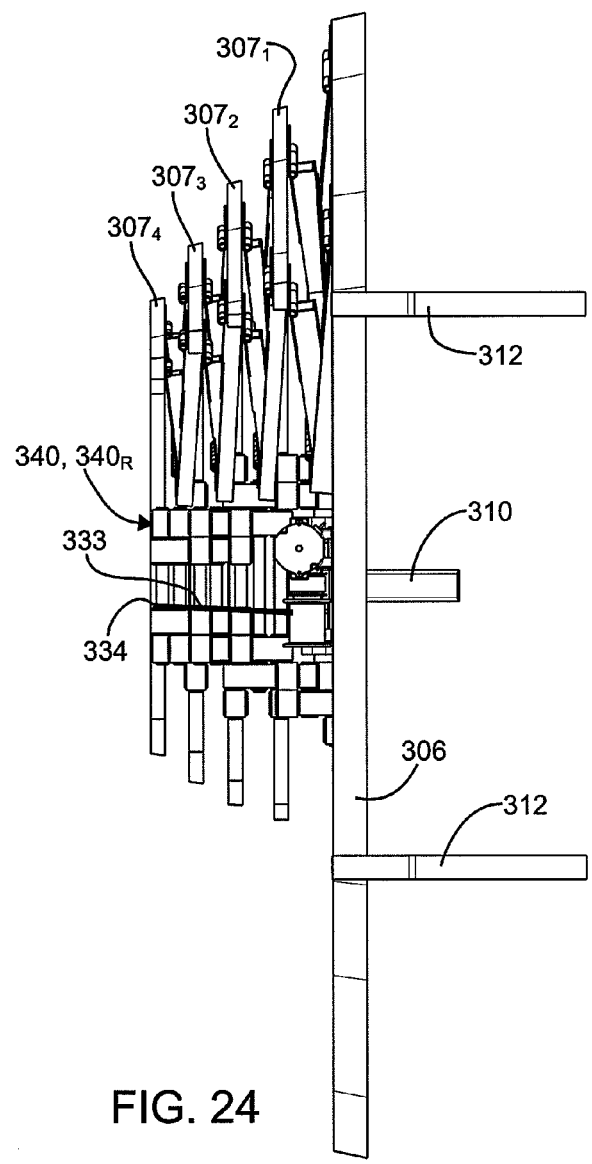
Figure 25:
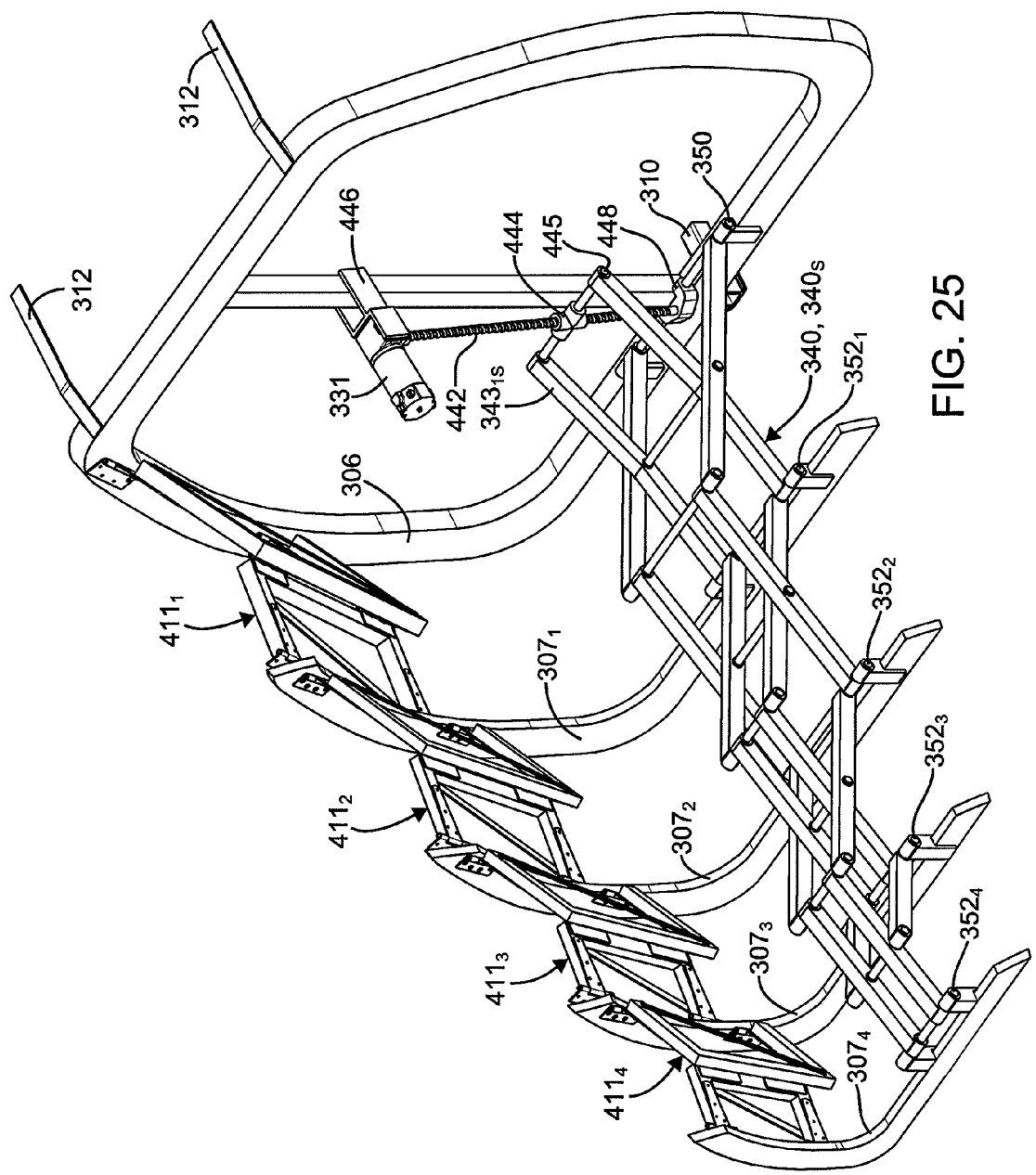
FIGS. 25 through 30 illustrate a second apparatus of FIG. 1, removed from the sports-utility vehicle with the right support linkage, the exterior cover, and the portions of the hoop frames removed for viewing clarity, including a scissors linkage actuated by a screw drive mechanism. In particular.
Figure 26:
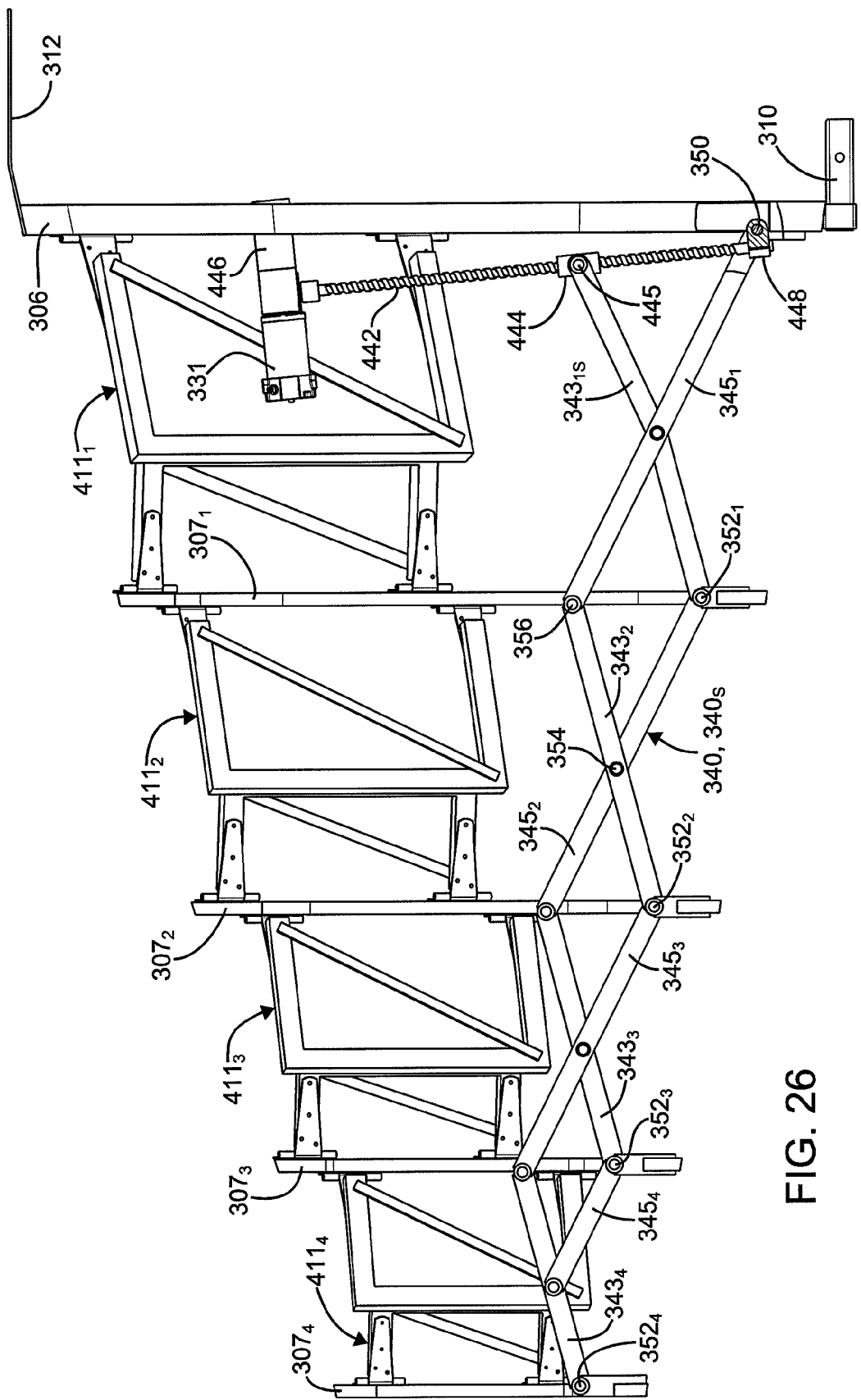
Figure 27:
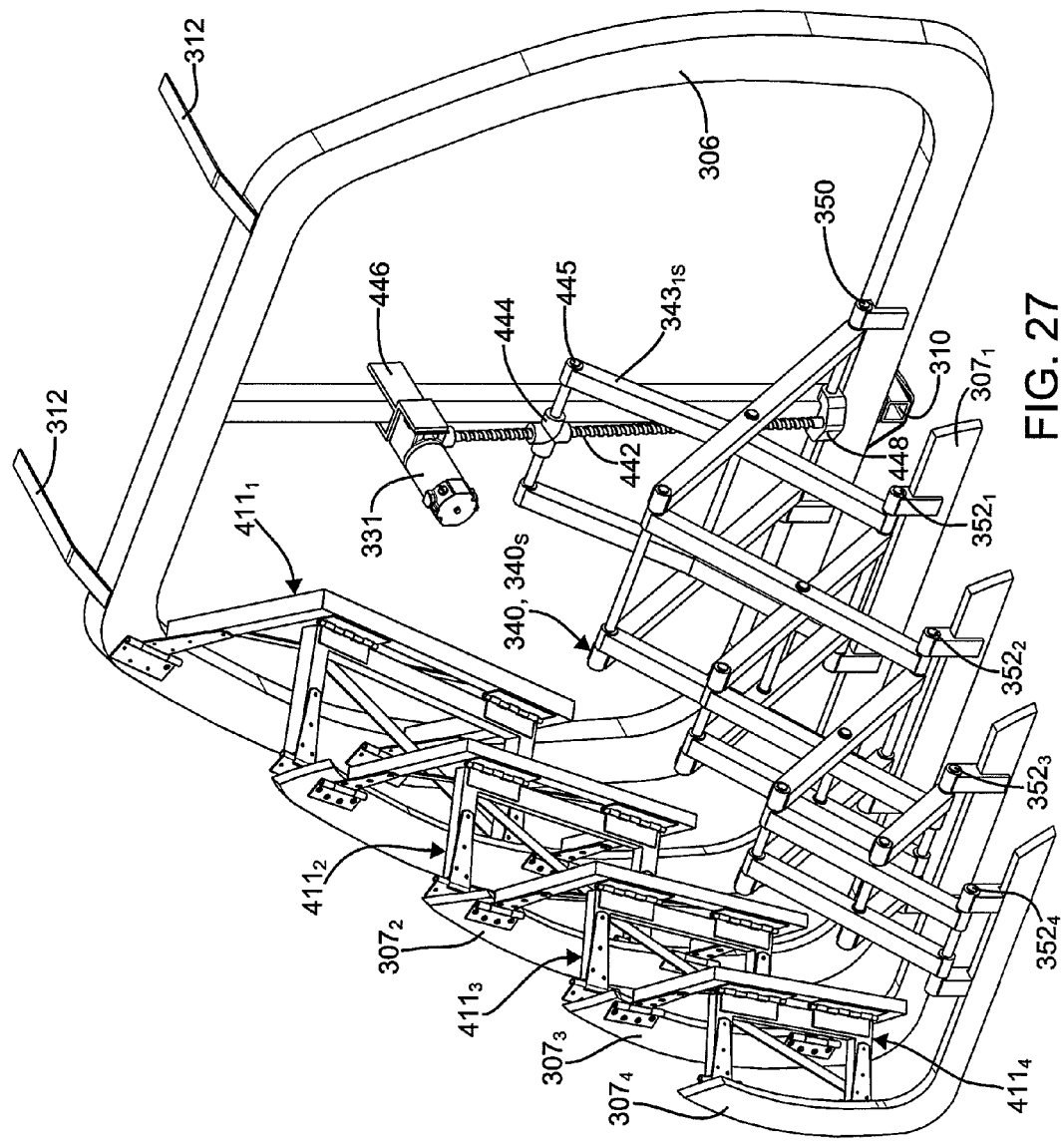
Figure 28:
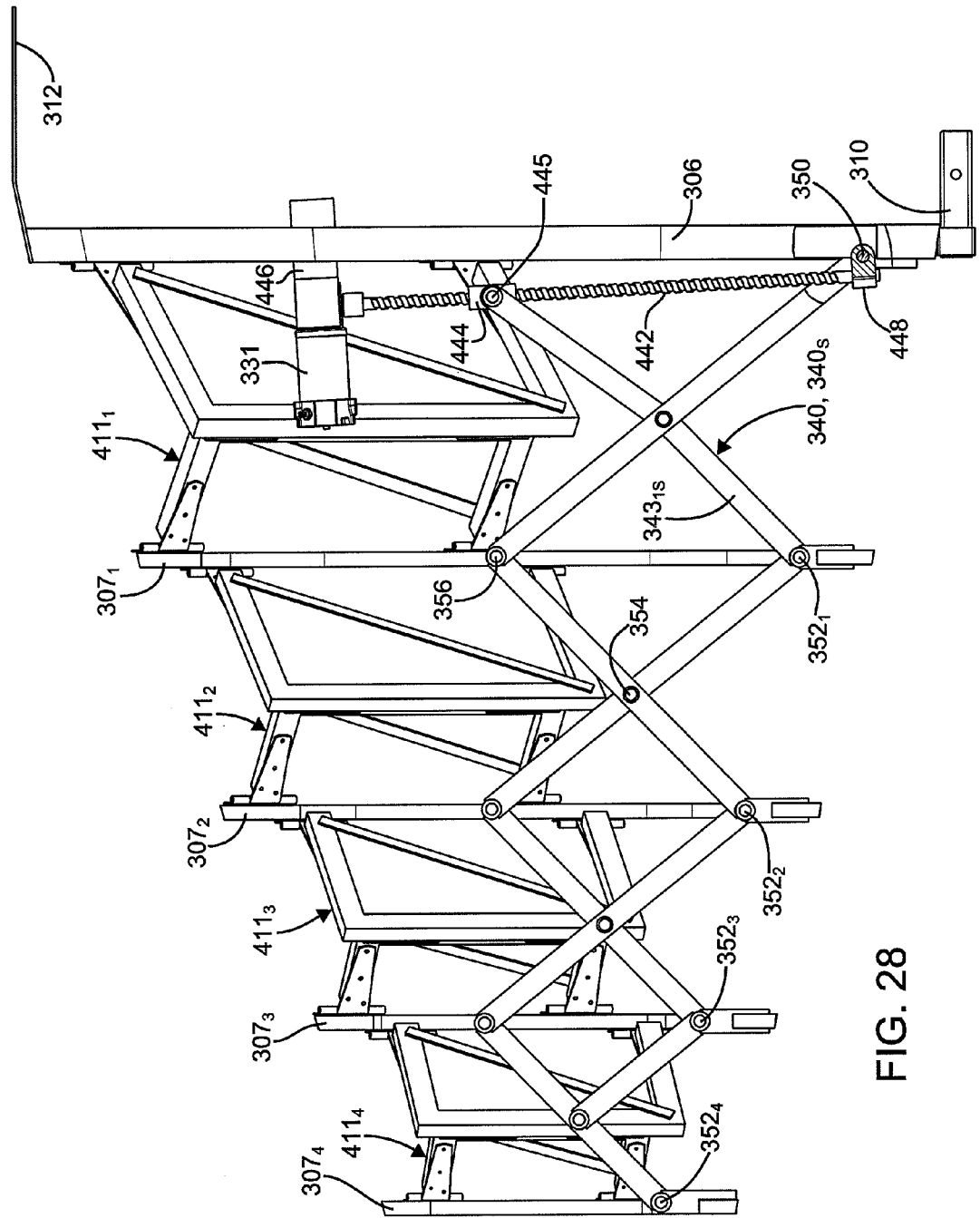
Figure 29:
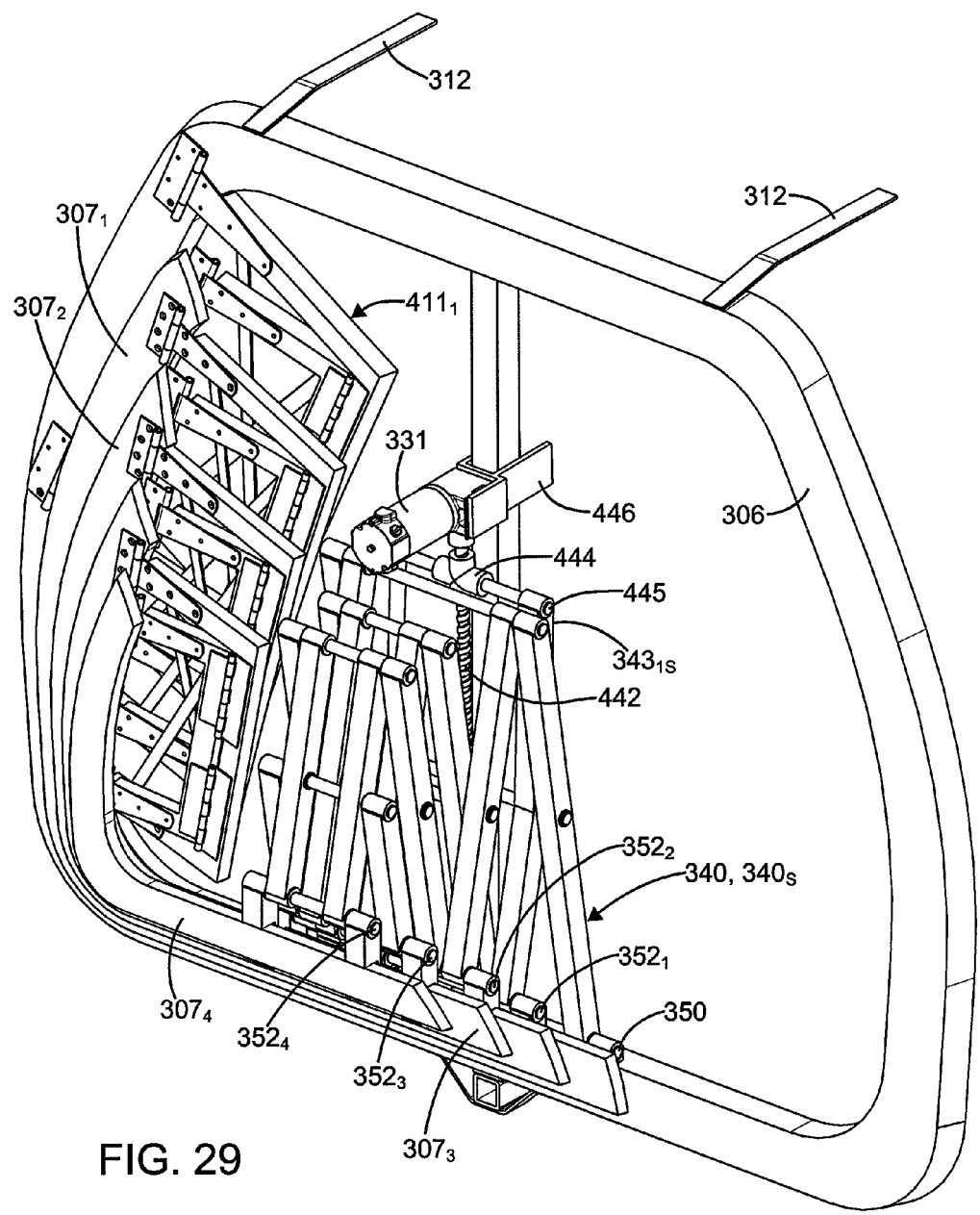
Figure 30:
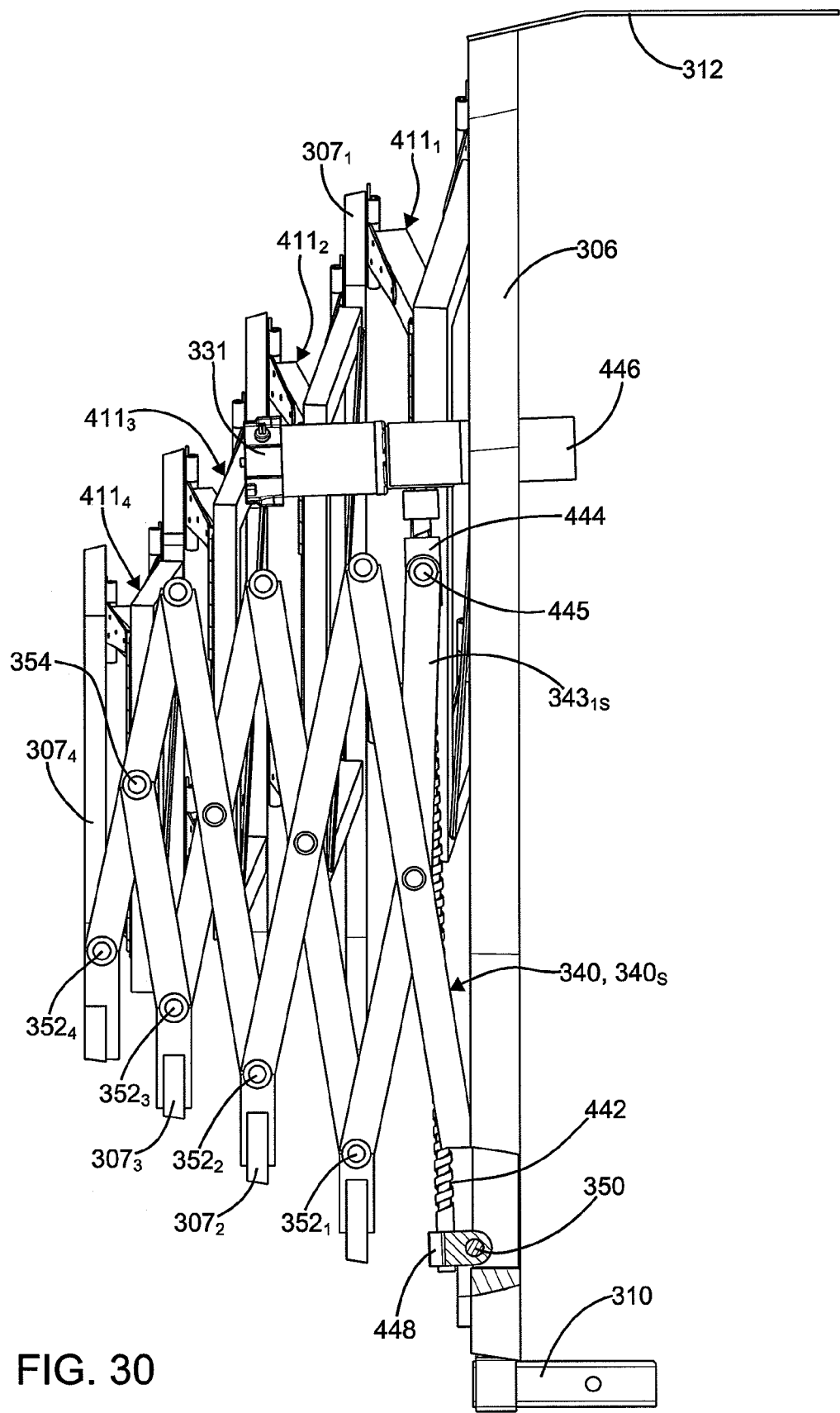
Figure 33:
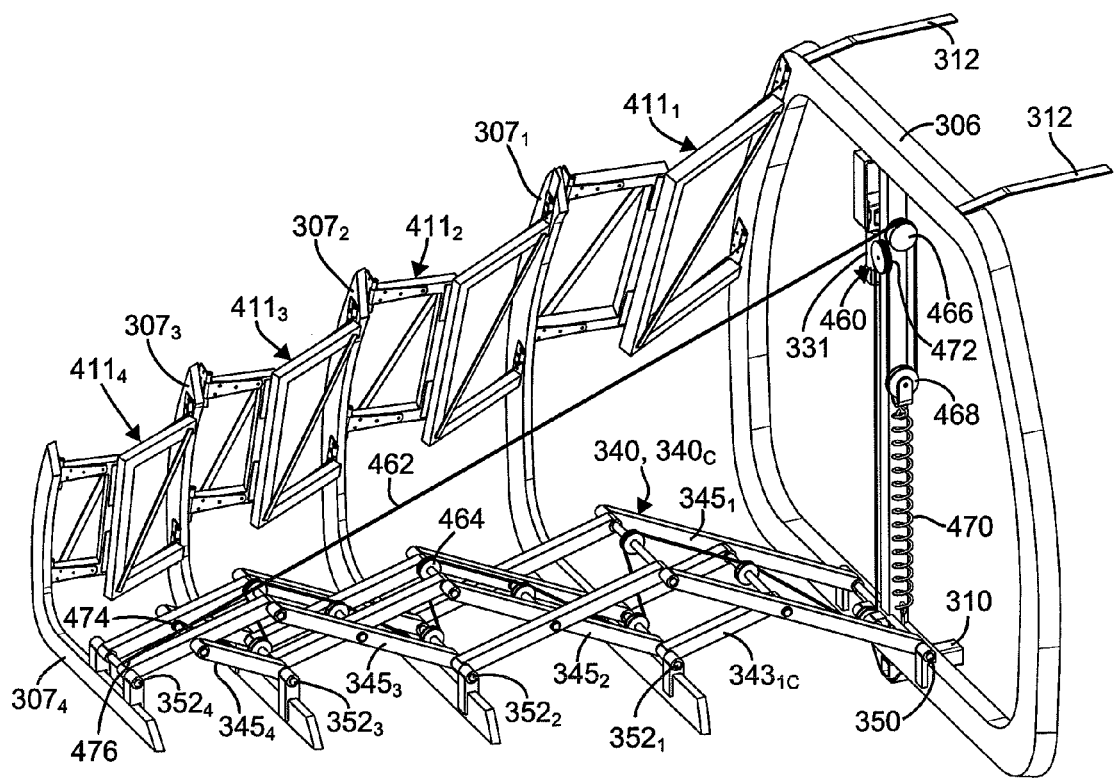
Figure 34:
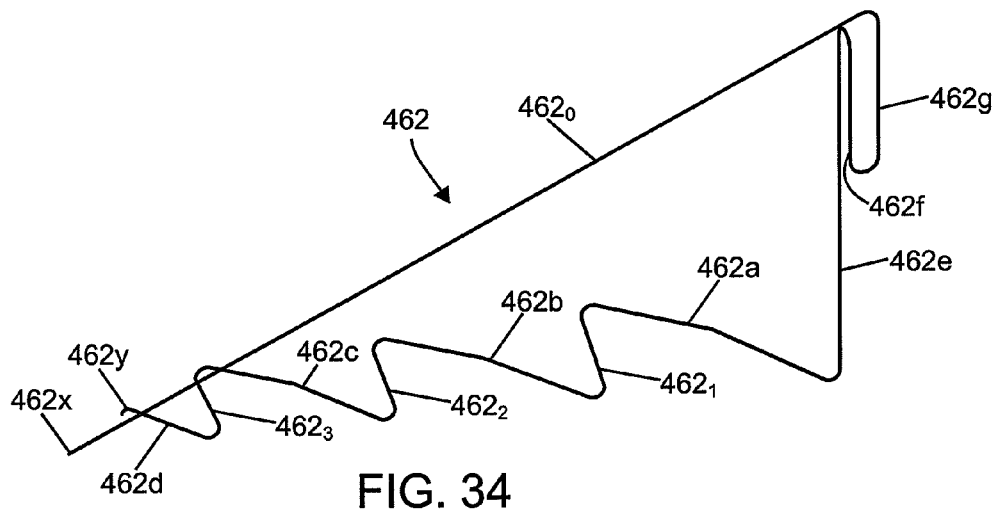
Figure 37:
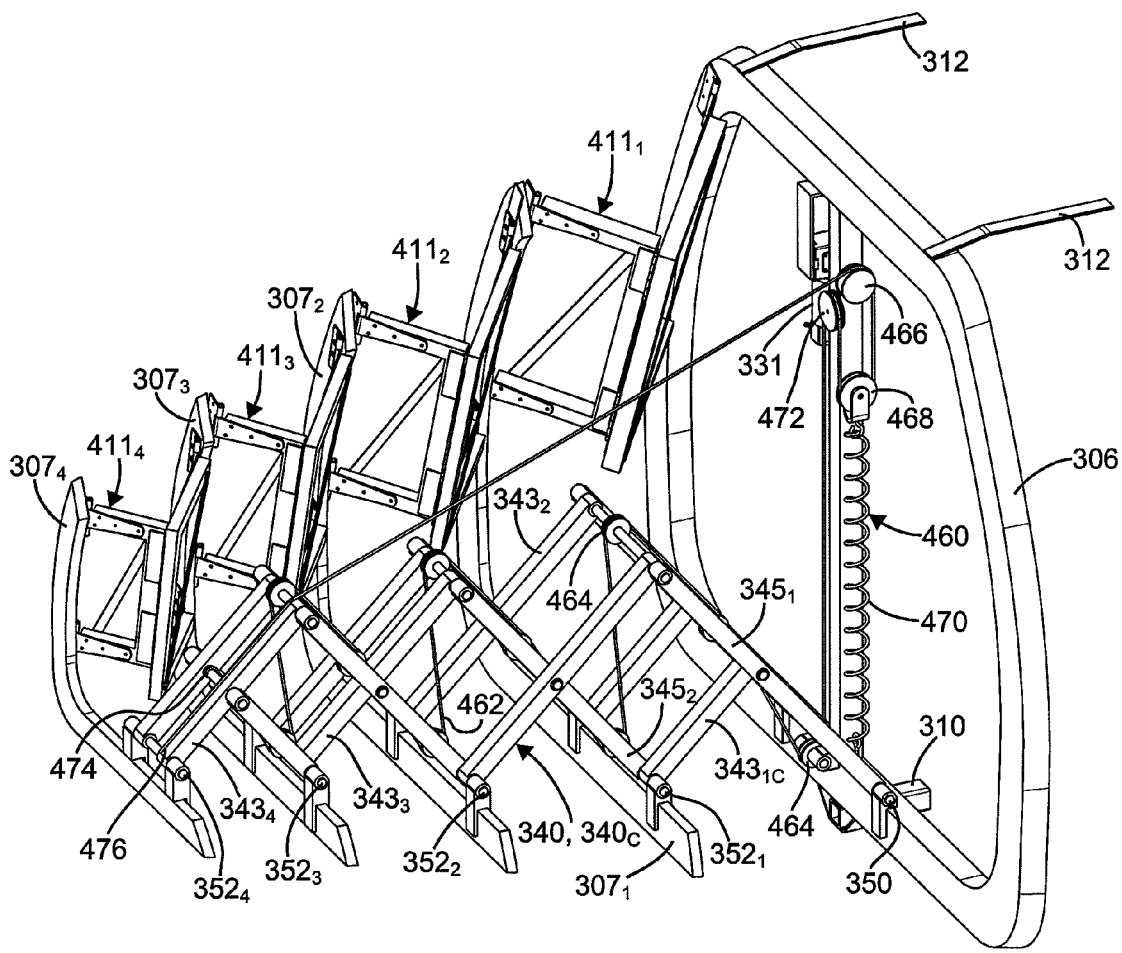
Figure 38:
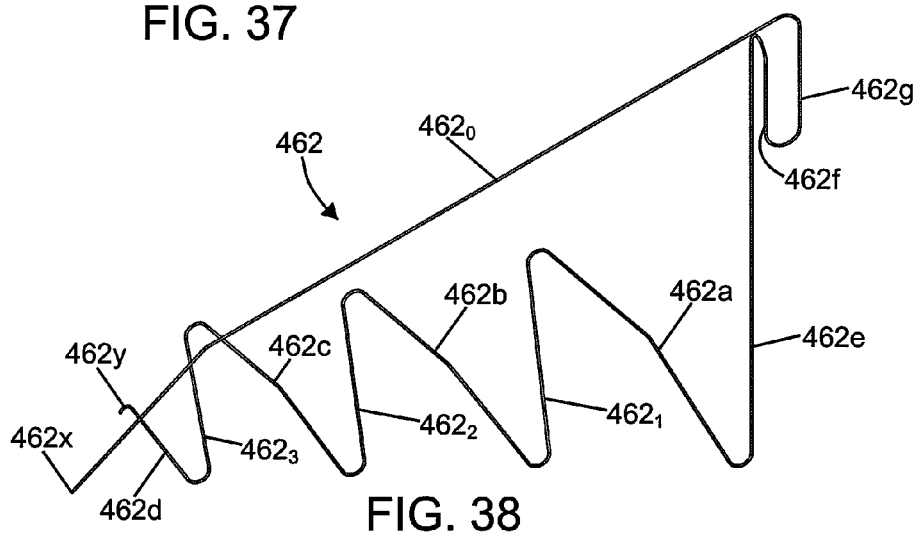

In certain embodiments, the hinges 321, 322 are spring loaded to bias the aerodynamic drag reducing apparatus 302 toward the fully extended configuration. As illustrated at FIG. 18 a motor 331 driving a pulley 332 reeling a tension-member 333 terminated at an attachment point 334 to the end moveable member $307_4$ is used to overpower the bias and retract the apparatus 302.

In certain embodiments, the linkages are spring loaded to bias the aerodynamic drag reducing apparatus 102, 202, 302 toward the fully retracted configuration. The partial vacuum present when the vehicle 101, 201 exceeds a given speed overpowers the bias and the apparatus 102, 202, 302 extends.

In still another embodiment, the exterior cover 104, 204, 304 is sufficiently airtight to allow compressed air delivered within the aerodynamic drag reducing apparatus 102, 103, 202, 203, 302 to extend the apparatus 102, 103, 202, 203, 302. Conversely a partial vacuum within the apparatus 102, 103, 202, 203, 302 can be used to retract the apparatus 102, 103, 202, 203, 302.

In certain embodiments of the present disclosure, illustrated at FIGS. 1-42, the driving linkage 340 is a scissors linkage $340_R$, $340_S$, $340_C$, and the support linkages $311_{1-4}$ are substantially a mirror image of their corresponding support linkage $411_{1-4}$. As depicted, the scissors linkages $340_R$, $340_S$, $340_C$ provide lateral support for side loads applied on the drag reducing apparatus 302, and the support linkages $311_{1-4}$, $411_{1-4}$ can carry vertical loads applied on the apparatus 302. In addition, the scissors linkages $340_R$, $340_S$, $340_C$ can provide a means for extending the apparatus 302. Certain forms of the scissors linkage $340_R$, $340_S$ also provide a means for retracting the apparatus 302. A first link $345_1$ of the scissors linkage $340_R$, $340_S$, $340_C$ is rotatably connected to the attachment member 306 at an attachment member mount 350. The scissors linkage $340_R$, $340_S$, $340_C$ can longitudinally position the moveable intermediate members $307_{1-4}$ of the apparatus 302. Connections for this purpose can be provided at rotational joints between the scissors linkage $340_R$, $340_S$, $340_C$ and a moveable intermediate member mount $352_1$ on the moveable intermediate member $307_1$, a moveable intermediate member mount $352_2$ on the moveable intermediate member $307_2$, a moveable intermediate member mount $352_3$ on the moveable intermediate member $307_3$, and a moveable member mount $352_4$ on the moveable member $307_4$. The moveable end member 308 can be attached to the moveable member $307_4$.

In addition to providing lateral support and longitudinal position to the apparatus 302, certain forms of the scissors linkage $340_R$ can also provide vertical support. In the embodiment illustrated at FIGS. 5-24, an actuator 420 includes a guide rail 422, a cam follower 424 slidably attached to the guide rail 422, a drive belt 426 that drives the cam follower 424, a first pulley 428, a second pulley 430, a motor 331, and a pivoting connection 432. The drive belt 426 is preferably routed between the first pulley 428 and the second pulley 430. The motor 331 is rotatably connected to the first pulley 428 and thereby connected to the drive belt 426. The motor 331 can therefore raise and lower the cam follower 424. The pivoting connection 432 is mounted on the cam follower 424 and also is rotatably connected to the scissor linkage $340_R$. Running the motor 331 in a first rotational direction therefore extends the scissor linkage $340_R$ and thereby extends the apparatus 302. Running the motor 331 in a second rotational direction therefore retracts the scissor linkage $340_R$ and thereby retracts the apparatus 302.

In certain embodiments, a tension-member pulley 332 in cooperation with a tension-member 333 may assist the scissors linkage $340_R$ in the retraction of the apparatus 302. The tension-member pulley 332 and the first pulley 428 may be driven by the same motor 331 or by separate motors. If driven by the same motor 331, a differential gearbox (e.g., a planetary gearbox) may rotationally connect to each of the pulleys 332, 428 and the motor 331 to variably distribute the torque and speed of the motor 331 to each of the pulleys 332, 428 when retracting the apparatus 302. In particular, the rotational speed of the motor 331 can be geared down, and a torque balance between the motor 331, the tension-member pulley 332, and the first pulley 428 can be established by the gearing. During retraction of the apparatus 302, the relative rotational speeds between the tension-member pulley 332 and the first pulley 428 may change due to the kinematics of the scissors linkage $340_R$ and the apparatus 302. The torque balance between the tension-member pulley 332 and the first pulley 428 is maintained during the retraction of the apparatus 302 even though the relative rotational speeds between the tension-member pulley 332 and the first pulley 428 change. This allows both the tension-member 333 and the scissors linkage $340_R$ to continuously contribute to the retraction of the apparatus 302 during the retraction of the apparatus 302 powered by the same motor 331.

As mentioned above, the scissors linkage $340_R$ can also provide vertical support to the apparatus 302. The support can be provided at the rotational joints between the scissors linkage $340_R$ and the moveable intermediate member mount $352_1$ on the moveable intermediate member $307_1$, the moveable intermediate member mount $352_2$ on the moveable intermediate member $307_2$, the moveable intermediate member mount $352_3$ on the moveable intermediate member $307_3$, and the moveable member mount $352_4$ on the moveable member $307_4$.

If the kinematic path taken by the scissors linkage $340_R$ is not the same as the kinematic path taken by the support linkages $311_{1-4}$, $411_{1-4}$, the scissors linkage $340_R$ can bind with the support linkages $311_{1-4}$, $411_{1-4}$. In one example, an extension-retraction path of the support linkages $311_{1-4}$, $411_{1-4}$ is horizontal and linear while an extension-retraction path of a scissors linkage similar to the scissors linkage $340_R$ is approximately horizontal but is not linear. Since the extension-retraction paths do not match exactly, binding can occur where they deviate from each other. The scissors linkage $340_R$ resolves this by employing a curved guide rail as the guide rail 422. The curved guide rail matches the kinematics of the scissors linkage $340_R$ and the support linkages $311_{1-4}$, $411_{1-4}$. Another solution to prevent binding between the scissors linkage $340_R$ and the support linkages $311_{1-4}$, $411_{1-4}$ is to design the linkages $340_R$, $311_{1-4}$, $411_{1-4}$ to have matching linear movement and a linear guide rail.

An alternative embodiment of the present disclosure removes the support linkages $311_{1-4}$, $411_{1-4}$, featured at FIGS. 5 through 24, and supports the drag reducing apparatus 302 with the scissors linkage $340_R$. The tension-member 333, illustrated at FIGS. 18-24, can assist the scissors linkage $340_R$ in the support of the apparatus 302 (with or without the support linkages $311_{1-4}$, $411_{1-4}$). In particular, the tension-member 333 can provide a vertical component of support for the apparatus 302. By removing the support linkages $311_{1-4}$, $411_{1-4}$, the potential for them binding with the scissors linkage $340_R$ is removed and any guide rail can be used as the guide rail 422 without the concern of matching linkage kinematics. In the present alternative embodiment, the moveable intermediate members $307_{1-4}$, via the moveable intermediate member mounts $352_{1-4}$, are rotatably connected to the scissors linkage $340_R$, as previously described. In addition, the moveable intermediate members $307_{1-4}$ can be connected to the exterior cover 304. The second end of the exterior cover 304 can be clamped between the moveable member $307_4$ and the moveable end member 308. An additional connection, such as a sliding connection, can be added between each of the moveable intermediate members $307_{1-4}$ and a corresponding upper pivot 356 or a corresponding mid-pivot 354 of the scissors linkage $340_R$. Adding the additional connections can stabilize or assist in stabilizing the intermediate members $307_{1-4}$ in the absence of the support linkages $311_{1-4}$, $411_{1-4}$, especially when the apparatus 302 is not in the fully extended or the fully retracted configuration.

Yet another alternative embodiment of the present disclosure removes the support linkages $311_{1-4}$, $411_{1-4}$ and the moveable intermediate members $307_{1-3}$, featured at FIGS. 5-24, and supports rearward portions of the drag reducing apparatus 302 with the scissors linkage $340_R$. The tension-member 333, illustrated at FIGS. 18-24, can assist the scissors linkage $340_R$ in the support of the apparatus 302. In the present alternative embodiment, the scissors linkage $340_R$ pushes outwardly on, vertically supports, and laterally supports the last (and only) moveable member $307_4$ and the second end of the exterior cover 304 pulls against the moveable member $307_4$ when the drag reducing apparatus 302 is fully extended. The first end of the exterior cover 304 is attached to and pulls against the attachment member 306, the fairing 305, and/or the vehicle 201 when the apparatus 302 is fully extended. Thus, in the fully extended configuration, the compressive loads within the scissors linkage $340_R$ are at least partially balanced by the tensile loads of the exterior cover 304 resulting in a stable configuration and resulting in the exterior cover 304 being pulled taut. In the fully extended configuration, the tensile loads within the exterior cover 304, the compressive loads within the scissors linkage $340_R$, other loads (e.g., bending) within the scissors linkage $340_R$, and the attachment member 306 support the exterior cover 304. When partially or fully retracted, the scissors linkage $340_R$ supports the second end (i.e., a rear end) of the exterior cover 304 via the moveable member $307_4$, and the attachment member 306 supports the first end (i.e., a front end) of the exterior cover 304. Support straps and rods similar to the moveable intermediate members $207_{1-5}$ (see FIGS. 47, 49, 51, 54, and 58) can be added between various points of the scissors linkage $340_R$ and the exterior cover 304 to keep the exterior cover 304 from reaching the ground (e.g., by drooping) when the drag reducing apparatus 302 is not fully extended. The support straps can be stretchable or non-stretchable. The moveable end member 308 can be attached to the moveable member $307_4$ and can be attached to the exterior cover 304.

In another embodiment, illustrated at FIGS. 25 through 30, the scissor linkage $340_S$ extends and retracts the apparatus 302 by employing a screw drive including the motor 331, a drive screw 442, a pivoting drive nut 444, an anti-rotation means 446, and a base pivot 448. The base pivot 448 is rotatably connected to the attachment member 306. The pivoting drive nut 444 is rotatably connected to an upper pivot 445 of a second link $343_{1S}$ of the scissor linkage $340_S$. An output shaft of the motor 331 is rotationally connected to the drive screw 442, and a housing of the motor 331 is held from rotating with the output shaft by the anti-rotation means 446. The drive screw 442 is threadingly connected to the pivoting drive nut 444 and rotatably connected to the base pivot 448. When the motor 331 rotates in a first direction, the drive screw 442 pushes the pivoting drive nut 444 away from the base pivot 448 thereby retracting the scissor linkage $340_S$. When the motor 331 rotates in a second direction, the drive screw 442 pulls the pivoting drive nut 444 towards the base pivot 448 thereby extending the scissor linkage $340_S$.

In still another embodiment, illustrated at FIGS. 31 through 42, still another scissors linkage $340_C$ extends the apparatus 302. In this embodiment, a tension-member 462 (e.g., a chain, a cable, a belt, a rope, a cord, etc.) is routed across pulleys 464 that are rotatably mounted on the scissors linkage $340_C$. In the depicted embodiment, the pulleys 464 are co-axial with certain of the pivoting joints of the scissors linkage $340_C$. Also in the depicted embodiment, a first end $462x$ of the tension-member 462 is attached to an attachment point 476 that is kinematically connected to the moveable member $307_4$, and a second end $462y$ of the tension-member 462 is attached to an attachment point 474 that is connected to a last scissors link $343_4$. A tension-member drive 460 includes the motor 331, a drive pulley 466, a first idler pulley 468, a second idler pulley 472, and a tension spring 470. The tension member 462 is routed from the first end $462x$ to the tension-member drive 460 and further to and through the scissors linkage $340_C$ and the last end $462y$. In the present embodiment, the drive pulley 466 also serves as a support pulley that is vertically spaced above the scissors linkage $340_C$. In the present embodiment, the support/drive pulley 466 is rotatably mounted to the attachment member 306. The tension member 462 thus angles downward from the support/drive pulley 466 to the first end $462x$ and the attachment point 476. Tension within the tension-member 462 can provide a vertical component of support for the apparatus 302.

When the motor 331 rotates the drive pulley 466 in a first direction, the tension-member 462 pulls against certain pulleys 464 attached to the joints of the scissors linkage $340_C$ drawing them together and thereby extending the scissors linkage $340_C$ and the apparatus 302. When the motor 331 rotates the drive pulley 466 in a second direction, the tension-member 462 pulls the attachment point 476 inward and thereby directly retracts the scissors linkage $340_C$ and the apparatus 302. When the motor 331 is stopped, it can hold the drive pulley 466 from turning and thereby hold the configuration of the apparatus 302. A brake can hold or assist in the holding of the drive pulley 466 from turning and thereby hold or assist in the holding of the configuration of the apparatus 302. A braking clamp can clamp and hold the tension member 462 and thereby hold the configuration of the apparatus 302.

As the apparatus 302 extends and retracts, a length of the tension-member 462 route through the scissors linkage $340_C$ and to the attachment point 476 changes. The first idler pulley 468 and spring 470 can compensate for this and allow the length of the tension-member 462 route through the scissors linkage $340_C$ and to the attachment point 476 to vary and concurrently keep adequate tension in the tension-member 462. As an alternative or a supplement to the route-length compensation provided by the first idler pulley 468 and spring 470, a tension-member with tensile flexibility can be used as the tension-member 468.

The tension-member 462 is routed within the apparatus 302 between the first end $462x$ and the second end $462y$ of the tension-member 462. Along the routing, the tension-member 462 passes over various pulleys including the pulleys 464 on the scissors linkage $340_C$, the drive pulley 466, the first idler pulley 468, and the second idler pulley 472. Various portions of the tension-member 462 can be identified in a given configuration of the apparatus 302. Certain of the various portions of the tension-member 462 expand and contract as the apparatus 302 moves between the extended and the retracted configurations, and other portions of the tension-member 462 remain the same or approximately the same length. A given increment of the tension-member 462 can pass between the various portions of the tension-member 462 as the apparatus moves between configurations. In particular, a portion $462_0$ of the tension-member 462 is defined between the first end $462x$ and the drive pulley 466. Similarly, a portion $462g$ is defined between the drive pulley 466 and the first idler pulley 468, a portion $462f$ is defined between the first idler pulley 468 and the second idler pulley 472, a portion $462e$ is defined between the second idler pulley 472 and a pulley 464 near the bottom of the first link $345_1$, a portion $462a$ is defined between the pulley 464 near the bottom of the first link $345_1$ and a pulley 464 near the top of the first link $345_1$, a portion $462_1$ is defined between the pulley 464 near the top of the first link $345_1$ and a pulley 464 near the bottom of the link $345_2$, a portion $462b$ is defined between the pulley 464 near the bottom of the link $345_2$ and a pulley 464 near the top of the link $345_2$, a portion $462_2$ is defined between the pulley 464 near the top of the link $345_2$ and a pulley 464 near the bottom of the link $345_3$, a portion $462c$ is defined between the pulley 464 near the bottom of the link $345_3$ and a pulley 464 near the top of the link $345_3$, a portion $462_3$ is defined between the pulley 464 near the top of the link $345_3$ and a pulley 464 near the bottom of the link $345_4$, and a portion $462d$ is defined between the pulley 464 near the bottom of the link $345_4$ and the second end $462y$ of the tension member 462. (See FIGS. 32, 34, 36, 38, 40, and 42.)

When the motor 331 rotates the drive pulley 466, length increments of the tension-member 462 are transferred between the portion $462_0$ and the portions $462_1$, $462_2$, and $462_3$. The portions $462a$, $462b$, $462c$, $462d$, and $462e$ remain substantially the same length as the motor 331 rotates and the apparatus 302 changes configurations. The portions $462f$ and $462g$ can vary in length to prevent binding between the scissors linkage $340_C$ and the support linkages $311_{1-4}$, $411_{1-4}$ as the apparatus 302 travels through its range of motion. In particular, when the motor 331 rotates the drive pulley 466 in the first direction, length increments of the tension member 462 are transferred from the portions $462_1$, $462_2$, and $462_3$ (via portions $462g$, $462f$, $462e$, $462a$, $462b$, and $462c$) to the portion $462_0$ thereby extending the apparatus 302. When the motor 331 rotates the drive pulley 466 in the second direction, length increments of the tension member 462 are transferred from the portion $462_0$ (via portions $462g$, $462f$, $462e$, $462a$, $462b$, and $462c$) to the portions $462_1$, $462_2$, and $462_3$ thereby retracting the apparatus 302. The apparatus 302 is thus extended and retracted by transferring length increments of the tension-member 462 between the portion $462_0$ of the tension-member 462 running external to the scissors linkage $340_C$ and the portions $462_1$, $462_2$, and $462_3$ of the tension-member 462 running between the pulleys 464 of the scissors linkage $340_C$. Length increments of the tension-member 462 can also be transferred to and from the portions $462f$ and $462g$ of the tension-member 462. Length increments of the tension-member 462 can also be transferred to and from varying amounts of tension-member 462 wrap around the pulleys 464, 466 (and in certain embodiments pulleys 468, 472) as the apparatus 302 extends and retracts.

In alternative embodiments, some or all of the pulleys 464 may not be co-axial with certain of the pivoting joints of the scissors linkage $340_C$, and/or the attachment points 474, 476 can be connected to other points on the scissors linkage $340_C$.

Figure 43:
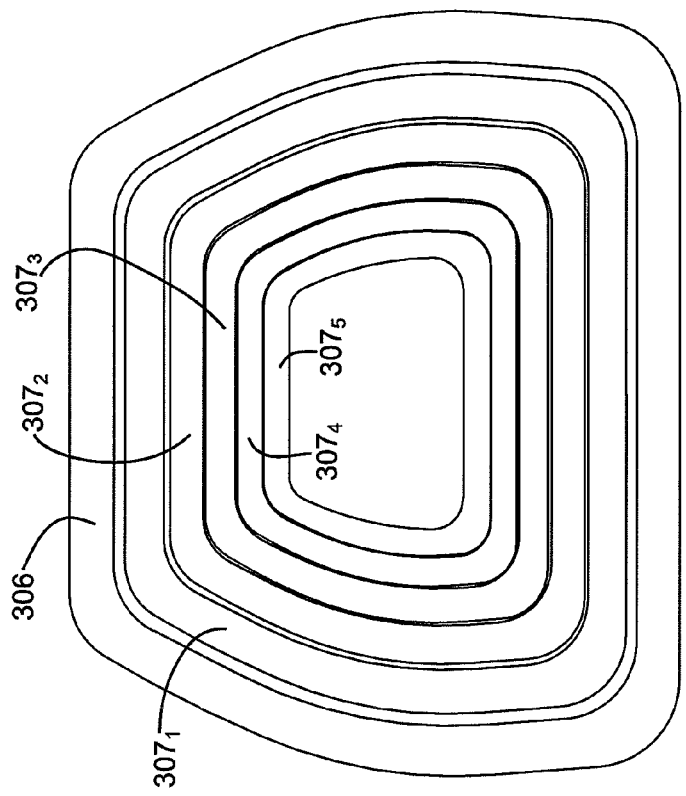
FIGS. 43 and 44 show the hoop frames of FIG. 18 nested within each other.
Figure 44:
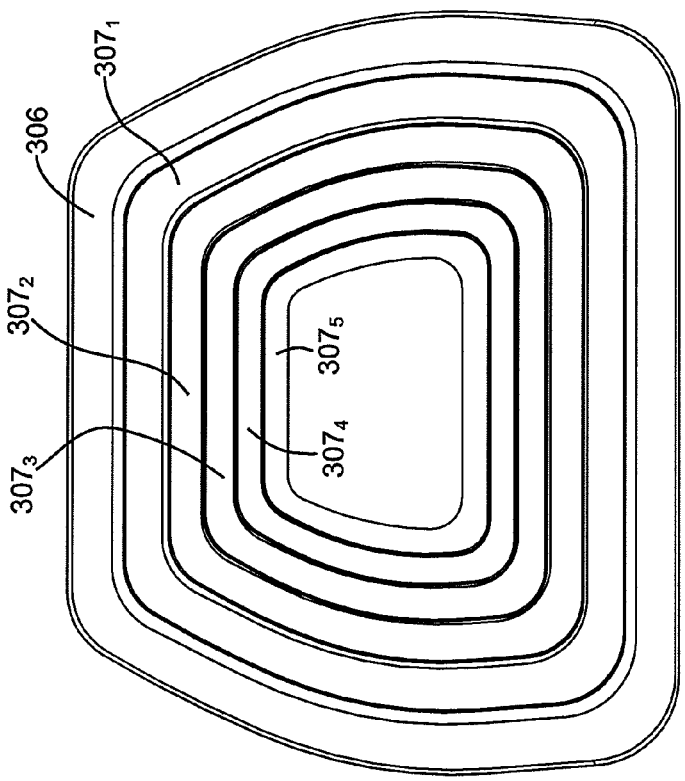
Figure 45:
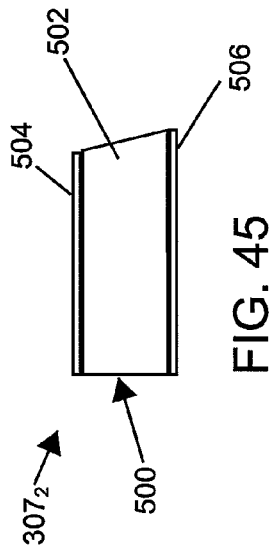
FIGS. 45 and 46 illustrate a partial cross-section of one of the hoop frames of FIG. 18. In particular.
Figure 46:
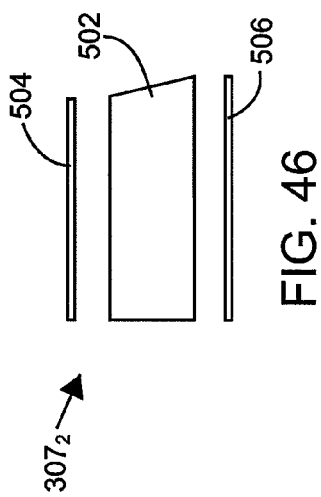

FIGS. 43 through 46 illustrate a method of constructing the moveable members $307_{1-4}$ and further illustrate the possibility of additional moveable members (e.g., moveable member $307_5$). In particular, in certain embodiments, all of the moveable members $307_{1-5}$ can be made from a single sheet of planar material by nesting them as illustrated at FIGS. 43 and 44. In certain embodiments, the planar material can be a honeycomb sandwich structure. In other embodiments, the planar material can be a composite material. In still other embodiments, the planar material 500 can include a core material 502 sandwiched by skins 504, 506. In one embodiment, the core material 502 is lightweight marine plywood and the skins 504, 506 are aluminum sheet. As further illustrated at FIGS. 43 through 46, an outer perimeter of the moveable members $307_{1-5}$ can be angled to match the exterior shape of the aerodynamic drag reducing apparatus 302. In yet other embodiments, the moveable members are not planar but can be contoured in three dimensions for various reason such as matching the three dimensional contour of a vehicle.

In another embodiment of the present disclosure, illustrated at FIGS. 47-69, the drag reducing apparatus 202 includes the driving linkage 240 that is a scissors linkage 240. As suggested above, the support linkages $311_{1-4}$, $411_{1-4}$ can be removed from the embodiment with the scissors linkage $340_R$. Likewise, the embodiment of FIGS. 47-69 needs no bi-folding support linkages, but rather is depicted using the scissors linkage 240 to laterally support, vertically support, and longitudinally locate portions of the apparatus 202 behind the attachment member 206. The scissors linkage 240 also provides means to extend and retract the apparatus 202.

A tension-member 262, in particular a portion $262_0$ that extends between an end $262x$ of the tension member 262 and a support pulley 266, can provide a vertical support component to the scissors linkage 240 (see FIGS. 51 and 52). The scissors linkage 240 can be rotatably mounted along axis A9 (see FIGS. 51 and 53) to the attachment member 206 or directly to the vehicle 201. By attaching an end $262x$ of the tension-member 262 to the scissors linkage 240, a rotational position of the scissors linkage 240 about the axis A9 can be maintained and held by the tension member 262. As tensile loads in the portion $262_0$ of the tension-member 262 can also apply a horizontal force component that pulls the scissors linkage 240 toward the retracted configuration, a means of resisting that horizontal force is included to maintain an extension length of the scissors linkage 240 at a desired extension length. In the depicted embodiment, portions $262_1$, $262_2$, $262_3$, $262_4$, of the tension-member 262 extend between upper axes A11, A13, A15 and lower axes A12, A14, A16 of the scissors linkage 240 and thereby apply tensile loads across the scissors linkage 240. The tensile loads applied by the portions $262_1$, $262_2$, $262_3$, $262_4$, of the tension-member 262 urge the scissors linkage 240 to extend. This urge to extend is countered and balanced by the tensile load in the portion $262_0$ of the tension-member 262. A pair of the upper axes A11, A13, A15, A17 and the lower axes A12, A14, A16, A18 can have one portion of the tension-member 262 running between them (e.g. axes A11 and A12), two or more portions of the tension-member 262 running between them (e.g. axes A15 and A16), or no portions of the tension-member 262 running between them (e.g. axes A17 and A18). The portion $262_0$ of the tension-member 262 is supported by the support pulley 266 that can be rotatably mounted to the attachment member 206 or to the vehicle 201.

Figures 65, 66:
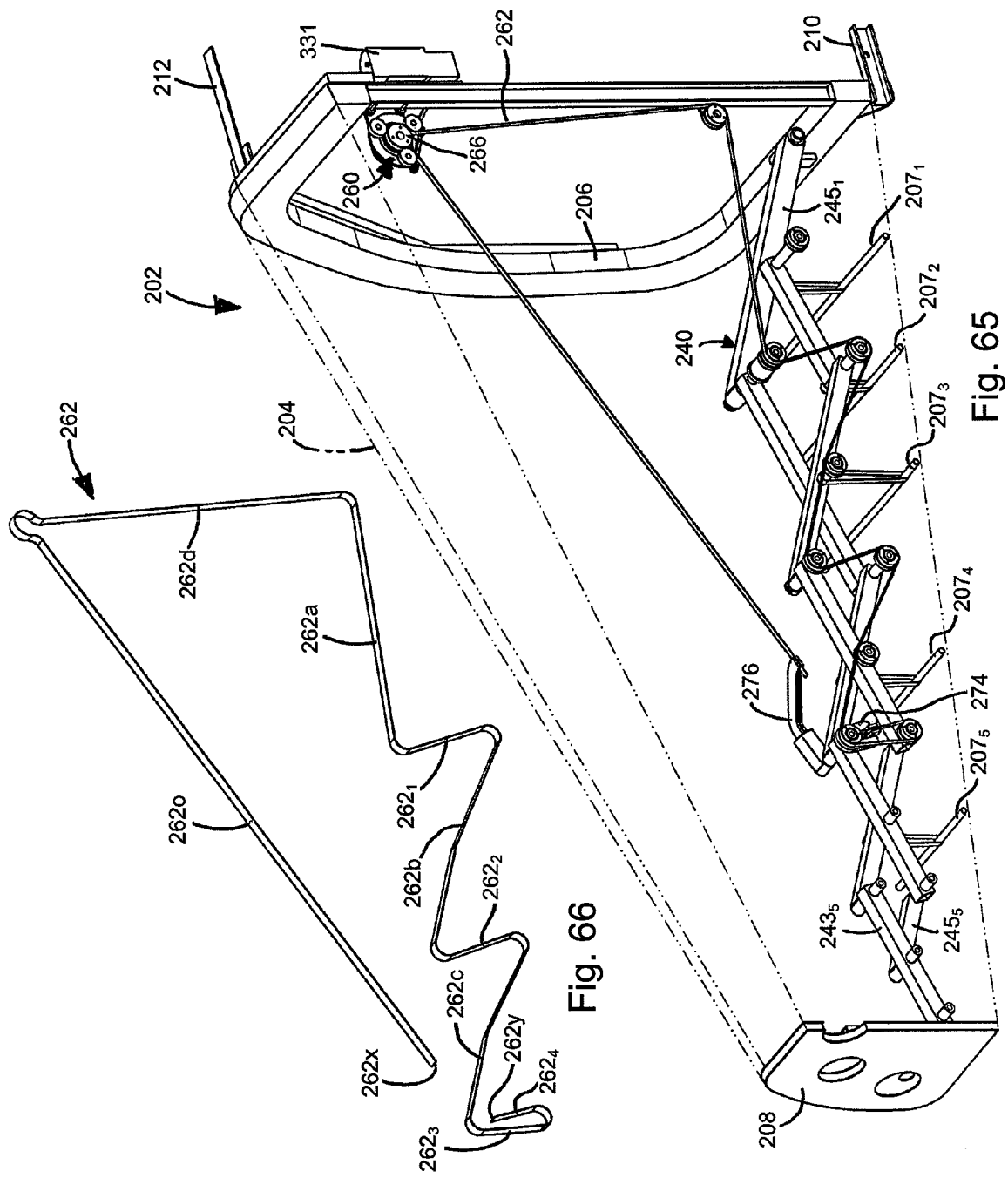
FIG. 65 is a right rear cross-sectional perspective view of a fifth apparatus of FIG. 1 in the fully extended configuration, removed from the sports-utility vehicle, with the exterior cover in phantom line for viewing clarity, and including the scissors linkage of FIG. 47 actuated by another tension-member drive.
FIG. 66 is a right rear perspective view of a tension-member of FIG. 65 in isolation.

In the embodiment depicted at FIGS. 47-64 and the embodiment depicted at FIGS. 65 and 66, the end $262x$ of the tension-member 262 is attached to a harness 276 that is rotatably mounted to the scissors linkage 240 at the axis A15. Likewise, an end $262y$ of the tension-member 262 is attached to a harness 274 that is rotatably mounted to the scissors linkage 240 at the axis A15. In other embodiments, the harnesses 274, 276 can be attached to other axes of the scissors linkage 240 and can be attached to different axes from one another. In still other embodiments, the tension member 262 can be attached to the scissors linkage 240 by other attachment means and/or can be functionally attached to other locations on the scissors linkage 240. In yet other embodiments, the tension-member 262 can run in an endless loop with a portion of the loop connected to the scissors linkage 240.

In the present embodiment, the support pulley 266 is also a drive pulley 266. The drive pulley 266 can be rotated about axis A10 (see FIGS. 51 and 53) in a first rotational direction or a second rotational direction by a drive system 260. When the drive pulley 266 is rotated in the first rotational direction, the second end $262y$ of the tension-member 262 is drawn towards the drive pulley 266. When the drive pulley 266 is rotated in the second rotational direction, the first end $262x$ of the tension-member 262 is drawn towards the drive pulley 266. In other embodiments, a drive pulley can be separate from the support pulley. In still other embodiments, other actuators can be used to drive the tension-member 262 (e.g., a linear actuator can be attached to a portion of the tension-member 262). The drive pulley 266 can take various forms. For example, if the tension-member 262 is a roller chain, then the drive pulley 266 is preferably a compatible sprocket. As another example, if the tension-member 262 is a steel or stainless steel cable, the drive pulley 266 can be a cable drum with a spiral cable cradle, and the cable can be wrapped several turns around the cable drum to increase friction between the cable and the cable drum (similar to a capstan winch). In the embodiment depicted at FIGS. 60 and 62, the drive pulley 266 is a friction pulley and the tension-member 262 is a drive belt.

To increase friction between the tension-member 262 and the drive pulley 266 a set of pinch rollers 270 can be included with the drive system 260. The set of pinch rollers 270 illustrated at FIGS. 60 and 62 includes three pinch rollers 271 that are rotatably mounted to a first pinch roller bracket 272 and/or a second pinch roller bracket 273 about axes A30, A31, and A32. The first pinch roller bracket 272 is rotatably connected to the second pinch roller bracket 273 about the axis A30. A turnbuckle 278 can draw the axis A31 toward the axis A32 as the pinch roller brackets 272, 273 relatively rotate about the axis A30. The turnbuckle 278 can thus draw the three pinch rollers 271 against the drive pulley 266 with the tension-member 262 in between them. By having three or more pinch rollers 271 circumferentially spaced less than 180 degrees apart from each other, the set of pinch rollers 270 is radially constrained about the drive pulley 266. Belt guides at the sides of the drive pulley 266 can also serve to keep the set of pinch rollers 270 from axially sliding off of the drive pulley 266. The angular position of the set of pinch rollers 270 about the axis A10 can vary depending on the configuration of the apparatus 202. For example, when the apparatus 202 is in the fully retracted configuration (see FIGS. 60 and 62) the tensile-member 262 extends from the drive pulley 266 in two substantially downward directions and thus orient the set of pinch rollers 270 as shown. As another example, when the apparatus 202 is in the fully extended configuration (see FIGS. 51 and 53) the tensile-member 262 extends from the drive pulley 266 in a primarily downward direction (portion $262f$) and a downward-rearward direction (the portion $262_o$) and thus orients the set of pinch rollers 270 as shown. Other embodiments can use a single pinch roller 271 to increase friction between the tensile-member 262 and the drive pulley 266. In still other embodiments, other anti-slip means can be employed between the drive pulley 266 and the tension-member 262.

The drive pulley 266 can be driven by various means. In the present embodiment, as illustrated at FIG. 67, an output shaft of the motor 331 is rotationally connected to a first sprocket 269. The sprocket 269 engages a roller chain 268 that in turn engages a second sprocket 267. The second sprocket 267 is rotationally coupled to the drive pulley 266. The motor 331 is preferably a reversible motor and can therefore drive the drive pulley 266 in both the first and the second rotational directions.

The scissors linkage 240 of the present embodiment is configured as a ladder-type scissors linkage. The axes A11, A12, A13, A14, A15, A16, A17, A18, A19, A21, A22, A23, A24, and A25 each have an associated cross-member 249 (see FIGS. 68 and 70). The cross-members 249 can add stability and especially lateral stability to the scissors linkage 240 (see FIGS. 47, 51, and 53). The cross-members 249 also provide a location and rotational axes to mount pulleys 264 on the scissors linkage 240. In particular, link $243_1$ includes a cross-member 249 at axis A21; link $243_2$ includes a cross-member 249 at axis A11; link $245_2$ includes cross-members 249 at axes A12 and A22; link $243_3$ includes cross-members 249 at axes A13, A23, and A16; link $245_3$ includes a cross-member 249 at axis A14; link $243_4$ includes cross-members 249 at axes A15, A24, and A18; and link $243_5$ includes cross-members 249 at axes A17, A25, and A19. The cross-members 249 resemble rungs on a ladder. Link portions 248 connect the cross-members 249 and resemble stringers on the ladder (see FIGS. 68 and 70). In the depicted embodiment, the links $243_{1-5}$, $245_{1-5}$ are of typically unequal lengths, in other embodiments, the links can be of equal lengths.

Certain of the link portions 248 can be permanently joined (e.g., welded) to one or more of the cross-members 249. Certain of the link portions 248 can be rotatably connected to the cross-members 249 of other links 245, 243. In particular, link $245_1$ is connected to the cross-member 249 of link $243_1$ at axis A21 and to the cross-member 249 of link $243_2$ at axis A11; link $243_1$ is connected to the cross-member 249 of link $245_2$ at axis A12; link $243_2$ is connected to the cross-member 249 of link $245_2$ at axis A22 and to the cross-member 249 of link $245_3$ at axis A14; link $245_2$ is connected to the cross-member 249 of link $243_3$ at axis A13; link $245_3$ is connected to the cross-member 249 of link $243_3$ at axis A23 and to the cross-member 249 of link $243_4$ at axis A15; link $245_4$ is connected to the cross-member 249 of link $243_3$ at axis A16, to the cross-member 249 of link $243_4$ at axis A24, and to the cross-member 249 of link $243_5$ at axis A17; and, link $245_5$ is connected to the cross-member 249 of link $243_4$ at axis A18 and to the cross-member 249 of link $243_5$ at axis A25. One advantage of the scissor linkage 240 connection configuration of the present embodiment is a wide spacing of the first link $245_1$ and a general narrowing spacing of the links 243, 245 as the scissors linkage 240 extends rearward in the fully extended configuration. This general narrowing of the link 243, 245 spacing is complementary with the overall shape of the apparatus 202 and provide greater spacing where laterally induced moments can be higher. Other embodiments of the present disclosure can use other connection configurations for a scissors linkage.

The rotatable connection (i.e., rotatable joint) between a typical cross-member 249 and a typical link 243, 245 is illustrated at FIGS. 68-70. The cross-member 249 can have a bore at each end that receives linkage pins $290_H$, $290_T$. The linkage pins $290_H$, $290_T$ can be held in the bores by a threaded rod 292 that extends between the linkage pins $290_H$, $290_T$. The linkage pin $290_T$ can have internal threads that threadingly connect to the threaded rod 292. The linkage pin $290_H$ can have a bore that receives an internal wrenching nut 293

Figure 53:
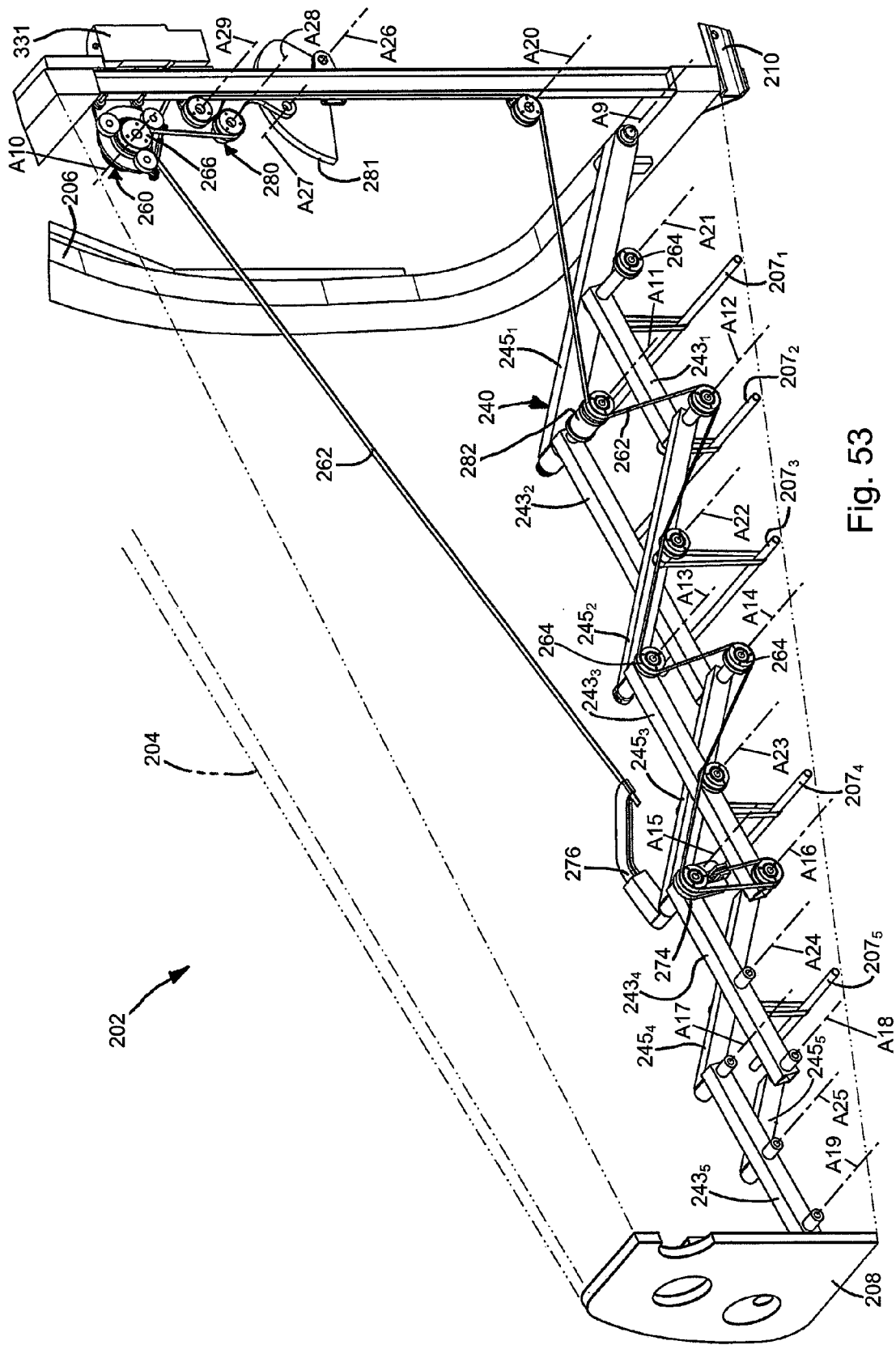
FIG. 53 is a partial right rear cross-sectional view of the fourth apparatus of FIG. 47 in the fully extended configuration, removed from the sports-utility vehicle, and with the exterior cover in phantom line for viewing clarity.
Figure 55:
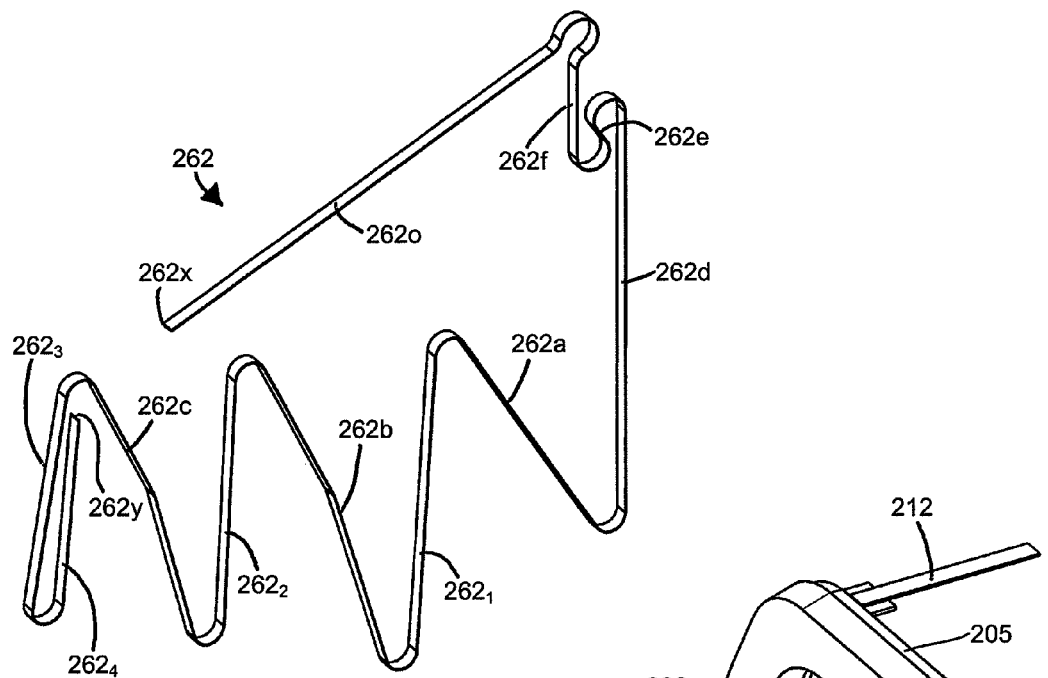
Figure 54:
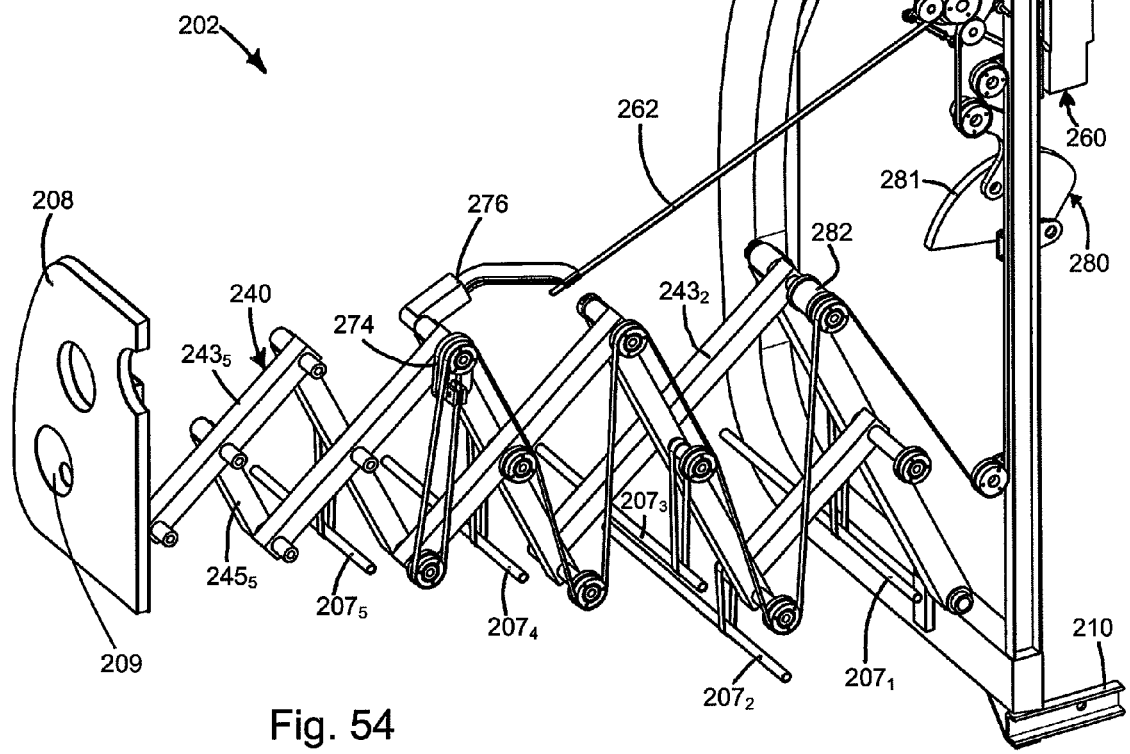
Figure 57:
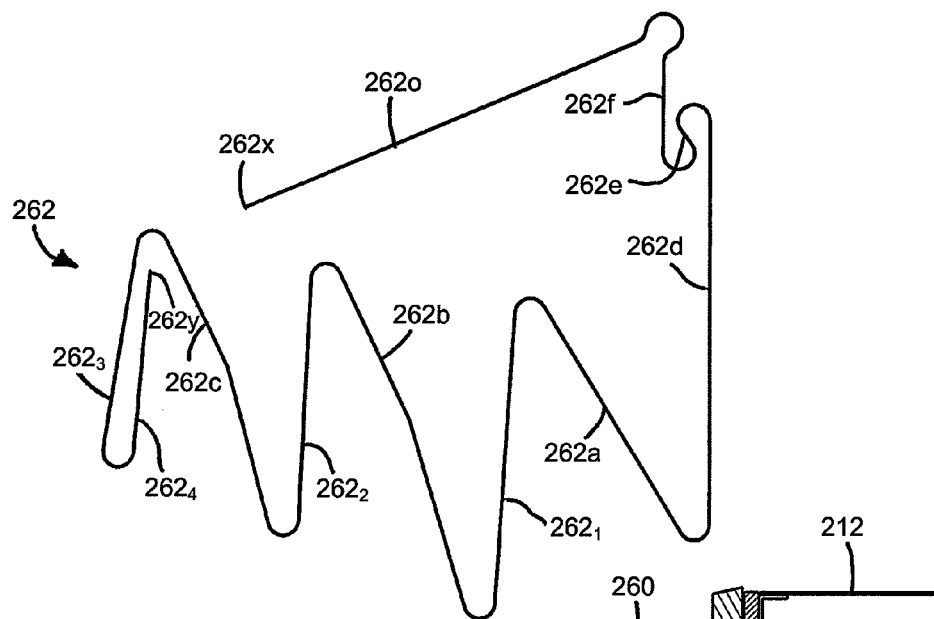

(i.e., an Allen nut). The internal wrenching nut 293 includes internal threads that can draw the threaded rod 292 tight and thereby secure both linkage pins $290_H$, $290_T$ into their respective bores. The linkage pins $290_H$, $290_T$ can be made of any material suitable for use in a rotating joint. In one embodiment, the linkage pins $290_H$, $290_T$ are made of hard anodized aluminum shaft that is ground smooth on its outer diameter. The links 243, 245 can be rotatably mounted about the linkage pins $290_H$, $290_T$ at bores included on the links 243, 245. A bushing or bearing 291 can be inserted into the bores on the links 243, 245. As illustrated at FIG. 70, two bushings 291 can be used with one bushing 291 at each end of the bore. The illustrated bushings 291 also include thrust flanges. A collar (e.g., a clamping collar) can be placed on the linkage pins $290_H$, $290_T$ to retain the link 243, 245 on the linkage pin $290_H$, $290_T$ (a clamping collar is illustrated at FIG. 53 on axis A13).

A spring or spring element (e.g., a torsion spring, a leaf spring, a coil spring, a detent, a double detent, a spring loaded cam, etc.) can be included at one or more of the rotatable connections of the scissors linkage 240. The spring or spring element can bias the scissors linkage 240 to extend, retract, or extend in certain configurations and retract in other configuration. FIGS. 68 and 70 illustrate a torsion coil spring 294 connected to link $245_1$ at a first end and the linkage pin $290_H$ at a second end. In particular, the first end of the spring 294 is held by a spring holder 295 to the link $245_1$, and the second end of the spring 294 is held by a slot at the end of the linkage pin $290_H$. The second end of the spring 294 is secured to the linkage pin $290_H$ by a keeper 296 that can be threaded into and threadingly retained by the linkage pin $290_H$.

The tension-member 262 of the embodiment illustrated at FIGS. 47-64 and 67 is routed within the apparatus 202 between the first end 262x and the second end 262y of the tension-member 262. Along the routing, the tension-member 262 passes over various pulleys including the pulleys 264 on the scissors linkage 240, the drive pulley 266, an idler pulley 265 at axis A28, an idler pulley 265 at axis A29, and an idler pulley 264 at axis A20 (see FIGS. 51 and 53). Various portions of the tension-member 262 can be identified in a given configuration of the apparatus 202. Certain of the various portions of the tension-member 262 expand and contract as the apparatus 202 moves between the extended and the retracted configurations, and other portions of the tension-member 262 remain the same or approximately the same length. A given increment of the tension-member 262 can pass between the various portions of the tension-member 262 as the apparatus moves between configurations. In particular, a portion $262_0$ of the tension-member 262 is defined between the first end 262x and the drive pulley 266. Similarly, a portion 262f is defined between the drive pulley 266 and the idler pulley 265 at axis A28, a portion 262e is defined between the idler pulley 265 at axis A28 and the idler pulley 265 at axis A29, a portion 262d is defined between the idler pulley 265 at axis A29 and the idler pulley 264 at axis A20, a portion 262a is defined between the pulley 264 at axis A20 and a pulley 264 at axis A11, a portion $262_1$ is defined between the pulley 264 at axis A 11 and a pulley 264 at axis A12, a portion 262b is defined between the pulley 264 at axis A12 and a pulley 264 at axis A13, a portion $262_2$ is defined between the pulley 264 at axis A13 and a pulley 264 at axis A14, a portion 262c is defined between the pulley 264 at axis A14 and a pulley 264 at axis A15, a portion $262_3$ is defined between the pulley 264 at axis A15 and a pulley 264 at axis A16, and a portion $262_4$ is defined between the pulley 264 at axis A16 and the second end 262y of the tension member 262 (see FIGS. 48, 50, 52, 55, 57, 59, 61, and 63).

The tension-member 262 of the embodiment illustrated at FIGS. 65 and 66 is also routed within the apparatus 202 between the first end 262x and the second end 262y of the tension-member 262. The present embodiment of the apparatus 202 does not include the idler pulleys 265 and therefore the tension member 262 of the present embodiment does not include portions 262e or 262f. Instead, a portion 262d is defined between the drive pulley 266 at axis A10 and the idler pulley 264 at axis A20. In other respects, the tension-member 262 routing of the present embodiment is the same as the embodiment of FIGS. 47-64 and 67.

Figures 60, 61:
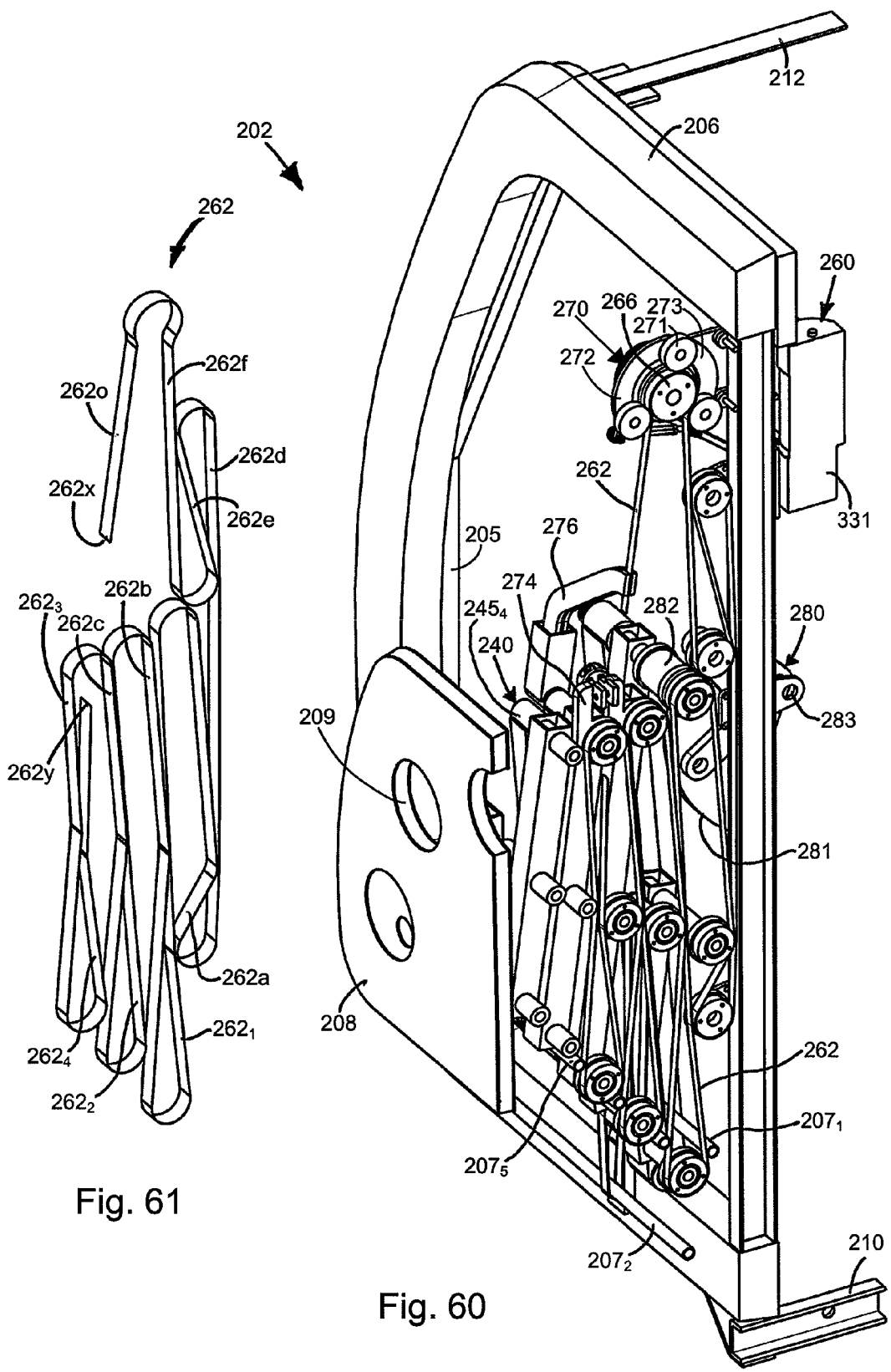

In the embodiment illustrated at FIGS. 47-64 and 67, when the motor 331 rotates the drive pulley 266, length increments of the tension-member 262 are transferred between the portion $262_0$ and the portions $262_1$, $262_2$, $262_3$, and $262_4$. The portions 262b, 262c, and 262d remain substantially the same length as the motor 331 rotates and the apparatus 202 changes configurations except near and at the fully retracted configuration where the portions 262b, 262c, 262d may press against neighboring pulleys 264 and/or cross-members 249 as illustrated at FIGS. 60 and 61. The portion 262a changes length as the apparatus 202 changes configurations because the axis A20 is spaced from the axis A9 and because the portion 262a contacts the pulley 264 at axis A21 (see FIG. 53) in certain configurations (see FIGS. 58-63) but not in others (see FIGS. 47-57). The portions 262e and 262f change lengths when a scissors linkage boost mechanism 280 is active while the apparatus 202 changes configurations, as further described hereinafter. In particular, when the motor 331 rotates the drive pulley 266 in the first direction, length increments of the tension member 262 are transferred from the portions $262_1$, $262_2$, $262_3$, and $262_4$ (via portions 262f, 262e, 262d, 262a, 262b, and 262c) to the portion $262_0$ thereby extending the apparatus 202. When the motor 331 rotates the drive pulley 266 in the second direction, length increments of the tension member 262 are transferred from the portion $262_0$ (via portions 262f, 262e, 262d, 262a, 262b, and 262c) to the portions $262_1$, $262_2$, $262_3$, and $262_4$ thereby retracting the apparatus 202. The apparatus 202 is thus extended and retracted by transferring length increments of the tension-member 262 between the portion $262_0$ of the tension-member 262 running external to the scissors linkage 240 and the portions $262_1$, $262_2$, $262_3$, and $262_4$ of the tension-member 262 running between the pulleys 264 of the scissors linkage 240. Length increments of the tension-member 262 can also be transferred to and from the portions 262f and 262e of the tension-member 262. Length increments of the tension-member 262 can also be transferred to and from varying amounts of tension-member 262 wrap around the pulleys 264, 265, 266 as the apparatus 202 extends and retracts.

In alternative embodiments, some or all of the pulleys 264 may not be co-axial with certain of the pivoting joints of the scissors linkage 240, and/or the attachment harnesses 274, 276 can be connected to other axes or points on the scissors linkage 240.

In the embodiment illustrated at FIGS. 65 and 66, there is no scissors linkage boost mechanism 280, and therefore the portions 262e and 262f of the tension member 262 do not exist. In other respects, the present embodiment transfers length increments in the same way as the embodiment of FIGS. 47-64 and 67.

To obtain a desired configuration of the scissors linkage 240 both when the apparatus 202 is fully retracted and fully extended, the transfer of length increments of the tension member 262 must be balanced. For example when retracting, if the portion $262_0$ of the tension-member 262 transfers length increments at a rate higher than portion $262_1$, $262_2$, $262_3$, and $262_4$ can receive, then axis A15 will be drawn up towards axis A10 before the scissors linkage 240 is suitably collapsed. Conversely, if the portion $262_0$ of the tension-member 262 transfers length increments at a rate lower than portion $262_1$, $262_2$, $262_3$, and $262_4$ need, then the scissors linkage 240 will collapse before the axis A15 is suitably drawn towards axis A10. Both the former and the latter condition will result in a retracted configuration that is not as compact as a balanced length transfer can achieve. To produce a balanced length increment transfer, the geometry of the scissors linkage 240, the positions of the support pulley 266 and the pulley 264 at axis A20, and the routing of the tension-member 262 through the scissors linkage 240 can be compatibly selected. To fine tune the balance of the length transfer, the reference distance Dp (see FIG. 47) locating the pulley 264 at axis A20 (see FIG. 51) can be adjusted.

Figure 56:
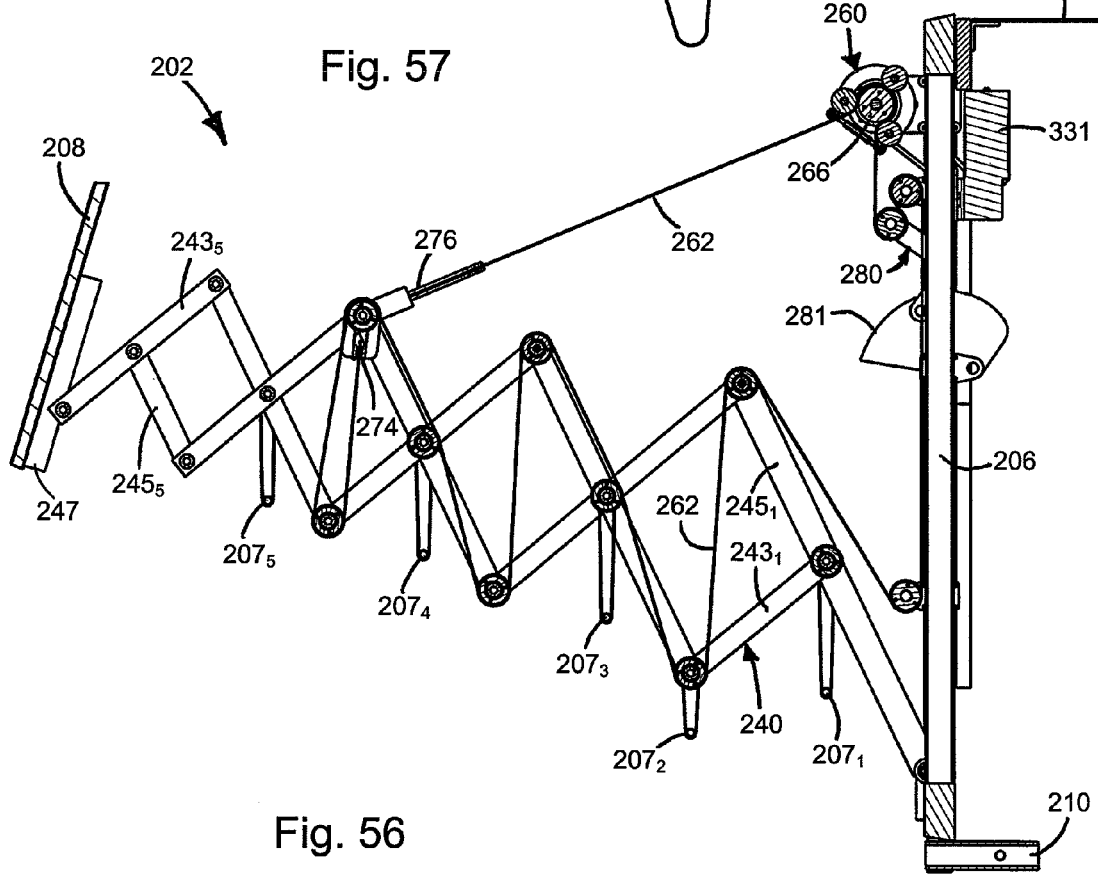
Figures 58, 59:
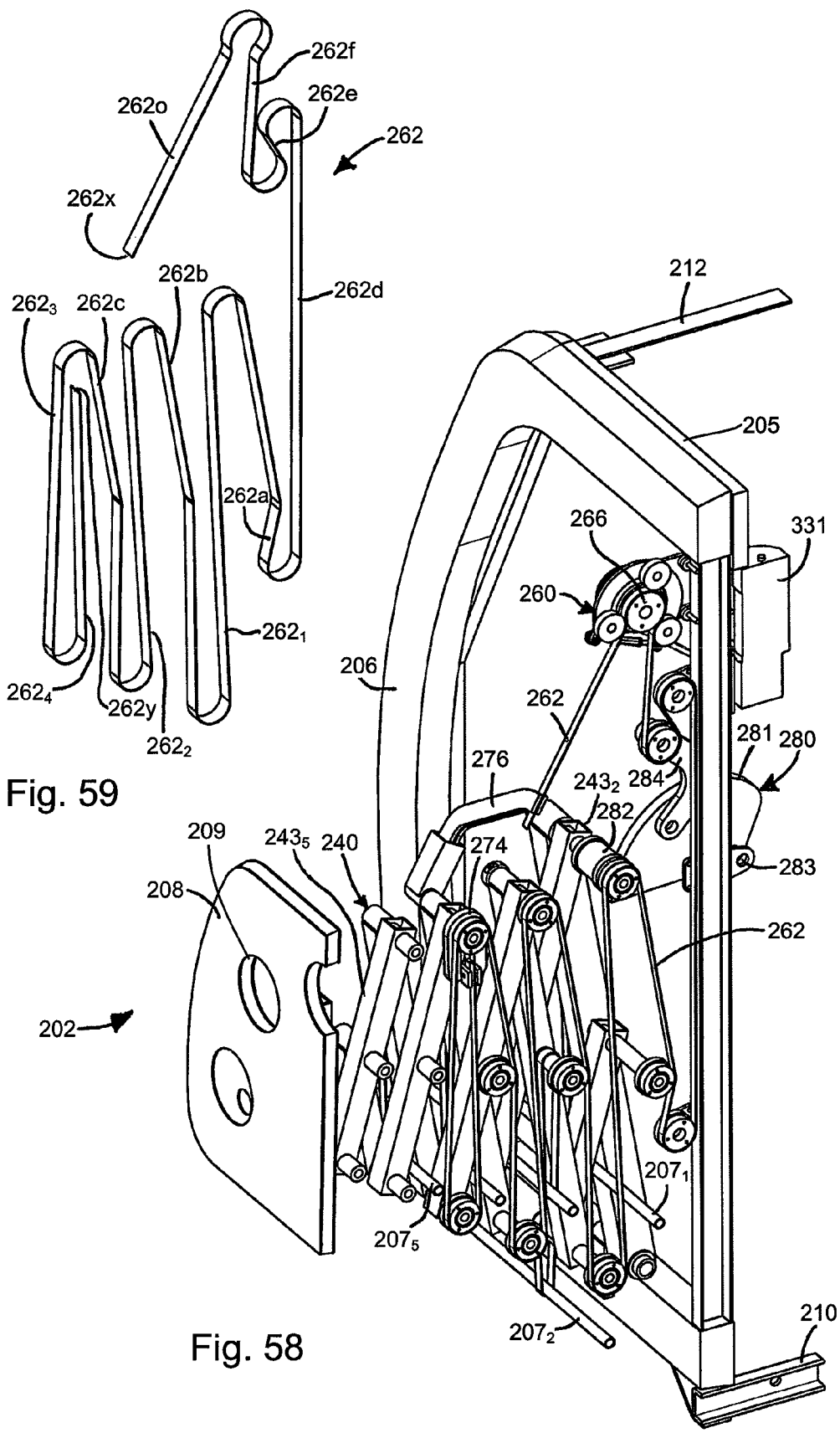

Interaction between the scissors linkage 240, the tension member 262, the pulley 264 at axis A20, and the support pulley 266 defines kinematic movement of the apparatus 202 as it moves between the fully extended configuration and the fully retracted configuration. In preferred embodiments, the kinematic movement results in a low center-of-gravity of the apparatus 202 when the apparatus 202 is in the fully extended configuration (see FIG. 51) and in the fully retracted configuration (see FIG. 62). In preferred embodiments, the center-of gravity of the apparatus 202 vertically rises and continues to rise as the apparatus 202 moves away from the fully extended and the fully retracted configurations. The vertical height of the center-of-gravity of the apparatus 202 therefore preferably reaches a maximum when the apparatus 202 is at or near a medial position along its range of motion. As an example, the center-of-gravity of the apparatus 202 is higher as shown at FIG. 56 than it is at FIG. 51 or 62. By having the center-of-gravity increase in vertical height as the apparatus 202 moves away from the fully extended and retracted configurations, the apparatus 202 is stable at the fully extended and retracted configurations. Gravity thereby urges the apparatus 202 into either the fully extended or the fully retracted configurations and the apparatus 202 is a bi-stable apparatus.

In embodiments without a motor, the apparatus 202 can be manually moved between the extended and the retracted configurations. As the apparatus 202 is manually moved from the extended configuration toward the retracted configuration, gravity initially resists the movement as the center-of-gravity of the apparatus 202 rises. At a point of bifurcation, gravity assists in the movement toward the retracted configuration. Likewise, as the apparatus 202 is manually moved from the retracted configuration toward the extended configuration, gravity initially resists the movement as the center-of-gravity of the apparatus 202 rises. At the point of bifurcation, gravity assists in the movement toward the extended configuration.

In certain embodiments, the scissors linkage 240 looses mechanical advantage in the fully retracted configuration, and increasing tension on the portions $262_{1-4}$ of the tension member 262 has diminishing effect in extending the scissors linkage 240. The boost mechanism 280 resolves this by assisting the scissors linkage 240 when initially extending from the fully retracted configuration. The boost mechanism 280 can also cushion the scissors linkage 240 as it is being fully retracted. In the depicted embodiment, the boost mechanism 280 is driven by the tension-member 262. In other embodiments, a boost mechanism can be driven independent of the tension-member. Tensile loads in the portions 262f and 262e of the tension-member 262 urge axis A28 toward axis A29 (see FIGS. 51 and 53). In the retracted configuration, this urging results in an upward force being applied to one or more boost links 284. The boost links 284 in turn urges one or more boost cams 281 to rotate clockwise about axis A26 as viewed at FIGS. 51, 62, and 64. The boost cams 281 thus engages boost cam followers 282 rotatably mounted on the scissors linkage 240 at axis A11 (see FIGS. 51 and 53). The boost mechanism 280 thus urges the scissors linkage 240 to extend and can be configured to have a high mechanical advantage when the portions $262_{1-4}$ of the tension member 262 have low mechanical advantage. The boost cams 281 can be limited by a stop and/or the idler pulleys 265 can reach each other and thus limit movement of the boost cams 281.

In another embodiment of the present disclosure, illustrated at FIGS. 71-93, the drag reducing apparatus 102 includes the pair of driving linkages 140R and 140L that are scissors linkages 140R and 140L. The scissors linkages 140R and 140L are rotatably mounted at one end to linkage mounts 112R and 112L respectively (see FIG. 73). In the depicted embodiment, the linkage mounts 112R, 112L are attached to the attachment member 106, and in particular to a bottom member 106B of the attachment member 106. In other embodiments, the linkage mounts 112R, 112L can be attached directly to the vehicle 101 or to the frame 180 of the vehicle 101. At an opposite end, the scissors linkages 140R, 140L are attached to the moveable end member 108. In the depicted embodiment, the scissors linkages 140R, 140L are mirror images of each other and move and otherwise function as a pair. The exterior cover 104 is held taut by the fully extended scissors linkages 140R and 140L and thus defines a drag reducing shape.

Similar to the embodiments described above, a motor 131 is configured to extend the apparatus 102, when rotating in a first direction, and retract the apparatus 102, when rotating in a second direction. The motor 131 or a brake can also hold the apparatus at a given configuration by not rotating. The motor 131 turns a drive pulley/support pulley 166 via a shaft 165. The shaft 165 is supported my mounts 114M, 114R, and 114L that can be supported by the attachment member 106 and in particular by a top member 106T of the attachment member 106. The mounts 114M, 114R, and 114L can alternatively be attached directly to the vehicle 101. The shaft 165 turns sprockets 157A adjacent to right and left members 106R, 106L of the attachment member 106. The sprockets engage a roller chain loop 158. The roller chain loop 158 engages sprockets 157B that can be rotatably held by the linkage mounts 112R, 112L (see FIG. 73).

There is no continuous tension-member in the embodiment of FIGS. 71-93. Rather, multiple tension-members $162_0$, $161_1$, $162_2$, $162_3$, $162_4$, and $162_5$, perform a similar function in conjunction with roller chain loops 156, 158, sprockets $153_A$, $153_B$, 157A, 157B, and pulleys $155_A$, $155_B$, 166. In particular, the sprocket 157B turns shaft $154_B$ of drive assembly $147_1$ of link $145_1$ (see FIGS. 90 and 93). The shaft $154_B$ thus turns sprocket $153_B$, and $153_A$ that are connected together by roller chain loop 156. The sprocket $153_A$ turns shaft $154_A$, and the shaft $154_A$ turns pulley $155_A$. Tension member $162_1$ wraps around pulley $155_A$ of drive assembly $147_1$ at a first end and wraps around pulley $155_B$ of drive assembly $147_2$ of link $145_2$ at a second end. The pulley $155_B$ of the drive assembly $147_2$ of link $145_2$ turns shaft $154_B$ of drive assembly $147_2$ of link $145_2$. This repeats through drive assemblies $147_{1-5}$ of links $145_{1-5}$ and ends with tension member $162_5$ connecting to link $143_5$. As the tension members $162_{1-5}$ accumulate and release from their respective pulleys $155_A$, $155_B$ the effect is similar to that of the continuous tension member 262 mentioned above.

Figure 90:
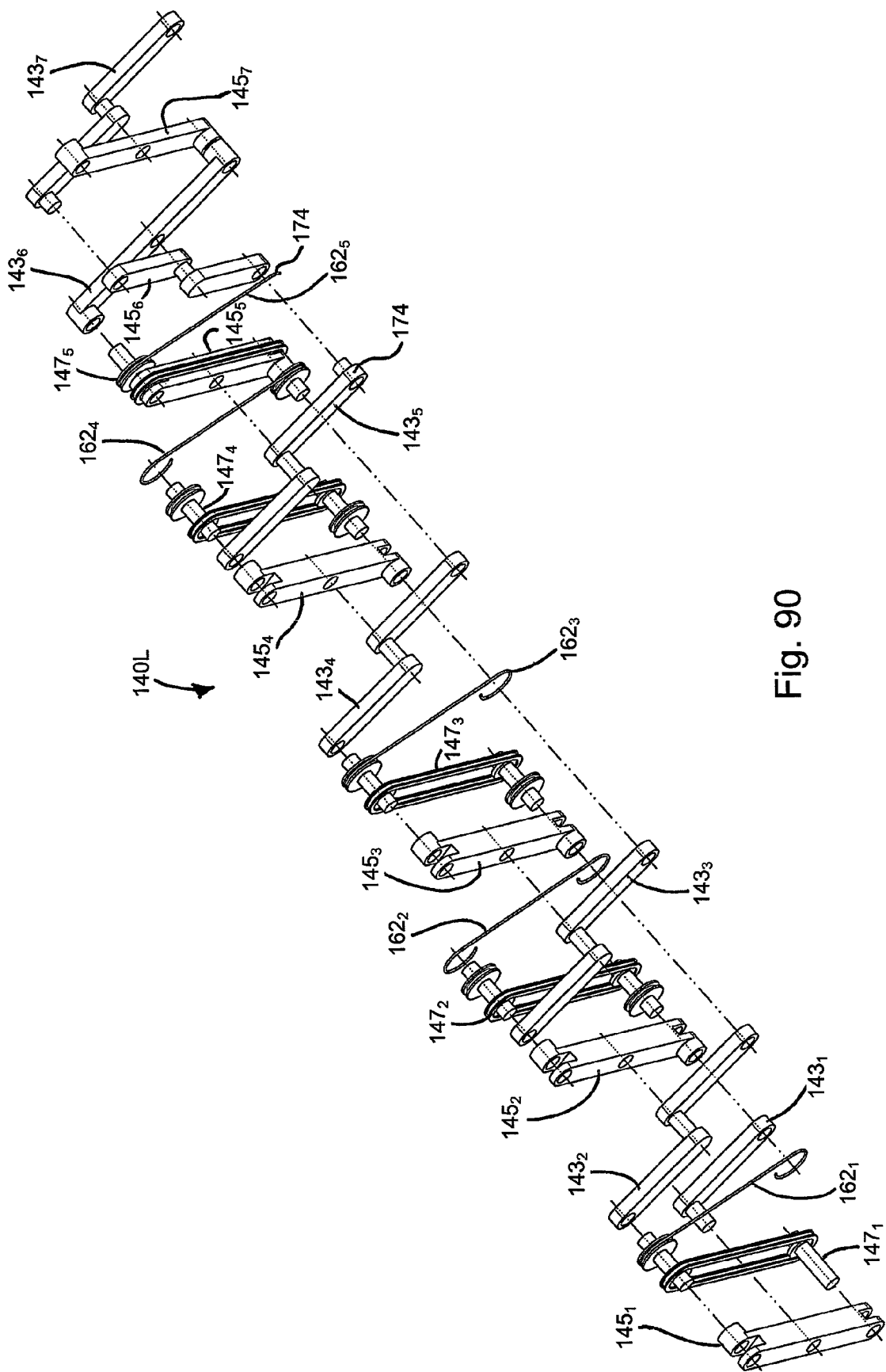
Figure 93:
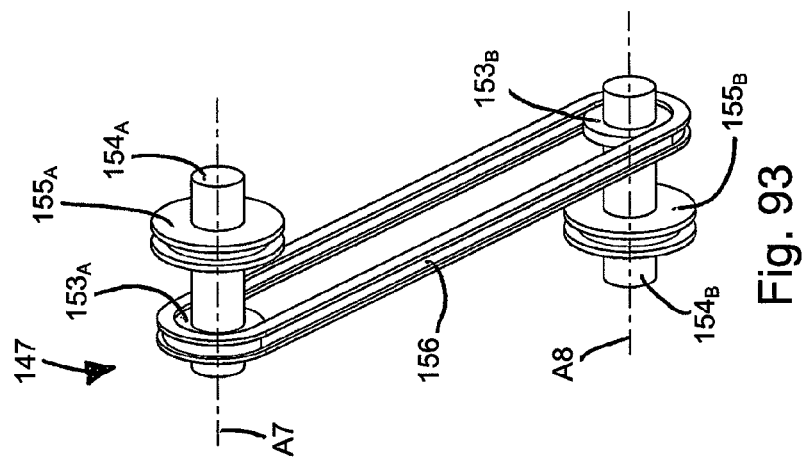
Figure 92:
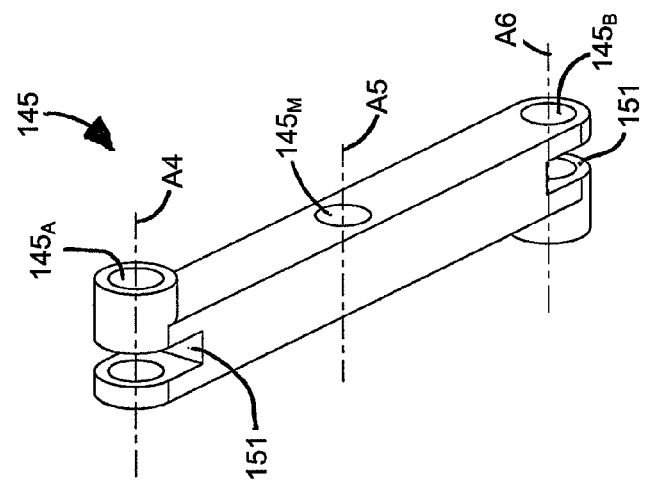
Figure 91:
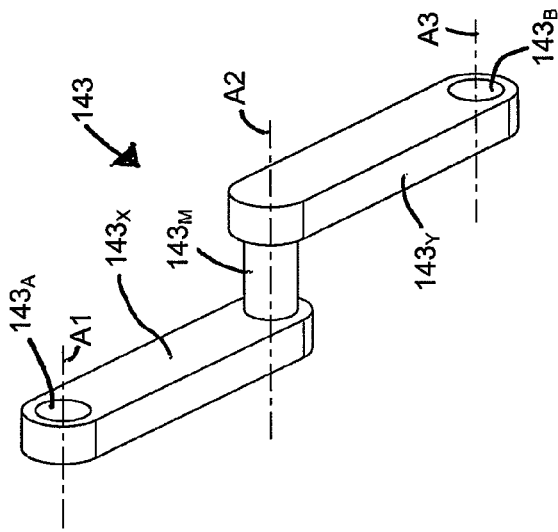

The sprocket $153_A$, the shaft $154_A$, and the pulley $155_A$ rotate about axis A7 as shown at FIG. 93. The sprocket $153_B$, the shaft $154_B$, and the pulley $155_B$ rotate about axis A8 as shown at FIG. 93. The link 145 includes axis A4 defined by bore $145_A$, axis A5 defined by bore $145_M$, and axis A6 defined by bore $145_B$. The link 145 supports the drive assembly 147 by rotatably holding axis A7 in alignment with axis A4, and by rotatably holding axis A8 in alignment with axis A6. Link 143 defines axes A1, A2, and A3 with axis A2 defined by crank shaft $143_M$, axis A1 defined by bore $143_A$, and axis A3 defined by bore $143_B$. The links interconnect to form the scissors linkages 140L and 140R. The interconnection of scissors linkage 140L is illustrated at FIG. 90.

The scissors linkages 140L and 140R illustrate a scissors linkage with equal length links. Other embodiments of similar scissors linkages can use unequal length links.

FIGS. 94-96 illustrate an advantage of the configuration of scissors linkages 140L and 140R. In particular, the scissors linkages 140L and 140R can fold flat without interference. This can produce a more compact apparatus 103.

The end panel 108 can include a folding half 108B operated by a linkage 116 and thereby fold with respect to end panel half 108A. The scissors linkage controls the orientation of both end panel halves 108A, 108B. Other embodiments can control the orientation of end panel with joint stops etc.

The various features and components, including the various extension/retraction methods (and components thereof), of the various embodiments may be combined in various ways to create new embodiments.

Latches or similar devices may be use to keep the aerodynamic drag reducing apparatus 102, 103, 202, 203, 302 in a given configuration.

In certain embodiments of the present disclosure, certain support linkages and/or moveable frames may deform from one configuration to the next or while transitioning between configurations. This deformation will cause forces and moments to develop within the apparatus. These forces and moments may be employed to keep the apparatus stable in one or more configurations.

When extended, drag reducing devices in accordance with the present disclosure are typically truncated (see FIGS. 1 and 72). In certain truncated embodiments, the extended lengths of the drag reducing devices are such that the effects of drag caused by air flow separation at the truncated ends are minimal. In example embodiments suitable for over-the-road trailers 101, the drag reducing devices may have extended lengths, L, greater than or equal to 4 feet, or in the range of 4 to 22 feet, or in the range of 8-14 feet. Vehicles having smaller heights and widths could be equipped with proportionally smaller drag reduction devices. In certain embodiments, the ratio of the extended length, L, of the drag reduction device to a reference dimension of the vehicle is at least 1 to 1. The reference dimension is typically the smaller of the width, w, or the height, h, of the rear of the vehicle body. In the embodiment of FIG. 2, the width, w, is the reference dimension since it is smaller than the height, h. In other embodiments, this ratio is at least 1.5 to 1, or at least 2 to 1, or at least 3 to 1.

In certain embodiments, drag reducing devices in accordance with the present disclosure may be automatically extended or retracted. A control system may be used to automatically control extension and retraction. In certain embodiments, vehicle speed, crosswind speed, and/or other vehicle parameters may be used to automatically control retraction/extension. For example, a controller may sense vehicle speed, and automatically cause retraction of the drag reducing device if the vehicle speed moves below a given speed value (e.g., 45 miles per hour). In another example, a controller may sense crosswind speed, and automatically cause retraction if crosswinds exceed a given value (e.g., 25 miles per hour).

Wireless (e.g., radio wave) communication may be used to transmit and receive control system communication and information.

Retractable drag reducing devices in accordance with the present disclosure can have relatively long extended lengths, L, (see FIGS. 2 and 77) as compared to retracted lengths (see FIGS. 15, 62, 83, and 95). Certain embodiments have an extended length, L, to retracted length ratio of at least 6 to 1. Other embodiments have extended length to retracted length ratios of at least 10 to 1 or at least 20 to 1.

While specific angles and lengths have been specified for certain embodiments of the present disclosure, it will be appreciated that the broad aspects of the present disclosure are not limited to these values.

The use of subscripts in item numbers in this disclosure typically implies a specific member of a group of related items. The use of the same number without the subscript typically implies a generic member or typical member of the group of related items. When a numeric or alphabetic range is in a subscript, each of the items within the range is typically referred to.

In the present disclosure, the words "a" or "an" are to be taken to include both the singular and the plural. Conversely, any references to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A drag reducing apparatus adapted for mounting to a rear end of a vehicle, the drag reducing apparatus comprising:
   a scissors linkage including a plurality of connection locations; and
   a tension member routed through the scissors linkage, the tension member operably connected to the plurality of connection locations of the scissors linkage;
   wherein when the tension member is driven in a first direction the scissors linkage extends thereby extending the drag reducing apparatus; and
   wherein when the tension member is driven in a second direction the scissors linkage retracts thereby retracting the drag reducing apparatus.

2. The drag reducing apparatus of claim 1, wherein the plurality of connection locations of the scissors linkage includes an attachment point that attaches the tension member to the scissors linkage at the attachment point.

3. The drag reducing apparatus of claim 2, wherein the tension member includes a first end and a second end, wherein the attachment point is a first attachment point attached to the tension member adjacent the first end of the tension member, and wherein the plurality of connection locations of the scissors linkage also includes a second attachment point attached to the tension member adjacent the second end of the tension member.

4. The drag reducing apparatus of claim 2, wherein the scissors linkage includes a plurality of joints, wherein at least two connection locations of the plurality of connection locations respectively coincide with at least two joints of the plurality of joints, wherein the tension member is routed between the at least two connection locations, and wherein when the tension member is driven in the first direction the tension member urges at least two of the at least two joints toward each other and thereby extends the scissors linkage.

5. The drag reducing apparatus of claim 1, wherein the plurality of connection locations of the scissors linkage includes a rotating member rotatably mounted on the scissors linkage and wherein the tension member is routed across the rotating member and is thereby connected to the scissors linkage.

6. The drag reducing apparatus of claim 5, wherein the rotating member is a pulley.

7. The drag reducing apparatus of claim 5, wherein the scissors linkage includes a plurality of joints and wherein the rotating member is coaxial with a joint of the plurality of joints.

8. The drag reducing apparatus of claim 5, wherein the rotating member is a first rotating member, wherein the plurality of connection locations of the scissors linkage also includes a second rotating member rotatably mounted on the scissors linkage, wherein the tension member is also routed across the second rotating member and is thereby further connected to the scissors linkage, and wherein when the tension member is driven in the first direction the tension member urges the first and the second rotating members toward each other and thereby extends the scissors linkage.

9. The drag reducing apparatus of claim 1, wherein a portion of the tension member provides vertical support to the scissors linkage.

10. A drag reducing apparatus for use in reducing drag on a vehicle, the drag reducing apparatus comprising:
a drag reducing assembly that is movable between an extended configuration and a retracted configuration, the drag reducing assembly including a first end adapted for connection to a rear end of the vehicle and a second end that is moved outwardly from the first end of the drag reducing assembly when the drag reducing assembly is moved from the retracted configuration toward the extended configuration, the drag reducing assembly including a scissors linkage connected between the first and the second ends of the drag reducing assembly, and the drag reducing assembly including a tensile load transfer arrangement including at least one tension member;
wherein the scissors linkage is connected to the tensile load transfer arrangement at a plurality of connection locations;
wherein when the tensile load transfer arrangement is driven in a first direction the scissors linkage extends thereby moving the drag reducing assembly toward the extended configuration from the retracted configuration; and
wherein when the tensile load transfer arrangement is driven in a second direction the scissors linkage retracts thereby moving the drag reducing assembly toward the retracted configuration from the extended configuration.

11. The drag reducing apparatus of claim 10, wherein the plurality of connection locations includes an attachment point that attaches the tensile load transfer arrangement to the scissors linkage at the attachment point.

12. The drag reducing apparatus of claim 11, wherein the plurality of connection locations includes a plurality of rotating members rotatably mounted on the scissors linkage, wherein the tensile load transfer arrangement is routed across and between the plurality of rotating members and is thereby further connected to the scissors linkage, wherein the plurality of rotating members includes a first rotating member and a second rotating member, and wherein when the tensile load transfer arrangement is driven in the first direction the tensile load transfer arrangement urges the first and the second rotating members toward each other and thereby extends the scissors linkage.

13. The drag reducing apparatus of claim 11, wherein a portion of the tensile load transfer arrangement extends between the attachment point and a mounted rotating member rotatably mounted to the first end of the drag reducing assembly and wherein when the tensile load transfer arrangement is driven in the second direction the tensile load transfer arrangement urges the attachment point toward the mounted rotating member and thereby retracts the scissors linkage.

14. The drag reducing apparatus of claim 13, wherein the mounted rotating member is driven by a motor and thereby drives the tensile load transfer arrangement in the first and the second directions.

15. The drag reducing apparatus of claim 13, wherein an end of the scissors linkage is pivotably mounted to the first end of the drag reducing assembly.

16. The drag reducing apparatus of claim 15, wherein the portion of the tensile load transfer arrangement provides vertical support to the scissors linkage when the drag reducing assembly is at the extended configuration.

17. The drag reducing apparatus of claim 16, wherein a center-of-gravity of the drag reducing assembly vertically rises as the drag reducing assembly moves away from the retracted configuration toward the extended configuration and also vertically rises as the drag reducing assembly moves away from the extended configuration toward the retracted configuration.

18. The drag reducing apparatus of claim 10, wherein at least one spring assists in moving the drag reducing assembly toward the extended configuration from the retracted configuration.

19. The drag reducing apparatus of claim 10, further comprising a fabric covering, wherein the scissors linkage holds the fabric covering taut between the first and the second ends of the drag reducing assembly when the drag reducing assembly is in the extended configuration.

20. The drag reducing apparatus of claim 19, further comprising at least one intermediate moveable member that supports the fabric covering when the drag reducing assembly is not in the extended configuration.

* * * * *